(12) United States Patent
Ozaki et al.

(10) Patent No.: US 7,878,713 B2
(45) Date of Patent: Feb. 1, 2011

(54) SENSOR-EQUIPPED BEARING FOR WHEEL

(75) Inventors: Takayoshi Ozaki, Iwata (JP); Tomomi Ishikawa, Iwata (JP); Kentarou Nishikawa, Iwata (JP)

(73) Assignee: NTN Corporation, Osaka (JP)

( * ) Notice: Subject to any disclaimer, the term of this patent is extended or adjusted under 35 U.S.C. 154(b) by 514 days.

(21) Appl. No.: 11/990,765

(22) PCT Filed: Aug. 22, 2006

(86) PCT No.: PCT/JP2006/316363

§ 371 (c)(1),
(2), (4) Date: Feb. 21, 2008

(87) PCT Pub. No.: WO2007/023785

PCT Pub. Date: Mar. 1, 2007

(65) Prior Publication Data

US 2009/0129712 A1    May 21, 2009

(30) Foreign Application Priority Data

| Aug. 22, 2005 | (JP) | ............................. 2005-239990 |
| Aug. 22, 2005 | (JP) | ............................. 2005-239991 |
| Aug. 22, 2005 | (JP) | ............................. 2005-239992 |
| Sep. 6, 2005 | (JP) | ............................. 2005-258109 |
| Sep. 16, 2005 | (JP) | ............................. 2005-269338 |

(51) Int. Cl.
    *F16C 32/00* (2006.01)
(52) U.S. Cl. ...................................... 384/448; 384/544
(58) Field of Classification Search ................. 384/544, 384/448, 589; 73/862.045, 862.541
    See application file for complete search history.

(56) References Cited

U.S. PATENT DOCUMENTS

| 4,203,319 | A | * | 5/1980 | Lechler | ................. 73/862.541 |
| 5,140,849 | A | * | 8/1992 | Fujita et al. | ............. 73/862.541 |
| 5,488,871 | A | * | 2/1996 | Harbottle et al. | ............ 384/448 |

(Continued)

FOREIGN PATENT DOCUMENTS

JP          2003-530565          10/2003

(Continued)

OTHER PUBLICATIONS

Chinese Office Action issued Mar. 1, 2010 in corresponding Chinese Patent Application 200680030551.6.

(Continued)

*Primary Examiner*—Thomas R Hannon

(57) ABSTRACT

A sensor-incorporated wheel support bearing assembly, enabling a load sensor to be compactly installed on the vehicle and capable of detecting a load on a wheel with good sensitivity includes a ring member, affixed to a stationary member, which has at an intermediate portion thereof a first non-contact ring portion not in contact with the stationary member, at one end a first contact ring portion in contact with the stationary member, and at the other end the following (A) or (B): (A) a second non-contact ring portion having a wall thickness greater than that of the first non-contact ring portion; (B) a second contact ring portion in contact with the stationary member. A strain sensor is fitted to; in (A), the first non-contact ring portion, and in (B), the first non-contact ring portion or first contact ring portion, which has smaller wall thickness.

18 Claims, 61 Drawing Sheets

U.S. PATENT DOCUMENTS

| | | | | |
|---|---|---|---|---|
| 5,952,587 | A * | 9/1999 | Rhodes et al. | 73/862.541 |
| 6,002,248 | A * | 12/1999 | Binder | 384/448 |
| 6,484,582 | B2 * | 11/2002 | Ehrfeld et al. | 384/448 |
| 6,687,623 | B2 * | 2/2004 | Bailey et al. | 73/862.541 |
| 2002/0057856 | A1 * | 5/2002 | Bailey et al. | 384/448 |
| 2003/0218548 | A1 | 11/2003 | Sato et al. | |
| 2005/0222740 | A1 | 10/2005 | Inoue et al. | |
| 2005/0259903 | A1 * | 11/2005 | Takizawa et al. | 384/448 |

FOREIGN PATENT DOCUMENTS

| | | |
|---|---|---|
| JP | 2004-3601 | 1/2004 |
| JP | 2004-142577 | 5/2004 |
| WO | 01/77634 | 10/2001 |
| WO | 2004/018273 | 3/2004 |

OTHER PUBLICATIONS

International Preliminary Report on Patentability, mailed Aug. 22, 2006 and issued in corresponding International Patent Application No. PCT/JP2006/313363.

International Search Report (PCT/ISA/210) mailed on Oct. 3, 2006 in connection with the International Application No. PCT/JP2006/316363.

* cited by examiner

Fig. 21
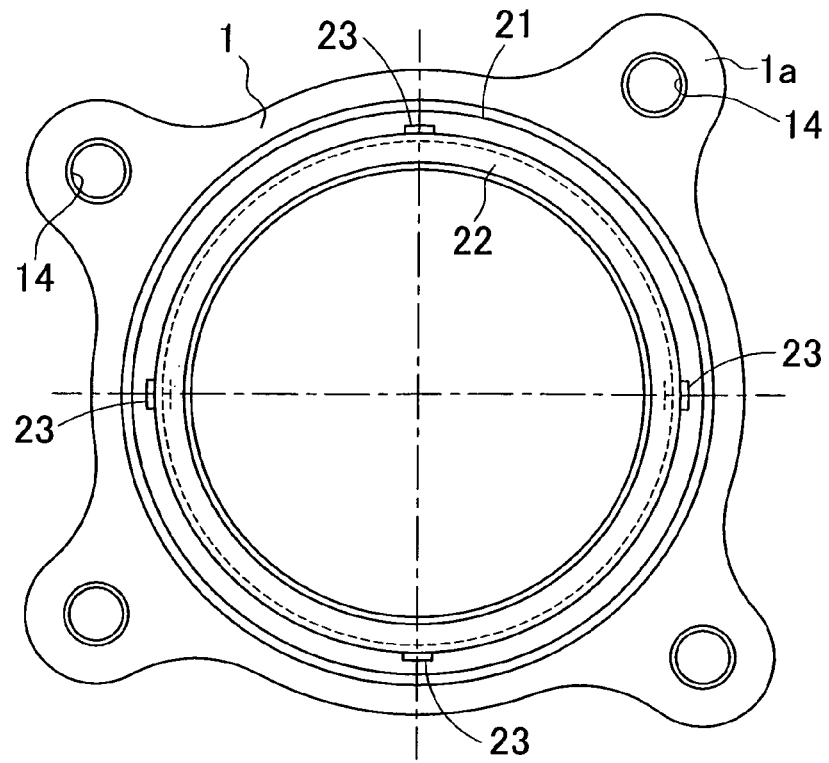
Fig. 22A
Fig. 22B
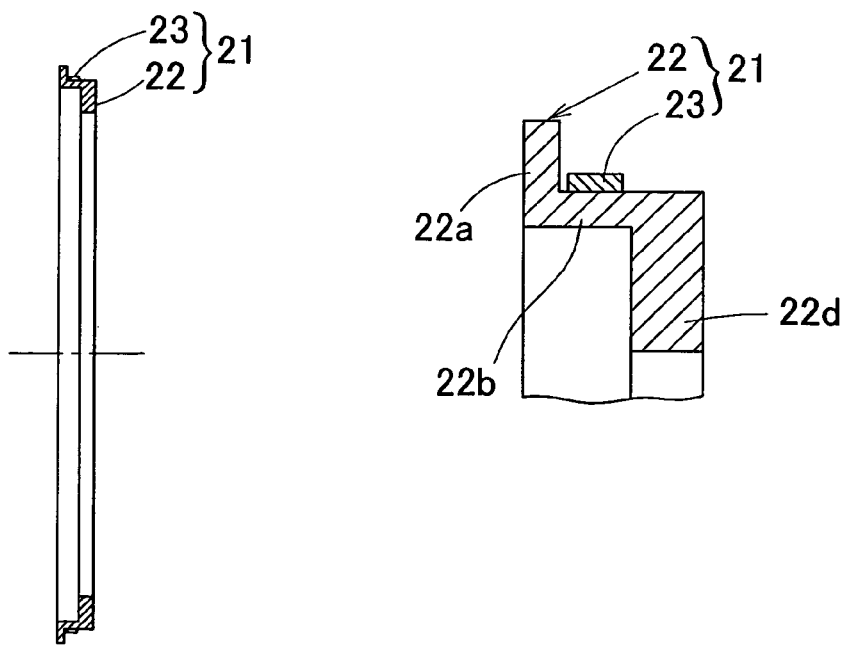

SENSOR-EQUIPPED BEARING FOR WHEEL

CROSS REFERENCE TO RELATED APPLICATIONS

This application claims the benefit under 35 U.S.C. Section 371, of PCT International Application Number PCT/JP2006/316363 filed on Aug. 22, 2006, and also the following Japanese Applications:

2005-239990 filed on Aug. 22, 2005;
2005-239991 filed on Aug. 22, 2005;
2005-239992 filed on Aug. 22, 2005;
2005-258109 filed on Sep. 6, 2005; and
2005-269338 filed on Sep. 16, 2005 in Japan, the contents of which are incorporated herein by reference.

BACKGROUND OF THE INVENTION

1. Field of the Invention

The present invention relates to a sensor-incorporated wheel support bearing assembly having a load sensor for detecting a load acting on a bearing portion of a wheel.

2. Description of the Prior Art

For safety travel of an automotive vehicle, the wheel support bearing assembly equipped with a sensor for detecting the rotational speed of one of automotive wheels has hitherto been well known in the art. While the automotive traveling safety precaution is hitherto generally taken by detecting the rotational speed of a wheel of various parts, but it is not sufficient with the detection of only the rotational speed of the wheel and, therefore, it is required to achieve a safety control of the automotive vehicle with the use of other sensor signals.

In view of this, it may be contemplated to achieve a posture control based on a load acting on each of wheels during travel of an automotive vehicle. By way of example, a large load acts on the outside wheels during the cornering, on the wheels on one side during the run along left and right inclined road surfaces or on the front wheels during the breaking and, thus, a varying load acts on the vehicle wheels. Also, in the case of the uneven live load, the loads acting on those wheels tend to become uneven. For this reason, if the loads acting on the wheels can be detected as needed, suspension systems for the vehicle wheels can be controlled beforehand based on results of detection of the loads so that the posture of the automotive vehicle during the traveling thereof (for example, prevention of a rolling motion during the cornering, prevention of downward settling of the front wheels during the breaking, and prevention of downward settling of the vehicle wheels brought about by the uneven distribution of live loads) can be controlled. However, no space for installation of the load sensor for detecting the load acting on the respective vehicle wheel is available and, therefore, the posture control through the detection of the load can hardly be realized.

Also, in the event that in the near future the steer-by-wire is introduced to provide the system, in which the wheel axle and the steering come not to be coupled mechanically with each other, and such system is increasingly used, information on the road surface comes to be required to transmit to the steering wheel held by a driver by detecting a load acting in a direction of the wheel axis.

In order to meet those needs, the wheel support bearing assembly has been suggested, in which a strain gauge is affixed to an outer race of the wheel support bearing assembly so that the strain gauge can detect a strain acting on the outer race (See, for example, the Japanese Laid-open Patent Publication No. 2003-530565, published Oct. 14, 2003).

However, since the outer race of the wheel support bearing assembly has at least one raceway defined therein and therefore must have a sufficient strength and also since it is manufactured through complicated process steps including metal forming, turning, heat treatment and grinding, the affixing of the strain gauge to the outer race is not efficient in productivity and is costly when it comes to mass production thereof. It is difficult to detect a strain on the outer race with good sensitivity.

In order to improve productivity, attempts have been made to fit a ring member to the peripheral surface of the outer race and to affix the strain gauge to the ring member. However, the detection of a strain on the outer race with good sensitivity has not been yet achieved.

SUMMARY OF THE INVENTION

An object of the present invention is to provide a sensor-incorporated wheel support bearing assembly, in which a load sensor can be installed compactly in an automotive vehicle, in which a load acting on a wheel of the automotive vehicle can be detected with good sensitivity and in which the cost during the mass production can be reduced.

A sensor-incorporated wheel support bearing assembly according to the present invention includes an outer member having an inner peripheral surface formed with a plurality of raceways; an inner member having an outer peripheral surface formed with a plurality of raceways in face-to-face relation with the raceways in the outer member; a plurality of rows of rolling elements interposed between the raceways in the outer member and the raceways in the inner member, respectively; and a sealing device for sealing an end of a bearing space delimited between the outer member and the inner member, in which one of the outer member and inner member, which serves as a stationary member, is fitted with a ring member on a peripheral surface or an end face thereof, the ring member having at an intermediate portion thereof a first non-contact ring portion not in contact with the stationary member, at one end a first contact ring portion in contact with the stationary member, and at the other end either of the following portions (A) or (B): (A) a second non-contact ring portion not in contact with the stationary member and having a wall thickness greater than that of the first non-contact ring portion; (B) a second contact ring portion in contact with the stationary member; and in which in the case of (A), the first contact ring portion is fitted with a sensor for measuring a strain on the ring member, and in the case of (B), the sensor for detecting a strain on the ring member is fitted to one of the first non-contact ring portion and the first contact ring portion, which has the smallest wall thickness.

When during the travel of the automotive vehicle a load acts on the rotating member, the stationary member is deformed through the rolling elements, and the deformation brings about a strain on the ring member. The strain sensor provided in the ring member detects the strain on the ring member. By determining the relation between the strain and the load in advance from experiments and simulations, the load acting on the wheel can be detected from an output of the strain sensor. In other words, by using the output of the strain sensor, the external force acting on the wheel support bearing assembly, the road force acting between the tire and the road surface, or the amount of preload on the wheel support bearing assembly can be estimated. Also, the load so detected can be used for the vehicle control in the automotive vehicle.

Since the sensor-incorporated wheel support bearing assembly has the strain sensor provided in the ring member fitted to the peripheral surface of the stationary member, the load sensor can be mounted compactly on the automotive vehicle. Also, since the ring member is a simple component part adapted to be fitted to the stationary member, the provision of the strain sensor in the ring member results in excellent mass productivity and reduction of the cost.

The sensor for measuring a strain on the ring portion fitted to the first non-contact ring portion may be a sensor for measuring an axial strain on the ring member. When the ring portion has (A), since the second non-contact ring portion is a thick-walled portion having a wall thickness greater than that of the first non-contact ring portion, the portion has high rigidity and is hard to be deformed. A strain occurring between the thick-walled portion and the first contact ring portion represents a transferred and enlarged radial strain on the stationary member. When the ring portion has (B), since the first contact ring portion and the second contact ring portion have greater wall thickness than that of the first non-contact ring portion, those portions have high rigidity and are hard to be deformed whereas the first non-contact ring portion has low rigidity and is easy to be deformed. Accordingly, an axial strain is caused on the first non-contact ring portion, which represents a transferred and enlarged axial strain on the stationary member, whereby the deformation of the stationary member can be detected with good sensitivity by the sensor provided in the first non-contact ring portion to increase the detection accuracy.

The second non-contact ring portion may include a flange portion protruding radially in a direction opposite to the first contact ring portion. Since of the first and second non-contact ring portions, the second non-contact ring portion remote from the first contact ring portion is the flange portion, the flange portion has high rigidity and is hard to be deformed. Therefore a strain occurring between the flange portion and the first contact ring portion represents a transferred and enlarged radial strain on the stationary member, whereby the strain on the stationary member can be detected with good sensitivity to increase the detection accuracy.

The sensor for measuring a strain on the ring portion fitted to the first contact ring portion may be a sensor for measuring a bending strain. The first contact ring portion having small wall thickness is deformed according to the deformation of the stationary member, while the second contact ring portion and the first non-contact ring portion, those portions have high rigidity and are hard to be deformed. Accordingly, a bending strain is caused on the first contact ring portion having small wall thickness, which represents a transferred and enlarged axial strain on the peripheral surface of the stationary member, whereby the deformation of the stationary member can be detected with good sensitivity by the sensor provided in the first contact ring portion having small wall thickness to increase the detection accuracy.

Preferably, the ring member is not plastically deformable during press-fitting onto the stationary member. More preferably, under an expected maximum value of the external force acting on the wheel support bearing assembly or the road force acting between the tire and the road surface, the ring member is not plastically deformable or no clearance is formed between the ring member and the stationary member.

Where the ring member is not plastically deformed at press-fit and is not plastically deformed at the expected maximum value of each of the acting forces such as the external force acting on the wheel support bearing assembly, and no clearance is formed between the ring member and the stationary member, the deformation of the stationary member can be accurately transmitted to the ring member, resulting in detection of a strain on the stationary member at high accuracy.

The ring member may be a pressed product, whereby the cost can be reduced.

In the present invention, preferably, the sealing device may be provided in the ring member. Since the sealing device is provided in the ring member and the ring member serves as the core metal of the sealing device, the sensor-incorporated wheel support bearing assembly can be compact in the axial direction and can have a seal function at low cost, whereby the cost can be reduced.

When the second non-contact ring portion is a flange portion projected in the diameter direction opposite the first contact ring portion, the ring member may be fitted to the end face of the stationary member and the sensor for measuring a strain may be a strain sensor for measuring an axial strain on the ring member.

In the present invention, the ring member may be fitted to the end face of the stationary member, and the sensor for measuring a strain may be fitted to the first non-contact ring portion in the case of (A) and may be a strain sensor for measuring an axial strain on the ring member.

In the present invention, the ring member may be fitted to the end face of the stationary member, and the sensor for measuring a strain may be fitted to the first non-contact ring portion in the case of (B) and may be a strain sensor for measuring a bending strain on the ring member.

In the present invention, the ring member may be fitted to the end face of the stationary member, and the sensor for measuring a strain may be fitted to the first contact ring portion in the case of (B) and may be a strain sensor for measuring an axial strain on the ring member.

As described above, when the ring member is fitted to the end face out of the peripheral surface and the end face of the stationary member, since the end face of the stationary member has a smaller wall thickness than that of the other portions of the stationary member and has low rigidity, the end face tends to be greatly deformed. As a result, the deformation of the stationary member is transmitted to the ring member or the sensor mounting member, allowing the strain on the stationary member to be detected with the strain sensor with good sensitivity.

Also, the periphery of the end face of the stationary member has small quantity of other component parts and a relatively large space. Accordingly, the degree of freedom of the design of the ring member or the sensor mounting member is high whereby these members can have a shape suitable for detecting the strain on the stationary member with good sensitivity. Additionally, those members can be easily fitted to the stationary member.

Further, by providing the strain sensor for measuring a strain in the axial direction or a bending strain in each of the fitting portions, a strain on the stationary member in the diameter direction can be detected with good sensitivity.

In the present invention, the sensor may include an insulating film provided on the surface of the ring member and a resistive element for measuring a strain on the ring member formed on the insulating film by means of a surface treatment.

In the present invention, the sensor for measuring a strain may include an insulating film provided on a surface of the first non-contact ring portion in the case of (A) and a resistive element for measuring a strain on the ring member formed on the insulating film by means of a surface treatment, and may be a strain sensor for measuring an axial strain on the ring member.

When the second non-contact ring portion includes the flange portion protruding radially in a direction opposite to the first contact ring portion, the sensor for measuring a strain may include an insulating film provided on a surface of the first non-contact ring portion and a resistive element for measuring a strain on the ring member formed on the insulating film by means of a surface treatment, and in which the sensor may be a strain sensor for measuring an axial strain on the ring member.

In the present invention, the sensor for measuring a strain may include an insulating film provided on a surface of the first non-contact ring portion in the case of (B) and a resistive element for measuring a strain on the ring member formed on the insulating film by means of a surface treatment, and in which the sensor may be a strain sensor for measuring an axial strain on the ring member.

In the present invention, the sensor for measuring a strain may include an insulating film provided on a surface of the first non-contact ring portion in the case of (B) and a resistive element for measuring a strain on the ring member formed on the insulating film by means of a surface treatment, and in which the sensor may be a strain sensor for measuring a bending strain on the ring member.

As described above, when the resistive elements for detecting a strain is mounted on the sensor mounting member fitted to the stationary member, the load sensor can be mounted compactly on the automotive vehicle. Also, since the sensor mounting member is a simple component part designed to be fitted to the stationary member, the provision of the resistive elements in the sensor mounting member results in excellent mass productivity and reduction of the cost.

Also, as described above, since the sensor-incorporated wheel support bearing assembly employs, as the strain detector, the resistive elements for detecting a strain which is formed on the insulating film provided on the surface of the sensor mounting member, instead of utilizing the strain sensor as a complete product, the sensor unit can be manufactured at low cost. When the surface and the peripheries of the resistive elements are coated by a coating film, the resistive elements are firmly fixed to the sensor mounting member for preventing the resistive elements from falling off or being displaced. Accordingly, the reliability for maintaining the detection function can be increased.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

FIG. 21 is a diagram of the outer member and the sensor unit of the sensor-incorporated wheel support bearing assembly according to the ninth embodiment in a front view from the inboard side.

FIG. 22A is a transverse sectional view of the sensor unit employed in the ninth embodiment.

FIG. 22B is an enlarged view of an important portion of the sensor unit shown in FIG. 22A.

DETAILED DESCRIPTION OF THE EMBODIMENTS

Figure 1:
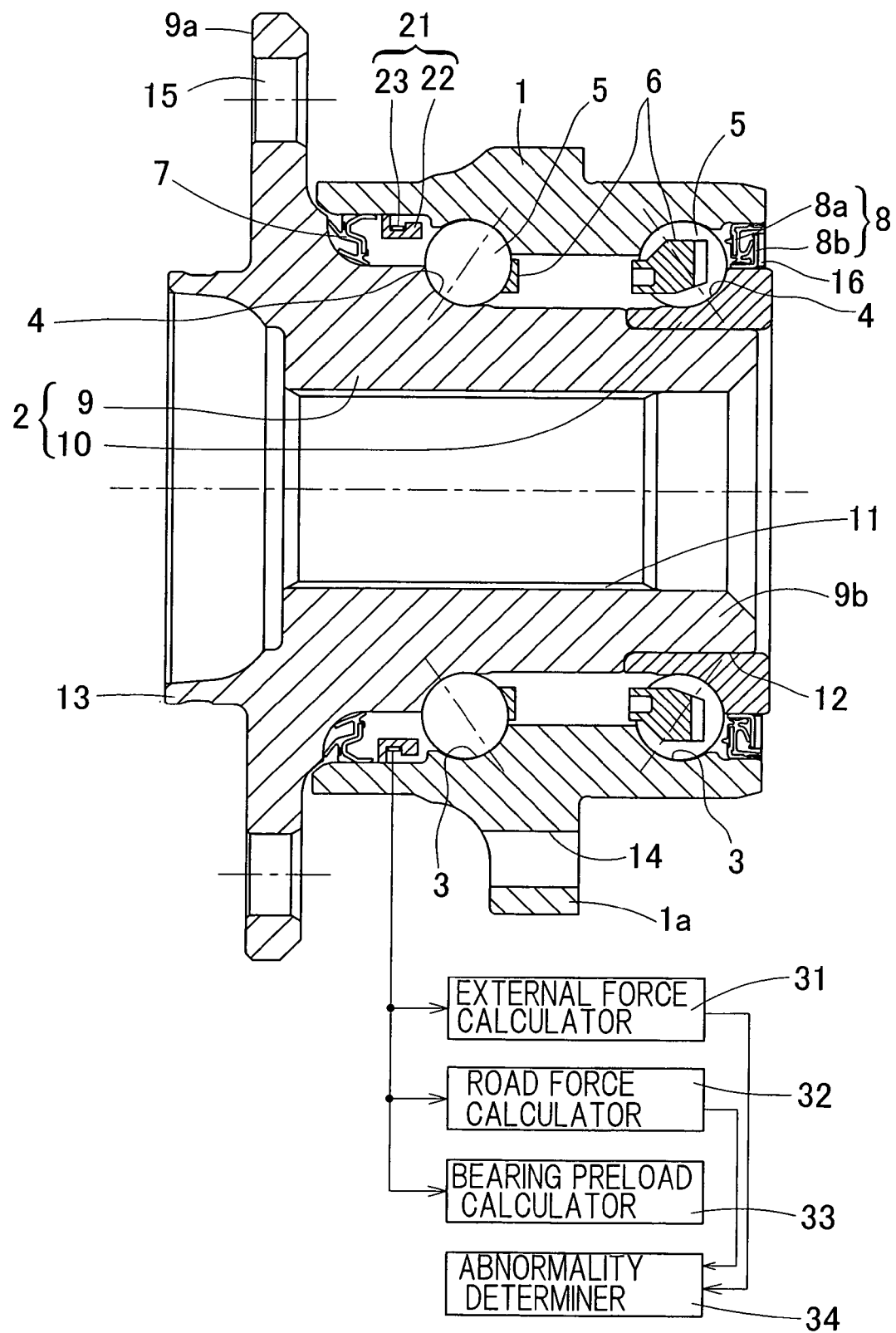
FIG. 1 is an explanatory diagram shown together with a longitudinal sectional view of a sensor-incorporated wheel support bearing assembly according to a first preferred embodiment of the present invention and also with a block diagram showing a conceptual structure of a detecting system for the bearing assembly.
Figure 2:
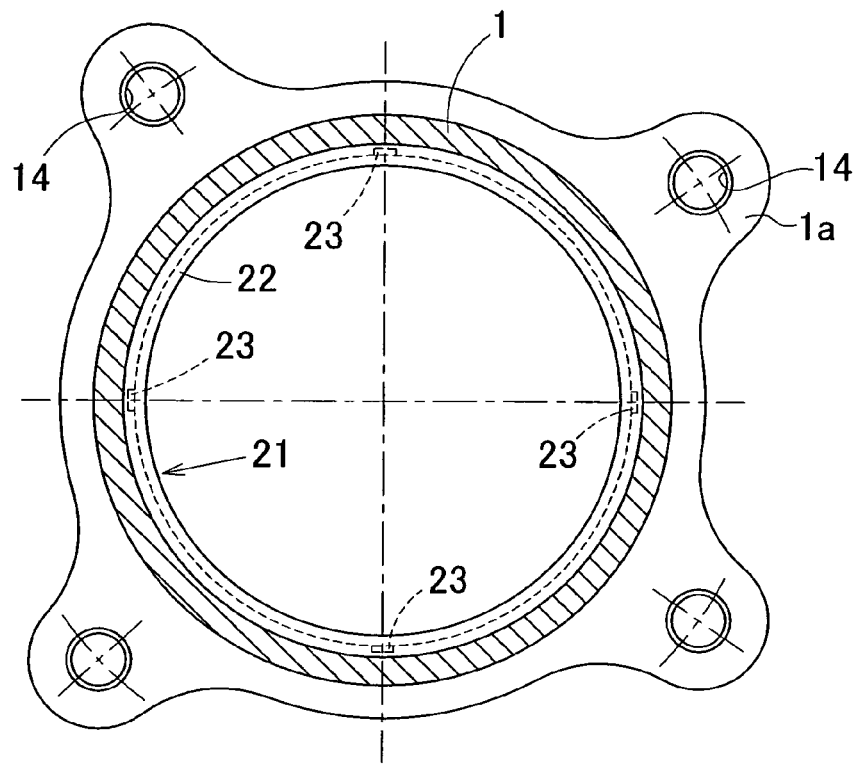
FIG. 2 is a partial sectional front view showing an outer member and a sensor unit of the sensor-incorporated wheel support bearing assembly according to the first embodiment.
Figure 3A:
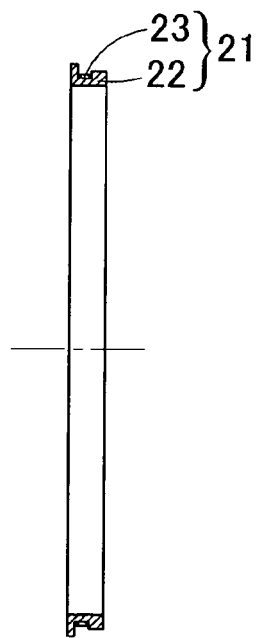
FIG. 3A is a transverse sectional view of the sensor unit employed in the first embodiment.
Figure 3B:
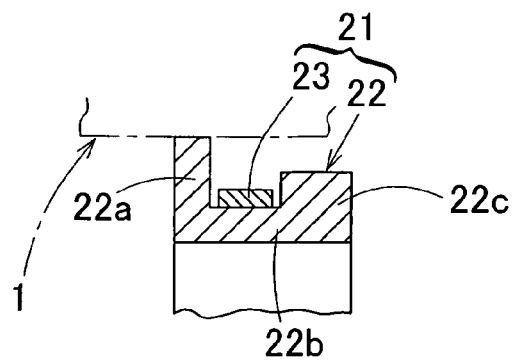
FIG. 3B is an enlarged view of an important portion of the sensor unit shown in FIG. 3A.

A first preferred embodiment of the present invention will be described with particular reference to FIGS. 1 to 3A, 3B. This embodiment is directed to a wheel support bearing assembly for rotatably supporting a drive wheel of an automotive vehicle, which assembly is an inner-race rotating type of a third generation model. It is to be noted that in the specification herein set forth, the terms "outboard" and "inboard" represent one side of the vehicle body away from the longitudinal center of the vehicle body and the other side of the vehicle body close to the longitudinal center of the vehicle body, respectively.

The sensor-incorporated wheel support bearing assembly shown therein includes an outer member 1 having an inner peripheral surface formed with a plurality of raceways 3, an inner member 2 having an outer peripheral surface formed with double rows of raceways 4 opposed to those raceways 3, and a plurality of rows of rolling elements 5 interposed between the raceways 3 in the outer member 1 and the raceways 4 in the inner member 2. The wheel support bearing assembly is in the form of a double row angular contact ball bearing. The rolling elements 5 are in the form of balls and are retained by a retainer 6 employed for each row of those rolling elements 5. Each of the raceways 3 and 4 represents an arcuate shape in portion and the raceways 3 and 4 are so formed as to have respective contact angles held in back-to-back relation with each other. Both ends of a bearing space delimited between the outer member 1 and the inner member 2 are sealed by respective sealing devices 7 and 8.

The outer member 1 serves as a stationary member and is formed as an unitary member having on an outer peripheral surface thereof a flange 1a adapted to be fitted to a knuckle in a suspension system (not shown) of an automotive vehicle body structure. The flange 1a is formed with a plurality of vehicle body mounting holes 14 spaced circumferentially from each other.

The inner member 2 is a member that serves as a rotating member and is made up of a hub axle 9 having a wheel mounting hub flange 9a and an inner race 10 mounted fixedly on the outer peripheral surface at an inboard end of an axial portion 9b of the hub axle 9. The raceways 4 are formed in the hub axle 9 and the inner race 10, respectively. A portion of the outer peripheral surface at the inboard end of the hub axle 9 is radially inwardly stepped or decreased in diameter to define an inner race mounting area 12, on which the inner race 10 is fixedly mounted. The hub axle 9 has a radial center portion formed with a throughhole 11. The hub flange 9a is formed with a plurality of press-fitting holes 15 spaced circumferentially from each other, into which hub bolts (not shown) are press-fitted. The hub axle 9 is provided, in the vicinity of a root of the hub flange 9a, with a cylindrical pilot portion 13 for guiding the wheel and brake component parts (not shown), protruding axially in an outboard direction from the hub axle 9.

A sensor unit 21 is provided on the inner peripheral surface of the outer member 1 at the outboard end thereof. The sensor unit 21 axially positioned at a location between the sealing device 7 and the raceways 3. The sensor unit 21 includes a ring member 22 and a plurality of strain sensors 23 affixed to the ring member 22 for measuring a strain on the ring member 22. The strain sensors 23 are equally spaced in a direction circumferentially of the ring member 22 and, in this embodiment, four strain sensors 23 are positioned on upward side, downward side, leftward side and rightward side, respectively, of the wheel support bearing assembly.

The ring member 22 of the sensor unit 21 is press-fitted onto the inner peripheral surface of the outer member 1. The ring member 22 is formed of a shape and material not plastically deformable during the press-fitting process. As the material of the ring member 22, a steel material or other metal materials such as copper, brass, or aluminum, can be used. The ring member 22 is obtained by pressing a plate material made of those metal materials or is obtained by machining those metal materials.

The ring member 22 has, as represented by a sectional shape shown in FIG. 3, a contact ring portion (a first contact ring portion) 22a in contact with the inner peripheral surface of the outer member 1, a non-contact ring portion (a first non-contact ring portion) 22b not in contact with the inner peripheral surface of the outer member 1 and extending axially of the ring member 22, and a thick-walled portion (a second non-contact ring portion) 22c having a wall thickness greater than that of the first non-contact ring portion 22b and the first contact ring portion 22a and positioned adjacent to the first non-contact ring portion 22b on the side remote from the contact ring portion 22a.

The strain sensors 23 for measuring an axial strain on the ring member 22 are affixed to the outer peripheral surface of the non-contact ring portion 22b formed at in intermediate portion between the contact ring portion 22a and the thick-walled portion 22c (the bottom portion of a groove shaped portion between the contact ring portion 22a and the thick-walled portion 22c), that is, the first non-contact ring portion 22b.

As shown in FIG. 1, as devices for processing the output of the sensor unit 21, an external force calculator 31, a road force calculator 32, a bearing preload calculator 33, and an abnormality determiner 34 are provided. The respective devices 31 to 34 may be arranged in an electronic circuit unit (not shown) such as a circuit board fitted to, for example, the outer member 1 of the wheel support bearing assembly or in an electric control unit (ECU) of the automotive vehicle.

The sealing device 8 on the inboard side includes a seal 8a fitted to the inner peripheral surface of the outer member 1, made of an elastic member such as rubber having a core metal, and a slinger 8b fitted to the outer peripheral surface of the inner race 10, with which the seal 8a contacts. The slinger 8b is provided with a magnetic encoder 16 for detecting a rotation made up of a multipolar magnet having a plurality of magnetic poles alternating in the direction circumferentially thereof. A magnetic sensor (not shown) is fitted to the outer member 1 so as to confront the magnetic encoder 16.

The operation of the sensor-incorporated wheel support bearing assembly of the structure discussed above will be described. Under the effect of a load acting on the hub axle 9, the outer member 1 is deformed through the rolling elements 5 and the deformation of the outer member 1 is transmitted to the ring member 22 fitted to the inner peripheral surface of the outer member 1 to deform the ring member 22. The deformation or a strain on the ring member 22 is measured with the strain sensors 23. In this case, since the second non-contact ring portion 22c remote from the contact ring portion 22a of the ring member 22 is formed as the thick-walled portion 22c having a wall thickness greater than other portions, this portion has high rigidity and is hard to be deformed. Accordingly, the strain occurring between the thick-walled portion 22c and the contact ring portion 22a represents a transferred and enlarged radial strain on the outer member 1. Therefore, the strain sensors 23 can detect the deformation of the outer member 1 with good sensitivity, resulting in increase of the strain measurement accuracy.

Changes in the strain are different depending on the direction or magnitude of the load. By determining the relation between the strain and the load in advance from experiments and simulations, the external force acting on the wheel support bearing assembly or the road force acting between the tire and the road surface can be calculated. The external force calculator 31 and the road force calculator 32 calculate the external force acting on the wheel support bearing assembly and the road force acting between the tire and the road surface, respectively, from the outputs of the strain sensors 23, based on the relation between the strain and the load which has been predetermined from experiments and simulations.

The abnormality determiner 34 is operable to output an abnormality signal to the outside when it is determined that the external force acting on the wheel support bearing assembly, or the road force acting between the tire and the road surface obtained as described above exceeds a predetermined tolerance value. This abnormality signal can be used for the vehicle control of the automotive vehicle.

Also, by outputting, on a real time basis, the external force acting on the wheel support bearing assembly and the road force acting between the tire and the road surface from the external force calculator 31 and the road force calculator 32, respectively, the automotive vehicle can be controlled more precisely and flexibly.

Yet, since the preload is imposed on the wheel support bearing assembly through the inner race 10, the ring member 22 is deformed by the effect of such preload. For this reason, by determining the relation between the strain and the preload in advance from experiments and simulations, the condition of the preload in the wheel support bearing assembly can be ascertained. The bearing preload calculator 33 is utilized to output a bearing preload through output of the strain sensors 23 based on the relation between the strain and the preload which has been predetermined from experiments and simulations. In addition, when the preload outputted from the bearing preload calculator 33 is utilized, the preload to be applied during assembling of the wheel support bearing assembly can be easily adjusted.

Even when a maximum expected load is applied to the wheel support bearing assembly, the ring member 22 should not be plastically deformed and should not be detached form the ring member 22 so as to form no clearance in a coupling portion between the ring member 22 and the inner peripheral surface of the outer member 1. When the plastic deformation is caused or the clearance is formed in the coupling portion between the ring member 22 and the inner peripheral surface of the outer member 1, the deformation of the outer member 1 is not accurately transmitted to the ring member 22, which affects measurement of the strain.

For the same reason, in order to prevent occurrence of the clearance and slip in the coupling portion between the ring member 22 and the inner peripheral surface of the outer member 1, bonding may be used in the coupling portion between the ring member 22 and the inner peripheral surface of the outer member 1. Although not shown, a bolt may be also used for coupling the ring member 22 to the inner peripheral surface of the outer member 1.

FIGS. 4 to 6A, 6B show a second preferred embodiment of the present invention which is similar to the first embodiment except that the shape of the ring member 22 constituting the sensor unit 21 is different therefrom. In other words, the second embodiment is similar to the first embodiment in that the ring member 22 has, as best shown by the transverse sectional shape thereof, the contact ring portion (the first contact ring portion) 22a in contact with the inner peripheral surface of the outer member 1 and the non-contact ring portion (the first non-contact ring portion) 22b not in contact with the inner peripheral surface of the outer member 1 and extending axially of the ring member 22, but is different from the first embodiment in that the ring member 22 has a flange portion 22d (the non-contact ring portion) protruding radially inwardly, and positioned adjacent to the first non-contact ring portion 22b on the side remote from the contact ring portion 22a. In this case, the strain sensors 23 for measuring an axial strain on the ring member 22 are affixed to the outer peripheral surface of the non-contact ring portion 22b between the contact ring portion 22a and the flange portion 22d (the outer peripheral surface of a cylindrical portion between the contact ring portion 22a and the flange portion 22d), that is, the first non-contact ring portion 22b.

In this embodiment, as described above, under the effect of a load acting on the hub axle 9, the outer member 1 is deformed through the rolling elements 5 and the deformation of the outer member 1 is transmitted to the ring member 22 fitted to the inner peripheral surface of the outer member 1 resulting in deformation of the ring member 22. In the sensor unit 21 employed in this embodiment, since the portion of the non-contact ring portion 22b remote from the contact ring portion 22a has the flange portion 22d protruding radially inwardly, the flange portion 22d has high rigidity and is hard to be deformed. Accordingly, the strain occurring between the flange portion 22d and the contact ring portion 22a represents a transferred and enlarged radial strain on the outer member 1. Therefore, as described above, the strain measurement at high accuracy can be expected.

Figure 4:
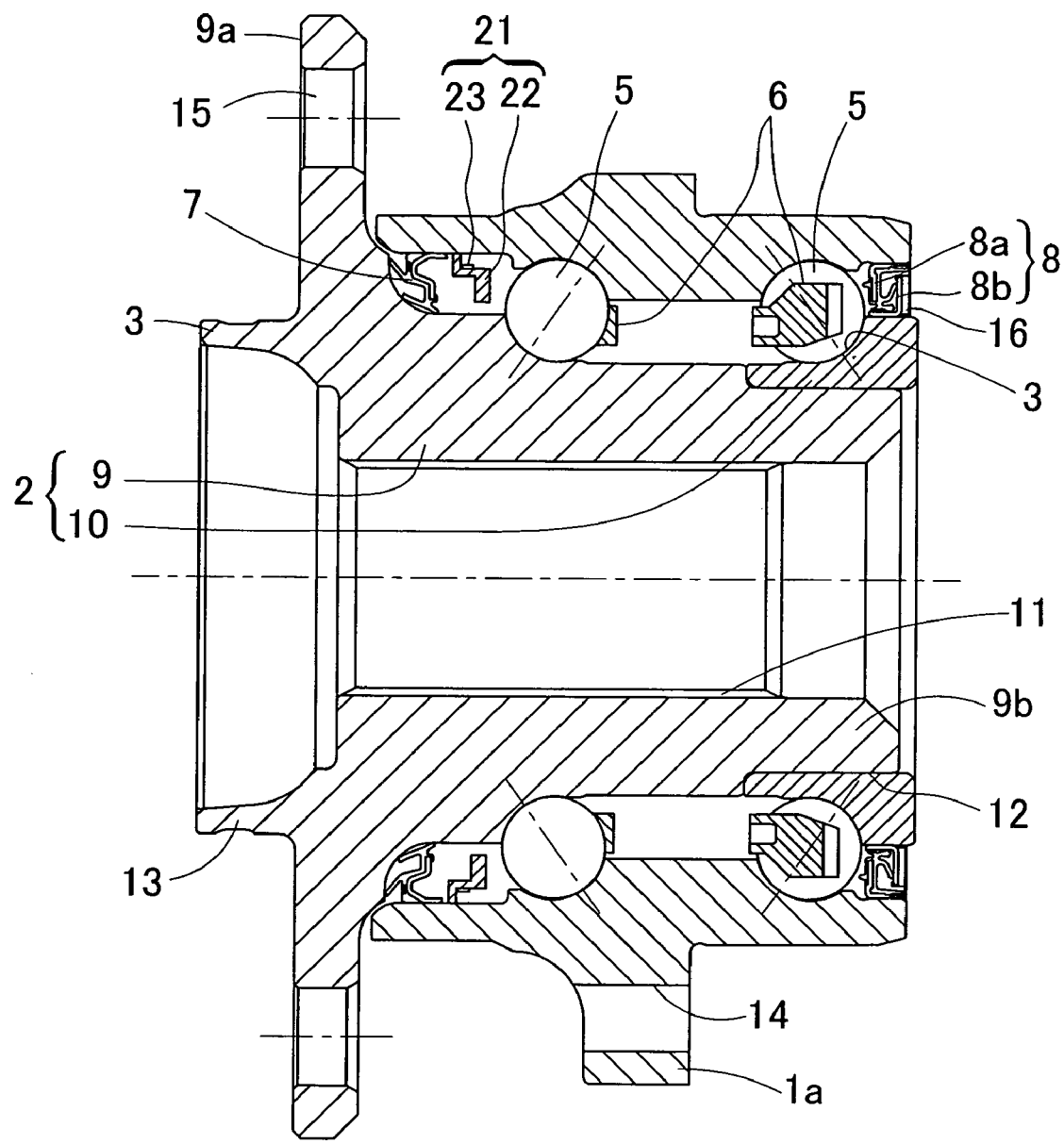
FIG. 4 is a longitudinal sectional view of the sensor-incorporated wheel support bearing assembly according to a second preferred embodiment of the present invention.
Figure 5:
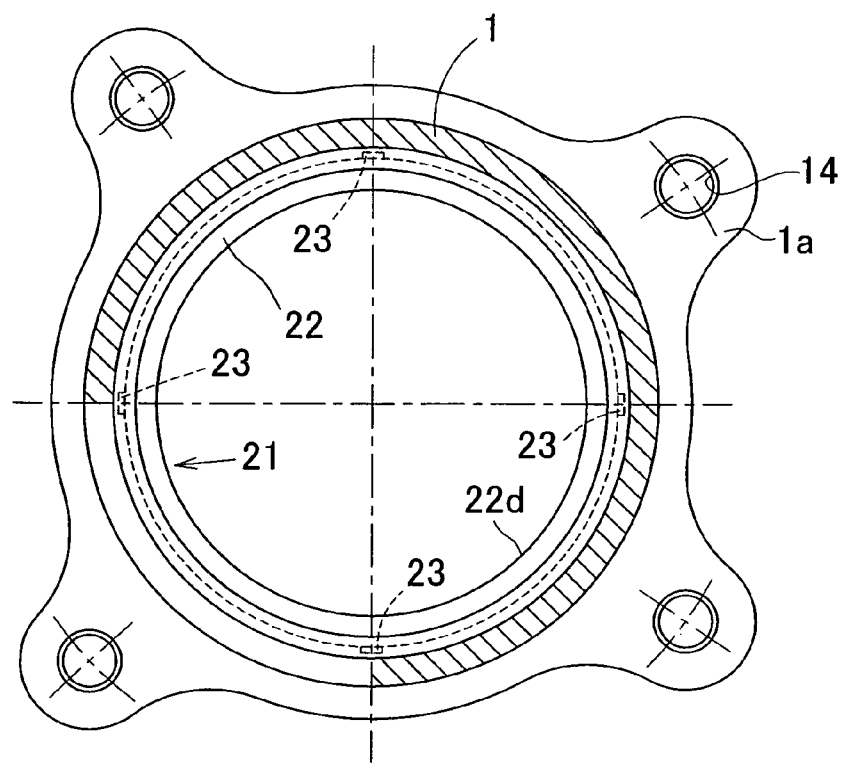
FIG. 5 is a partial sectional front view showing the outer member and the sensor unit of the sensor-incorporated wheel support bearing assembly according to the second embodiment.
Figure 6A:
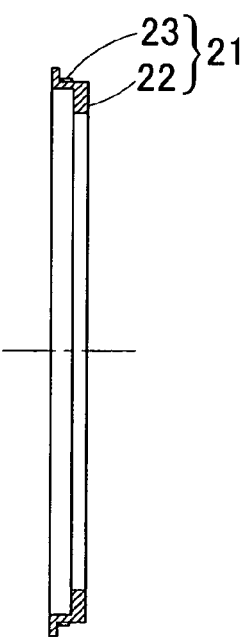
FIG. 6A is a transverse sectional view of the sensor unit employed in the second embodiment.
Figure 6B:
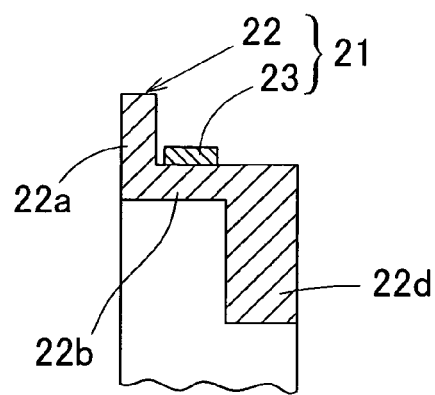
FIG. 6B is an enlarged view of an important portion of the sensor unit shown in FIG. 6A.

Although not shown in FIG. 4, the strain sensors 23 may be provided with the external force calculator 31, the road force calculator 32, the bearing preload calculator 33, and the abnormality determiner 34 as described above for processing the output of the sensor unit 21. Other structural features of the second embodiment are substantially similar to those of the first embodiment. Common parts are indicated by like reference numerals and the description thereof is omitted.

A third preferred embodiment of the present invention will be described with particular reference to FIGS. 7 to 9A, 9B. In this embodiment, the description for the structure common to the first or second embodiment is omitted.

Figure 7:
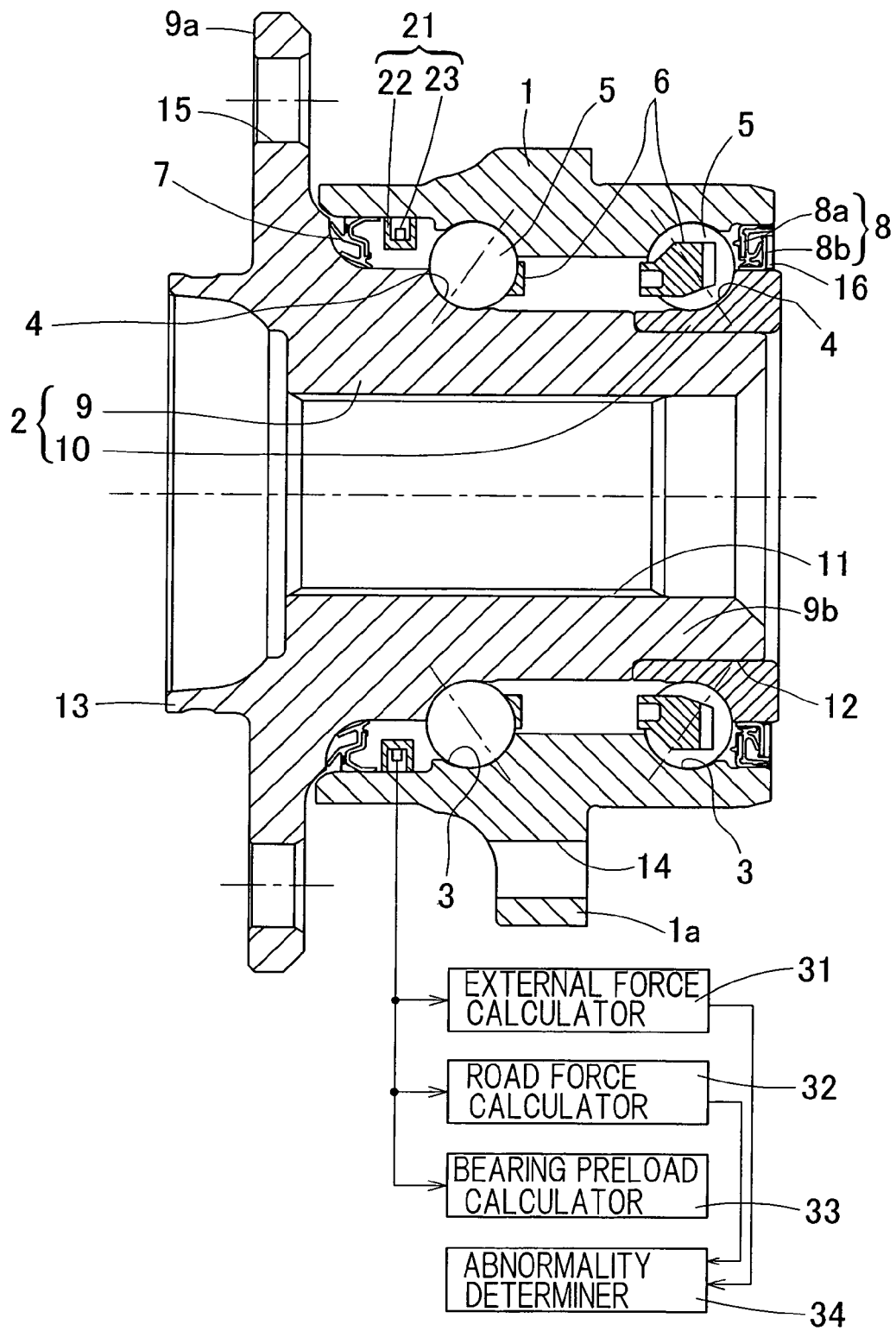
FIG. 7 is an explanatory diagram shown together with a longitudinal sectional view of a sensor-incorporated wheel support bearing assembly according to a third preferred embodiment of the present invention and also with a block diagram showing a conceptual structure of a detecting system for the bearing assembly.
Figure 8:
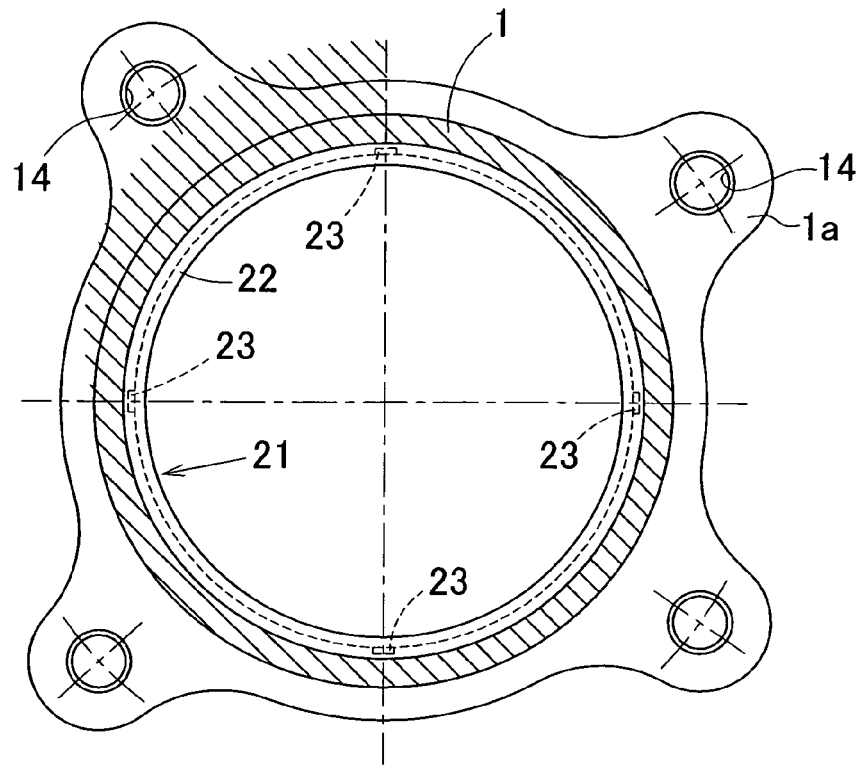
FIG. 8 is a partial sectional front view showing the outer member and the sensor unit of the sensor-incorporated wheel support bearing assembly according to the third embodiment.
Figure 9A:
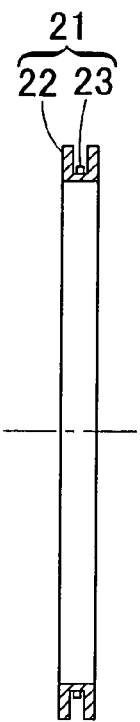
FIG. 9A is a transverse sectional view of the sensor unit employed in the third embodiment.
Figure 9B:
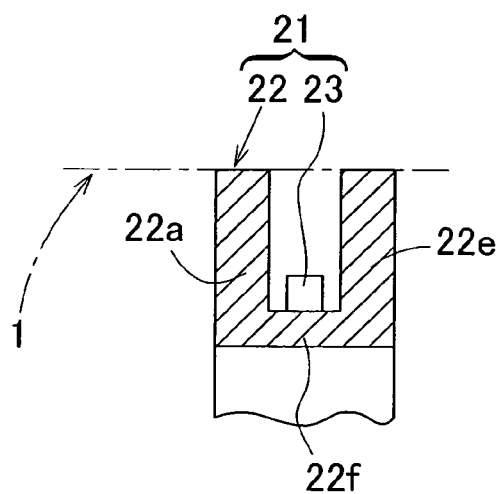
FIG. 9B is an enlarged view of an important portion of the sensor unit shown in FIG. 9A.

As shown in FIGS. 7 and 9B, the transverse sectional shape of the ring member 22 is represented by a grooved shape having contact ring portions 22a and 22e (the first contact ring portion 22a and a second contact ring portion 22e) in contact with the inner peripheral surface of the outer member 1 and a non-contact ring portion (a first non-contact ring portion) 22f not in contact with the inner peripheral surface of the outer member 1. The non-contact ring portion 22f forms a bottom wall portion of the grooved shape and the contact ring portions 22a and 22e form respective side wall portions on both sides of the groove shape. The contact ring portions 22a and 22e on both sides have greater wall thickness than the non-contact ring portion 22f. Here, the wall thickness of the non-contact ring portion 22f is referred to as the thickness in the radial direction and the wall thickness of the contact ring portions 22a and 22e is referred to as the thickness in the axial direction.

The strain sensors 23 for measuring an axial strain on the ring member 22 are affixed to the outer peripheral surface of the non-contact ring portion 22f, that is, the inner bottom surface of the ring member 22.

The operation of the sensor-incorporated wheel support bearing assembly of the structure discussed above will be described. Similar to the first and second embodiments, under the effect of a load acting on the hub axle 9, the outer member 1 is deformed through the rolling elements 5 and the deformation is transmitted to the ring member 22 fitted to the inner peripheral surface of the outer member 1 to deform the ring member 22. The strain on the ring member 22 is measured by the strain sensors 23. In this case, the non-contact ring portion 22f is deformed mainly according to the deformation of the outer member 1 in the axial direction. On the other hand, the contact ring portions 22a and 22e have greater wall thickness than the non-contact ring portion 22c, have high rigidity and are hard to be deformed. Accordingly, an axial strain is caused on the non-contact ring portion 22c, which represents a transferred and enlarged axial strain on the inner peripheral surface of the outer member 1, whereby the strain measurement accuracy of the sensors 23 can be increased.

FIGS. 10 to 12A, 12B show a fourth preferred embodiment of the present invention, which is similar to the third embodiment except that the shape of the ring member 22 constituting the sensor unit 21 is different therefrom and positions to which the sensors 23 are fitted. The fourth embodiment is similar to the third embodiment in that the transverse sectional shape of the ring member 22 is represented by a grooved shape having contact ring portions 22g and 22h (a first contact ring portion 22g and a second contact ring portion 22h) in contact with the inner peripheral surface of the outer member 1 and a non-contact ring portion (a first non-contact ring portion) 22i not in contact with the inner peripheral surface of the outer member 1. In the ring member 22 of this embodiment, of the contact ring portions 22g and 22h on both sides, the contact ring portion 22h has a wall thickness greater than that of the contact ring portion 22g. The non-contact ring portion 22i has a wall thickness greater than those of the contact ring portions 22g and 22h.

The strain sensors 23 for measuring a strain on the ring member 22 in a bending direction are affixed to the inner surface of the contact ring portion 22g having a smaller wall thickness, that is, the surface opposed to the contact ring portion 22h.

According to this embodiment, similarly to the first to third embodiments, under the effect of a load acting on the hub axle 9, the outer member 1 is deformed through the rolling elements 5 and the deformation is transmitted to the ring member 22 fitted to the inner peripheral surface of the outer member 1 to deform the ring member 22. In the sensor unit 21 employed in this embodiment, the contact ring portion 22g having the strain sensors 23 affixed thereto is deformed mainly according to the deformation of the outer member 1 in the axial direction. On the other hand, since the contact ring portion 22*h* and the non-contact ring portion 22*i* have respective wall thicknesses greater than that of the contact ring portion 22*g*, the contact ring portion 22*h* and the non-contact ring portion 22*i* have high rigidity and are hard to be deformed. Therefore the bending strain occurs on the contact ring portion 22*g* having smaller wall thickness, which represents a transferred and enlarged axial strain on the inner peripheral surface of the outer member 1. Because of this, similarly to the third embodiment, the strain measurement at high accuracy can be expected.

Figure 10:
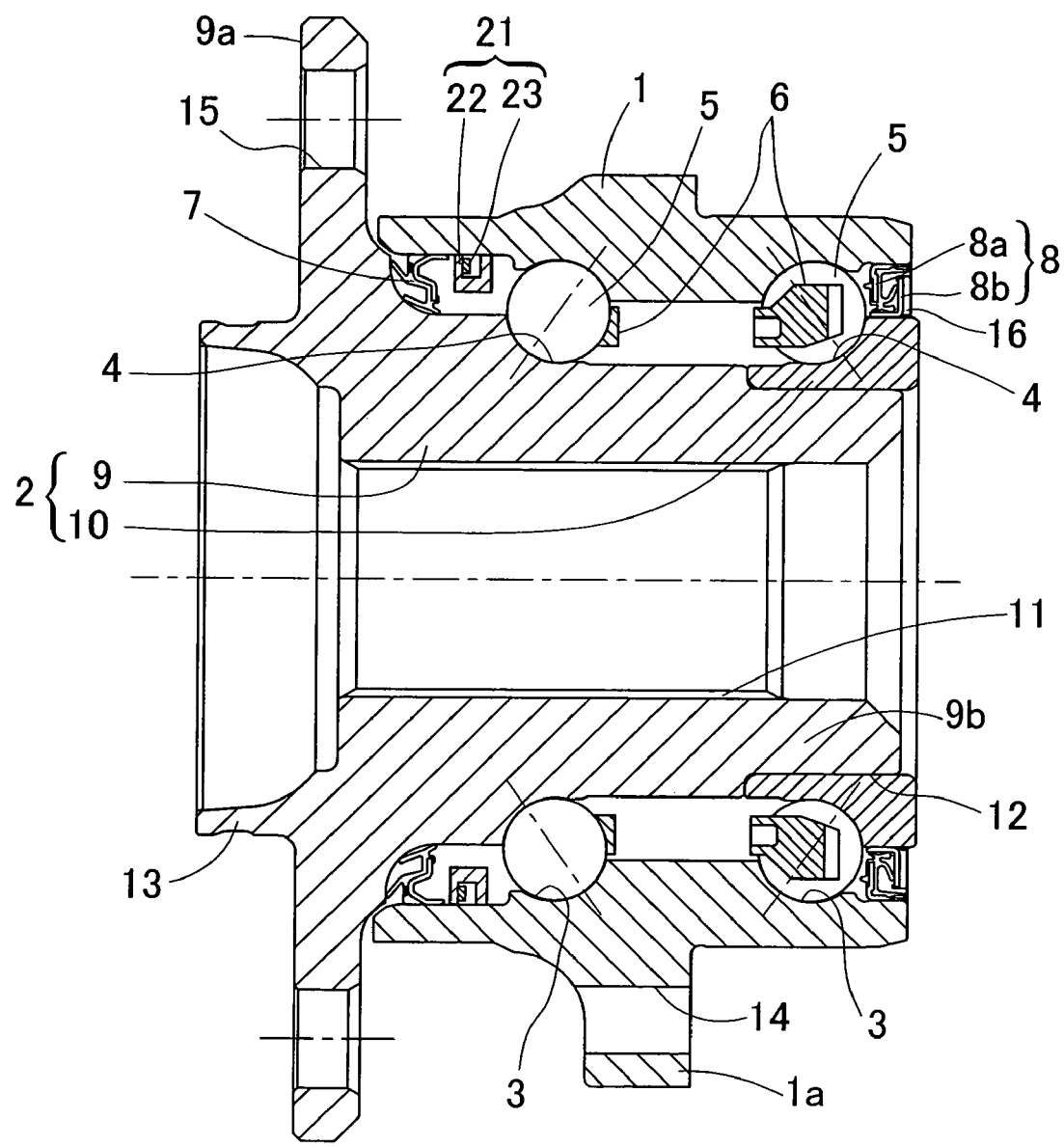
FIG. 10 is a longitudinal sectional view of the sensor-incorporated wheel support bearing assembly according to a fourth preferred embodiment of the present invention.
Figure 11:
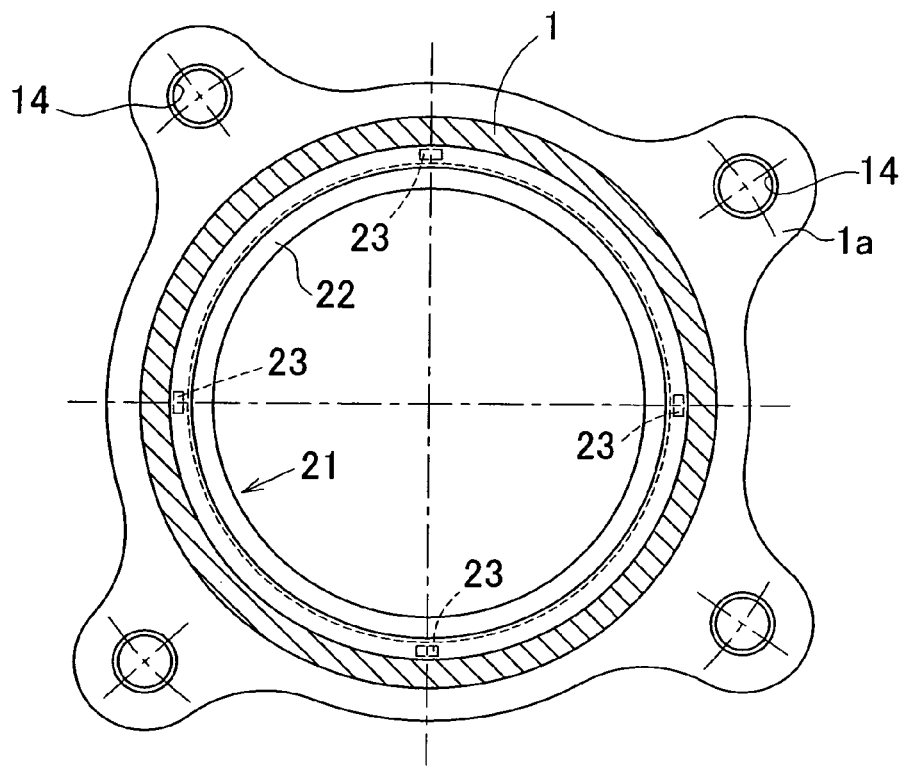
FIG. 11 is a partial sectional front view showing the outer member and the sensor unit of the sensor-incorporated wheel support bearing assembly according to the fourth embodiment.
Figure 12A:
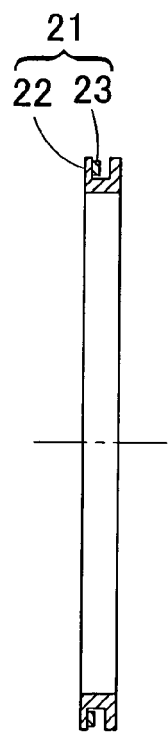
FIG. 12A is a transverse sectional view of the sensor unit employed in the fourth embodiment.
Figure 12B:
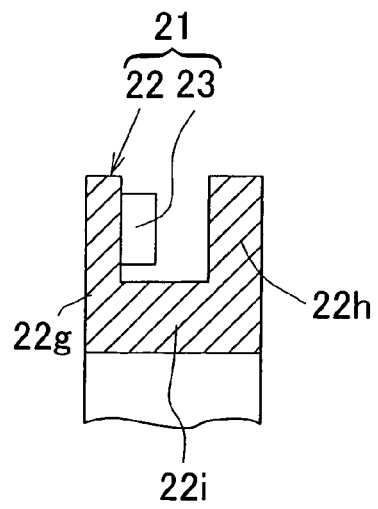
FIG. 12B is an enlarged view of an important portion of the sensor unit shown in FIG. 12A.
Figure 13:
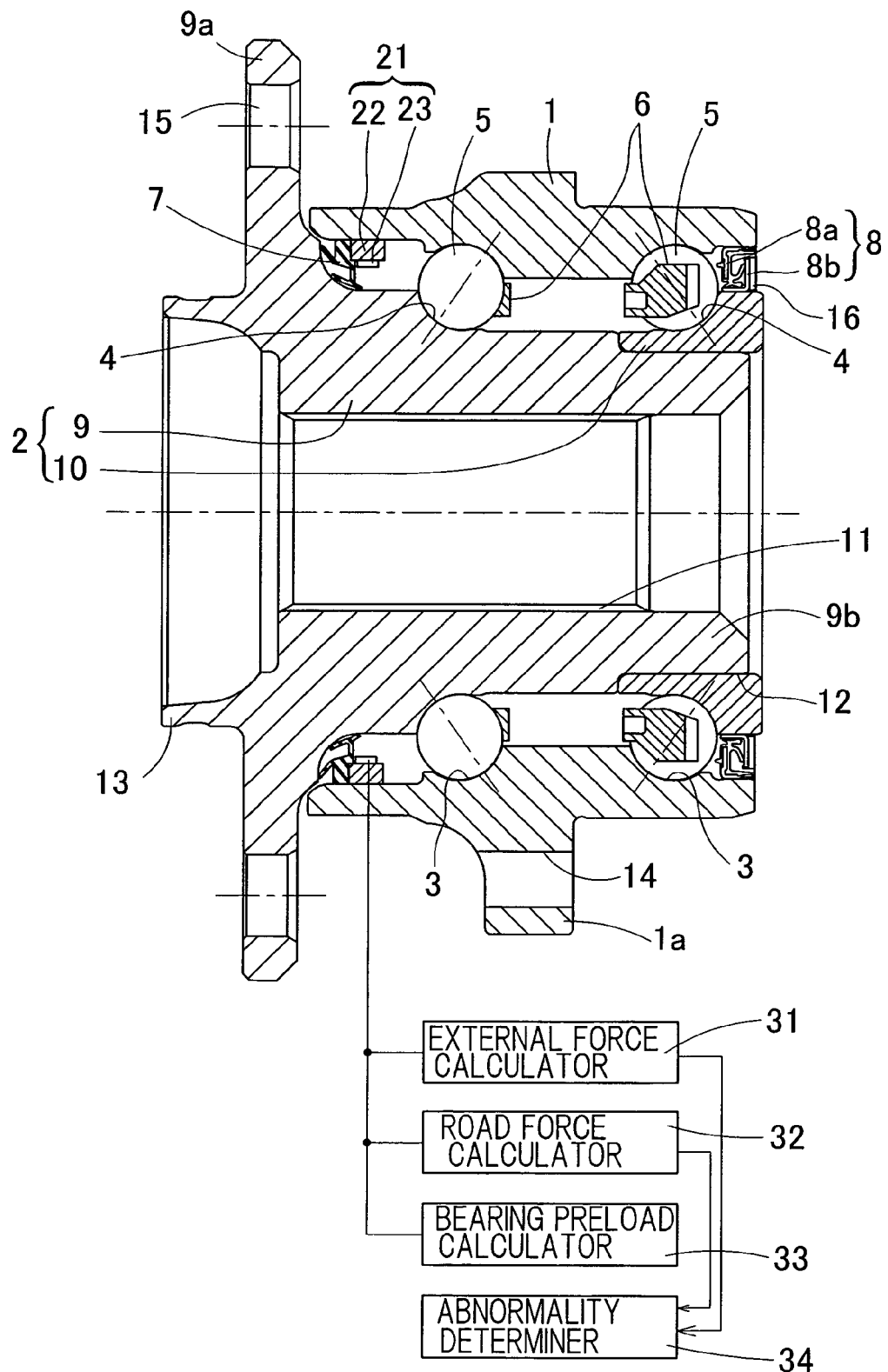
FIG. 13 is an explanatory diagram shown together with a longitudinal sectional view of the sensor-incorporated wheel support bearing assembly according to a modified example of the present invention and also with a block diagram showing a conceptual structure of a detecting system for the bearing assembly.
Figure 14:
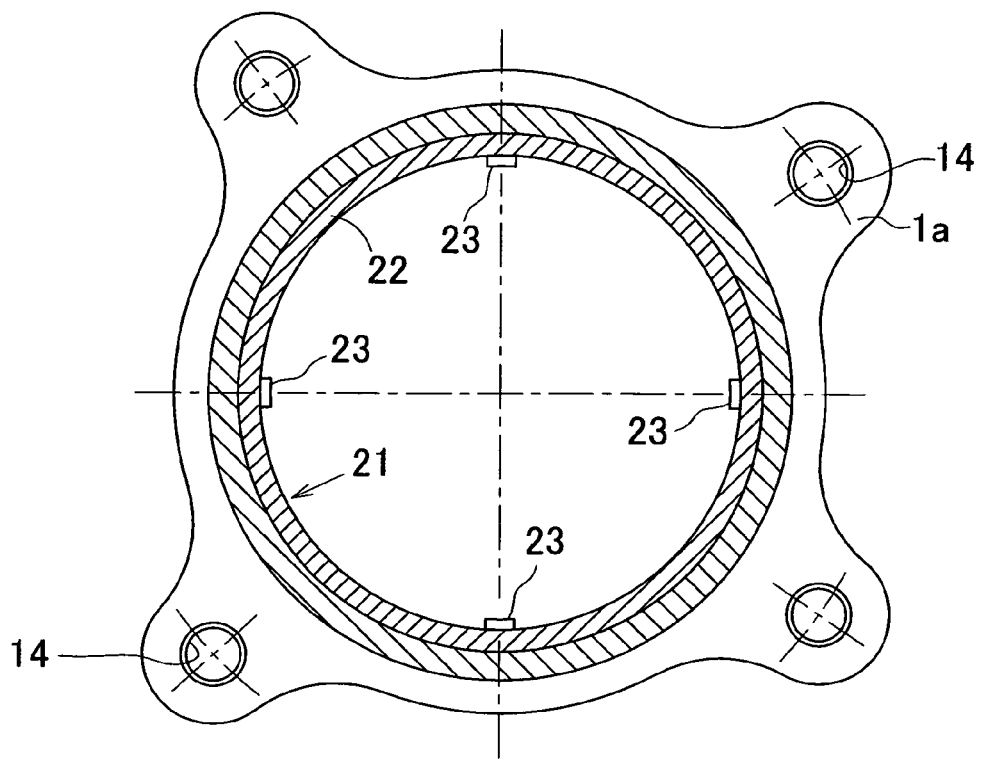
FIG. 14 is a partial sectional front view showing the outer member and the sensor unit of the sensor-incorporated wheel support bearing assembly according to the modified example.

Although not shown in FIG. 10, as shown in the embodiment of FIG. 7, the strain sensors 23 may be provided with the external force calculator 31, the road force calculator 32, the bearing preload calculator 33, and the abnormality determiner 34 for processing the output of the sensor unit 21. However, since this embodiment and the third embodiment, the changes in the strain caused by the direction or magnitude of the load are different. The relation between the strain and the load in this embodiment may preferably be obtained in advance from experiments and simulations in order to predetermine a calculation equation and a constant for the calculators 31 to 33 and the determiner 34. Other structural features of the fourth embodiment are substantially similar to those of the first to third embodiments. Common parts are indicated by like reference numerals and the description thereof is omitted.

It is to be noted that, although in the above described embodiments, the ring member 22 is fitted to the inner peripheral surface of the outer member 1, the ring member 22 may be fitted to the outer peripheral surface of the outer member 1.

A first modified example not assuming the fundamental structure of the present invention will be described with particular reference to FIGS. 13 to 15A, 15B. In the modified example, the description of the points common to any one of the first to fourth embodiments will be omitted.

The sensor unit 21, which is integral with the sealing device 7 on the outboard side, is provided on the inner peripheral surface at the outboard end of the outer member 1.

The sealing device 7 on the outboard side is in the form of a contact seal made of rubber having a plurality of sealing lips sliding on the outer peripheral surface of the hub axle 9, and is integrally bonded to the ring member 22. In other words, the ring member 22 simultaneously serves as a core metal of the contact seal.

Figure 15A:
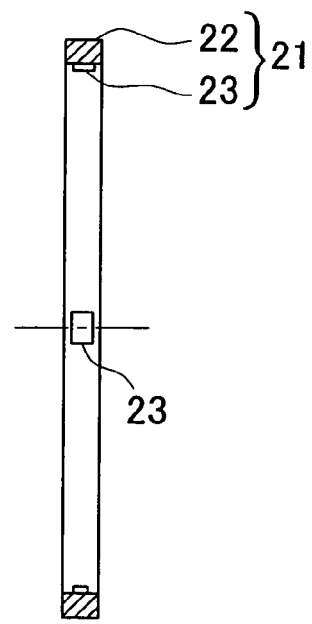
FIG. 15A is a transverse sectional view of the sensor unit employed in the modified example.
Figure 15B:
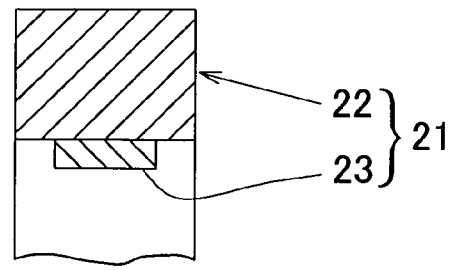
FIG. 15B is an enlarged view of an important portion of the sensor unit shown in FIG. 15A.

The transverse section of the ring member 22 is of substantially square-shaped and four strain sensors 23 for measuring an axial strain on the ring member 22 are affixed to the inner peripheral surface of the ring member 22. Although FIGS. 15A and 15B show only the ring member 22 and the strain sensor 23, the contact seal forming the sealing device 7 on the outboard side is bonded integrally to a side surface of the ring member 22.

The structure in which the contact seal forming the sealing device 7 on the outboard side is bonded integrally to the ring member 22 is similarly employed in the following embodiments.

Since the sensor-incorporated wheel support bearing assembly according to this embodiment has the ring member 22 provided with the sealing device 7. Accordingly, the ring member 22 serves as the core metal of the sealing device 7. The sensor-incorporated wheel support bearing assembly can be downsized in the axial direction and have a seal function at low cost to thereby reduce the cost.

Figure 16:
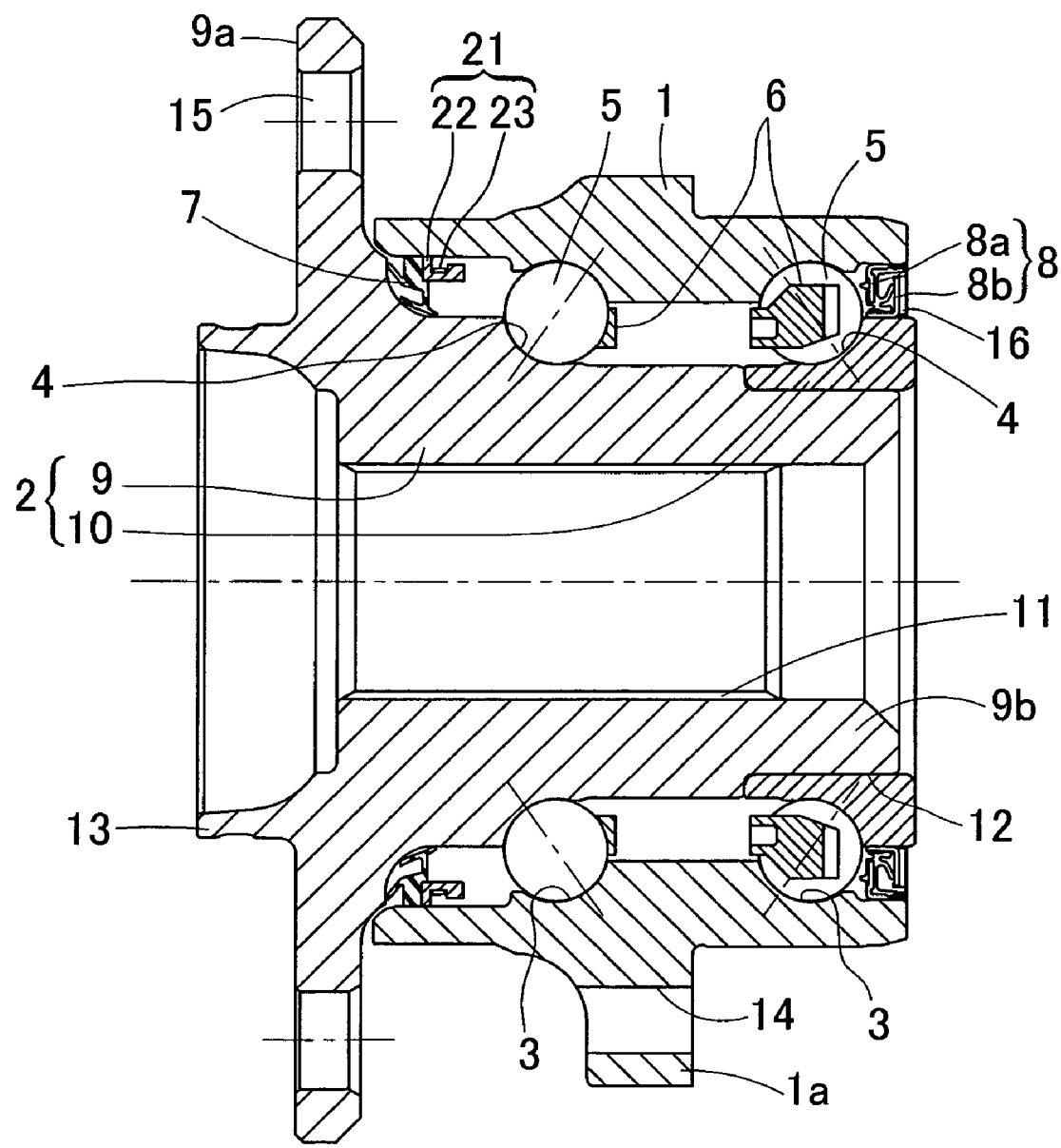
FIG. 16 is a longitudinal sectional view of the sensor-incorporated wheel support bearing assembly according to a fifth preferred embodiment of the present invention.

FIG. 16 shows a fifth embodiment of the present invention. In the fifth embodiment, similarly to the first modified example, the sealing device 7 is integral with the ring member 22. Further, similarly to the first embodiment shown in FIG. 3, the ring member 22 has the contact ring portion (the first contact ring portion) 22*a* in contact with the inner peripheral surface of the outer member 1, the non-contact ring portion (the first non-contact ring portion) 22*b* not contact with the inner peripheral surface of the outer member 1 and extending axially of the ring member 22, and the thick-walled portion (the second non-contact ring portion) 22*c* having a wall thickness greater than that of the first non-contact ring portion 22*b* and positioned adjacent to the first non-contact ring portion 22*b* and on the side remote from the contact ring portion 22*a*, and the strain sensors 23 for measuring an axial strain on the ring member 22 are affixed to the outer peripheral surface of the non-contact ring portion 22*b* formed at an intermediate portion between the contact ring portion 22*a* and the thick-walled portion 22*c* (the bottom portion of the groove shaped portion between the contact ring portion 22*a* and the thick-walled portion 22*c*).

It is to be noted that, although not shown in FIG. 16, the strain sensors 23 may be provided with the external force calculator 31, the road force calculator 32, the bearing preload calculator 33, and the abnormality determiner 34 for processing the output of the sensor unit 21. Other structural features of the fifth embodiment are similar to those of the first embodiment and the modified example. Common parts are indicated by like reference numerals and the description thereof is omitted.

Figure 17:
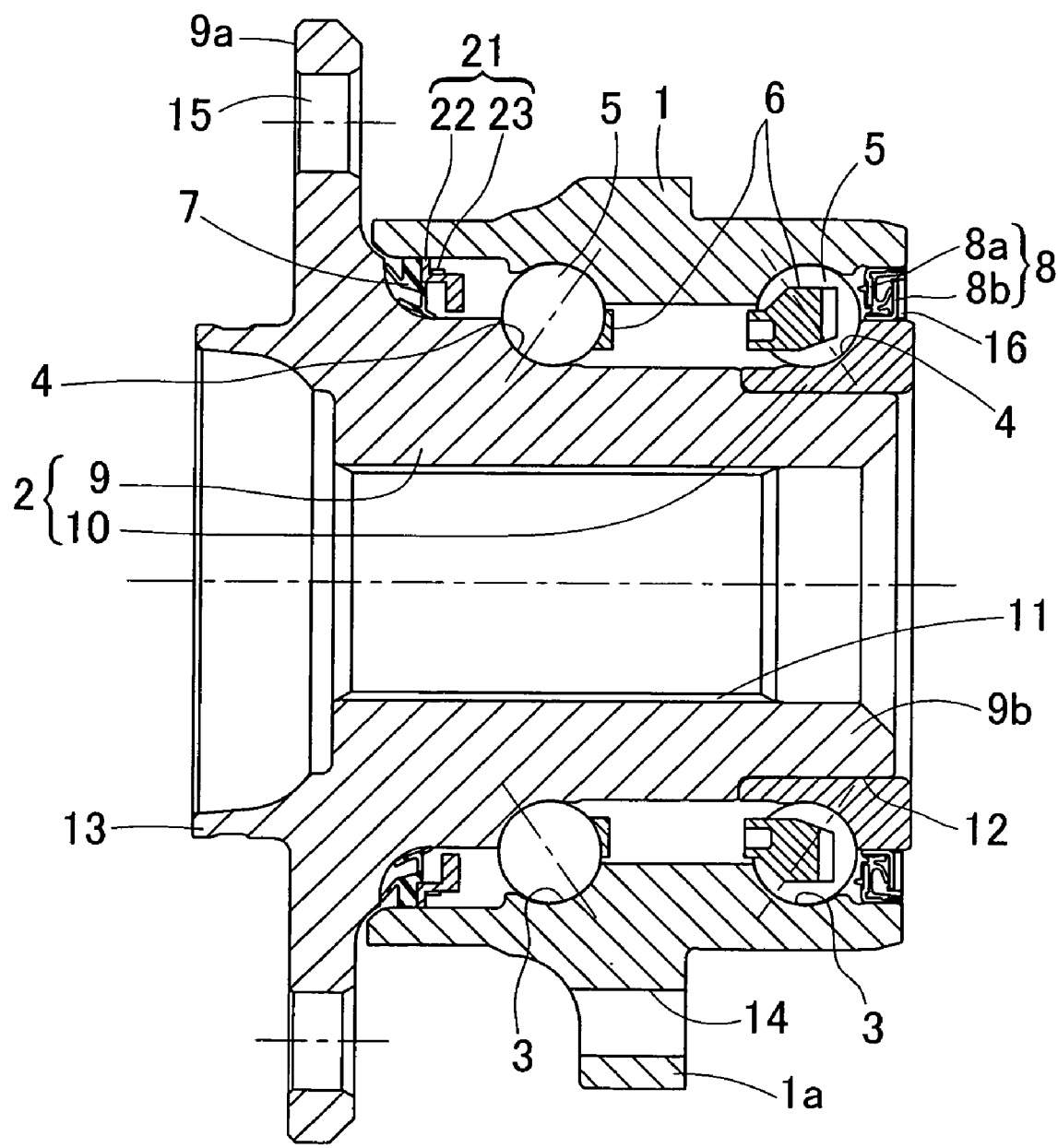
FIG. 17 is a longitudinal sectional view of the sensor-incorporated wheel support bearing assembly according to a sixth preferred embodiment of the present invention.

FIG. 17 shows a sixth preferred embodiment of the present invention. In the sixth embodiment, similarly to the first modified example, the sealing device 7 is integral with the ring member 22. Further, similarly to the second embodiment shown in FIG. 6, the ring member 22 has the contact ring portion (the first contact ring portion) 22*a* in contact with the inner peripheral surface of the outer member 1 and the non-contact ring portion (the first non-contact ring portion) 22*b* not in contact with the inner peripheral surface of the outer member 1 and extending axially of the ring member 22. In addition, the ring member 22 has the flange portion (the second non-contact ring portion) 22*d* protruding radially inwardly and positioned adjacent to the first non-contact ring portion 22*b* on the side remote from the contact ring portion 22*a*. The strain sensors 23 are affixed to the outer peripheral surface of the non-contact ring portion 22*b* between the contact ring portion 22*a* and the flange portion 22*d* (the outer peripheral surface in the cylindrical portion between the contact ring portion 22*a* and the flange portion 22*d*) for measuring an axial strain on the ring member 22

Other structural features of the sixth embodiment are similar to those of the second embodiment and the first modified example. Common parts are indicated by like reference numerals and the description thereof is omitted.

Figure 18:
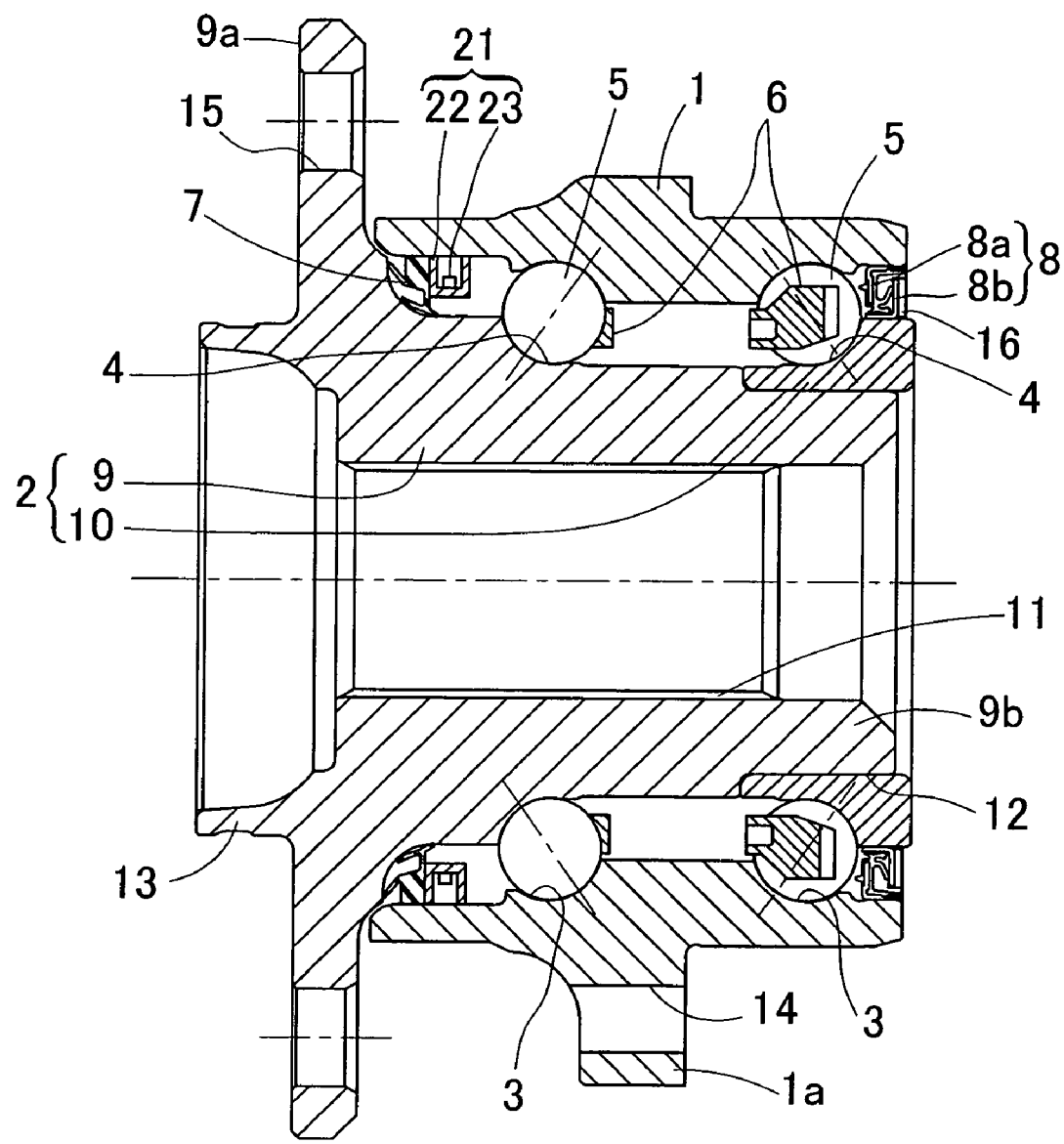
FIG. 18 is a longitudinal sectional view of the sensor-incorporated wheel support bearing assembly according to a seventh preferred embodiment of the present invention.

FIG. 18 shows a seventh preferred embodiment of the present invention. In the seventh embodiment, similarly to the first modified example, the sealing device 7 is integral with the ring member 22. Further, similarly to the third embodiment shown in FIG. 9B, the ring member 22 has the contact ring portions 22*a* and 22*e* in contact with the inner peripheral surface of the outer member 1 and the non-contact ring portion 22*f* not in contact with the inner peripheral surface of the outer member 1. The contact ring portions 22*a* and 22*e* have respective wall thickness greater than that of the non-contact ring portion 22*f*, and the strain sensors 23 for measuring an axial strain on the ring member 22 are affixed to the outer peripheral surface of the non-contact ring portion 22*f* between both the contact ring portions 22*a* and 22*e* (the bottom portion of the groove shaped portion between the contact ring portions 22*a* and 22*e*).

Other structural features of the seventh embodiment are similar to those of the third embodiment and the first modified example. Common parts are indicated by like reference numerals and the description thereof is omitted.

Figure 19:
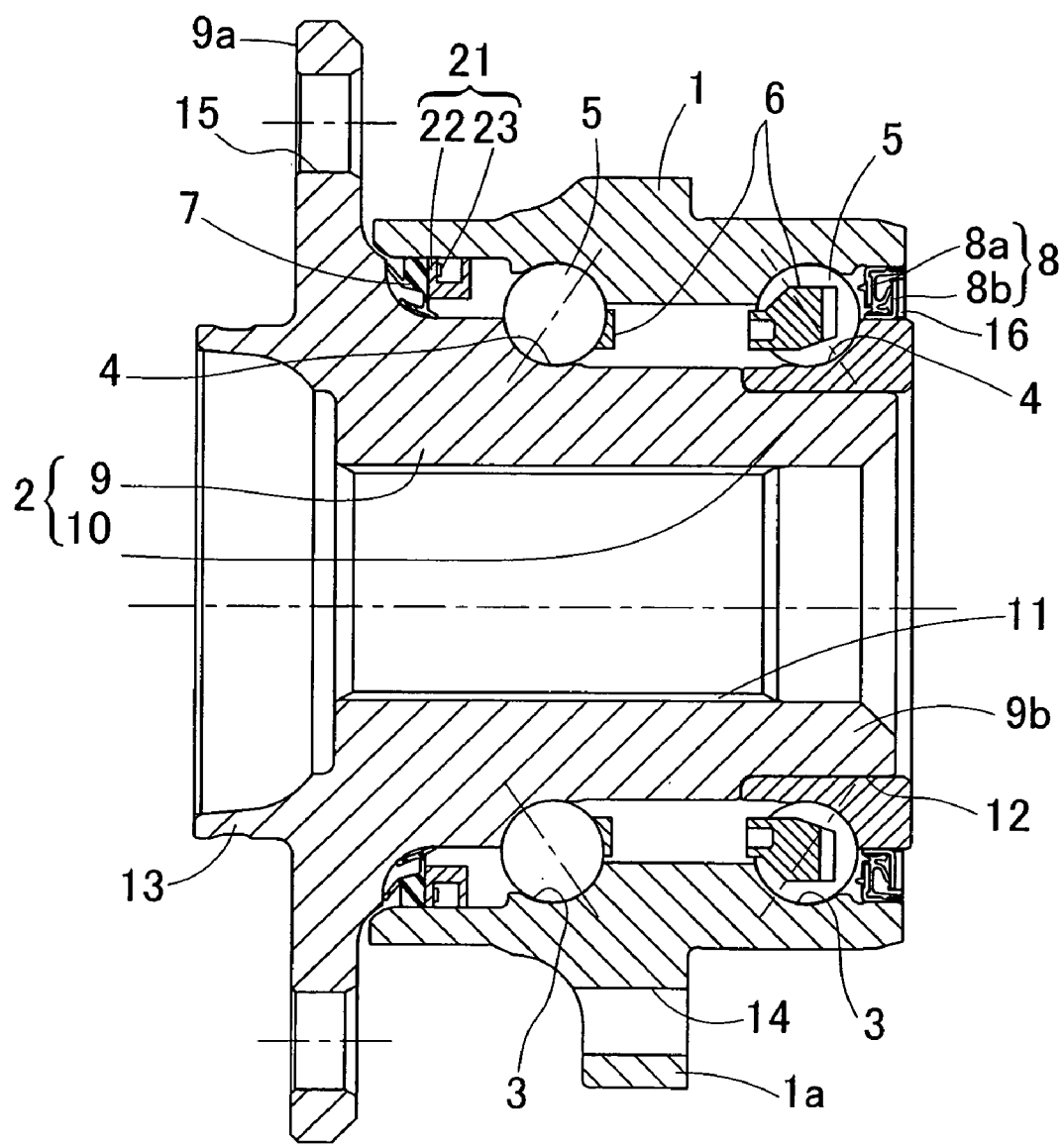
FIG. 19 is a longitudinal sectional view of the sensor-incorporated wheel support bearing assembly according to an eighth preferred embodiment of the present invention.
Figure 20:
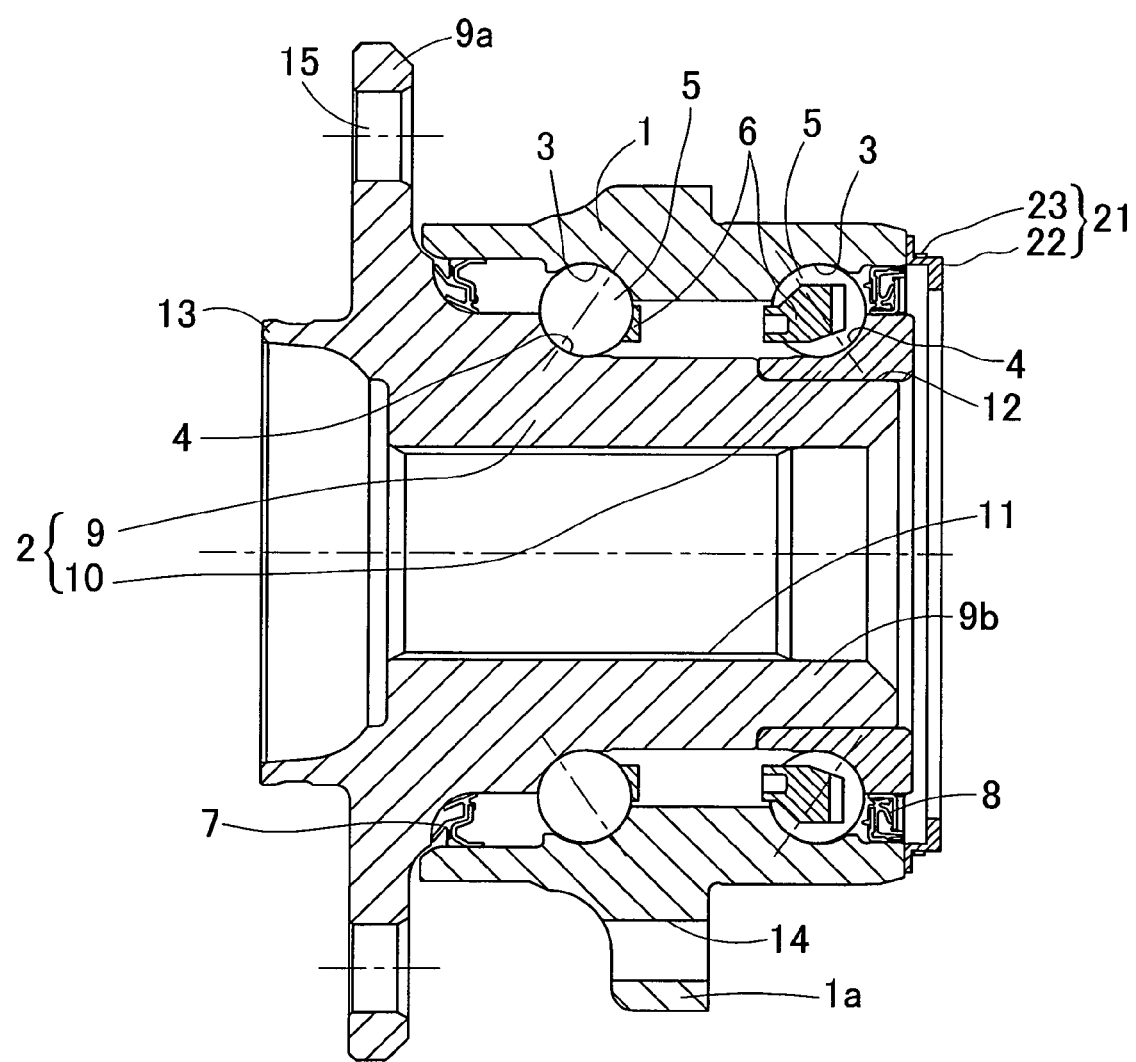
FIG. 20 is a longitudinal sectional view of the sensor-incorporated wheel support bearing assembly according to a ninth preferred embodiment of the present invention.

FIG. 19 shows an eighth preferred embodiment of the present invention. In the eighth embodiment, similarly to the first modified example, the sealing device 7 is integral with the ring member 22. Further, similarly to the fourth embodiment shown in FIGS. 12A and 12B, the ring member 22 has the contact ring portions 22g and 22h in contact with the inner peripheral surface of the outer member 1 and the non-contact ring portion 22i not in contact with the inner peripheral surface of the outer member 1. In this embodiment, of the contact ring portions 22g and 22h, the contact ring portion 22h has greater wall thickness than the contact ring portion 22g. The non-contact ring portion 22i has a wall thickness greater than those of the contact ring portions 22g and 22h. The strain sensors 23 are affixed to the inner surface of the contact ring portion 22g (the surface on the side opposed to the contact ring portion 22h) for measuring a strain on the ring member 22 in the bending direction.

Other structural features of the eighth embodiment are similar to those of the fourth embodiment and the modified example. Common parts are indicated by like reference numerals and the description thereof is omitted.

In the above described embodiments, the wheel support bearing assembly in which the outer member 1 is the stationary member is described. The present invention is also applicable to a sensor-incorporated wheel support bearing assembly in which the inner member serves as the stationary member. In this case, the ring member is fitted to the outer peripheral surface or the inner peripheral surface of the inner member.

Also, in the above described embodiments, the wheel support bearing assembly in which the sensor unit 21 is integral with the sealing device 7 on the outboard side is described. The sensor unit 21 may also be integral with the sealing device 8 on the inboard side. In this case, the seal 8a fitted to the outer member (stationary member) 1 is bonded integrally to the ring member 22 and the ring member 22 simultaneously serves as the core metal of the seal 8a.

Also, although each of the foregoing embodiments has been shown and described as applied to the wheel support bearing assembly of the third generation type, the present invention may also be applied to a wheel support bearing assembly of a first or a second generation type, in which a bearing portion and a hub axle are formed as respective separate components, and to a wheel support bearing assembly of a fourth generation type, in which a portion of the inner member is constituted by an outer race of a constant velocity joint. Yet, the sensor-incorporated wheel support bearing assembly may be used for the support of a driven wheel and may be employed in a tapered roller type wheel support bearing assembly of any of the generation types.

A ninth preferred embodiment of the present invention will be described with particular reference to FIGS. 20 to 22A, 22B. This embodiment is directed to a wheel support bearing assembly for rotatably supporting a drive wheel of an automotive vehicle, which assembly is an inner-race rotating type of a third generation model. It is to be noted that in the specification herein set forth, the terms "outboard" and "inboard" represent one side of the vehicle body away from the longitudinal center of the vehicle body and the other side of the vehicle body close to the longitudinal center of the vehicle body, respectively.

The sensor-incorporated wheel support bearing assembly shown therein includes an outer member 1 having an inner peripheral surface formed with a plurality of raceways 3, an inner member 2 having an outer peripheral surface formed with double rows of raceways 4 opposed to those raceways 3, and a plurality of rows of rolling elements 5 interposed between the raceways 3 in the outer member 1 and the raceways 4 in the inner member 2. The wheel support bearing assembly is in the form of a double row angular contact ball bearing. The rolling elements 5 are in the form of balls and are retained by a retainer 6 employed for each row of those rolling elements 5. Each of the raceways 3 and 4 represents an arcuate shape in portion and the raceways 3 and 4 are so formed as to have respective contact angles held in back-to-back relation with each other. Both ends of a bearing space delimited between the outer member 1 and the inner member 2 are sealed by respective sealing devices 7 and 8.

The sensor unit 21 is provided on the end face on the inboard side of the outer member 1. The sensor unit 21 includes the ring member 22 and a plurality of strain sensors 23 affixed to the ring member 22 for measuring a strain on the ring member 22. The strain sensors 23 are equally spaced in a direction circumferentially of the ring member 22 and, in this embodiment, four strain sensors 23 are positioned on upward side, downward side, leftward side and rightward side, respectively, of the wheel support bearing assembly.

As shown in FIG. 22B illustrating the transverse sectional shape of the ring member 22, the ring member has the contact ring portion (the first contact ring portion) 22a in contact with the end face of the outer member 1, the non-contact ring portion 22b not in contact with the end face of the outer member 1, and the flange portion protruding radially inwardly 22d at the portion of the non-contact ring portion 22b remote from the contact ring portion 22a. The strain sensors 23 for measuring an axial strain on the ring member 22 are affixed to the outer peripheral surface of the non-contact ring portion 22b between the contact ring portion 22a and the flange portion 22d (the outer peripheral surface of the cylindrical portion between the contact ring portion 22a and the thick-walled portion 22c).

The sensor unit 21 is fixed to the outer member 1 by bonding the outboard side surface of the contact ring portion 22a of the ring member 22 to the end face on the inboard side of the outer member 1. The sensor unit 21 is fixed using bonding and may also be fixed to the outer member 1 as follows.

Figure 23:
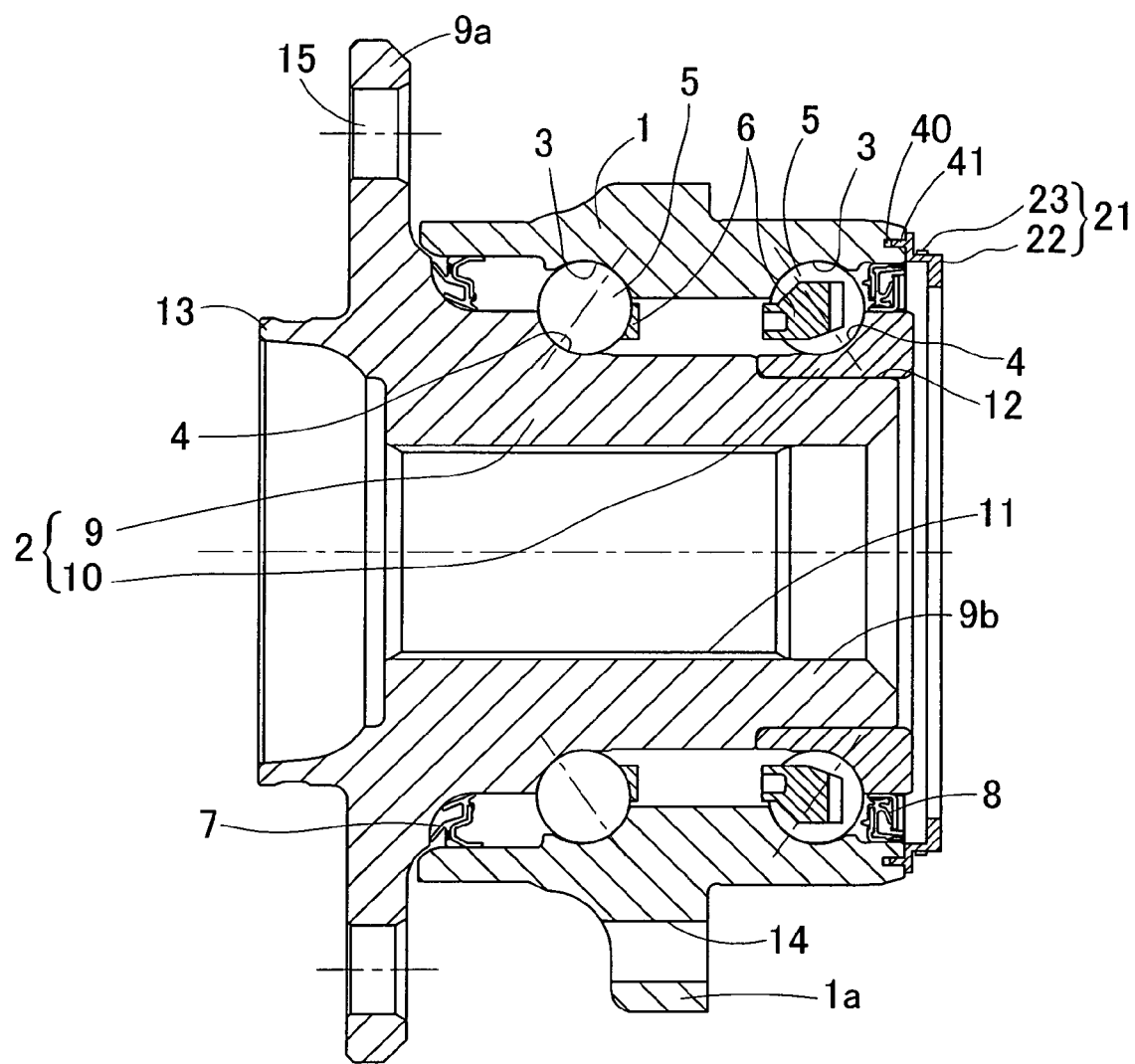
FIG. 23 is a longitudinal sectional view of the sensor-incorporated wheel support bearing assembly showing a different structure for fitting the sensor unit thereto.
Figure 24:
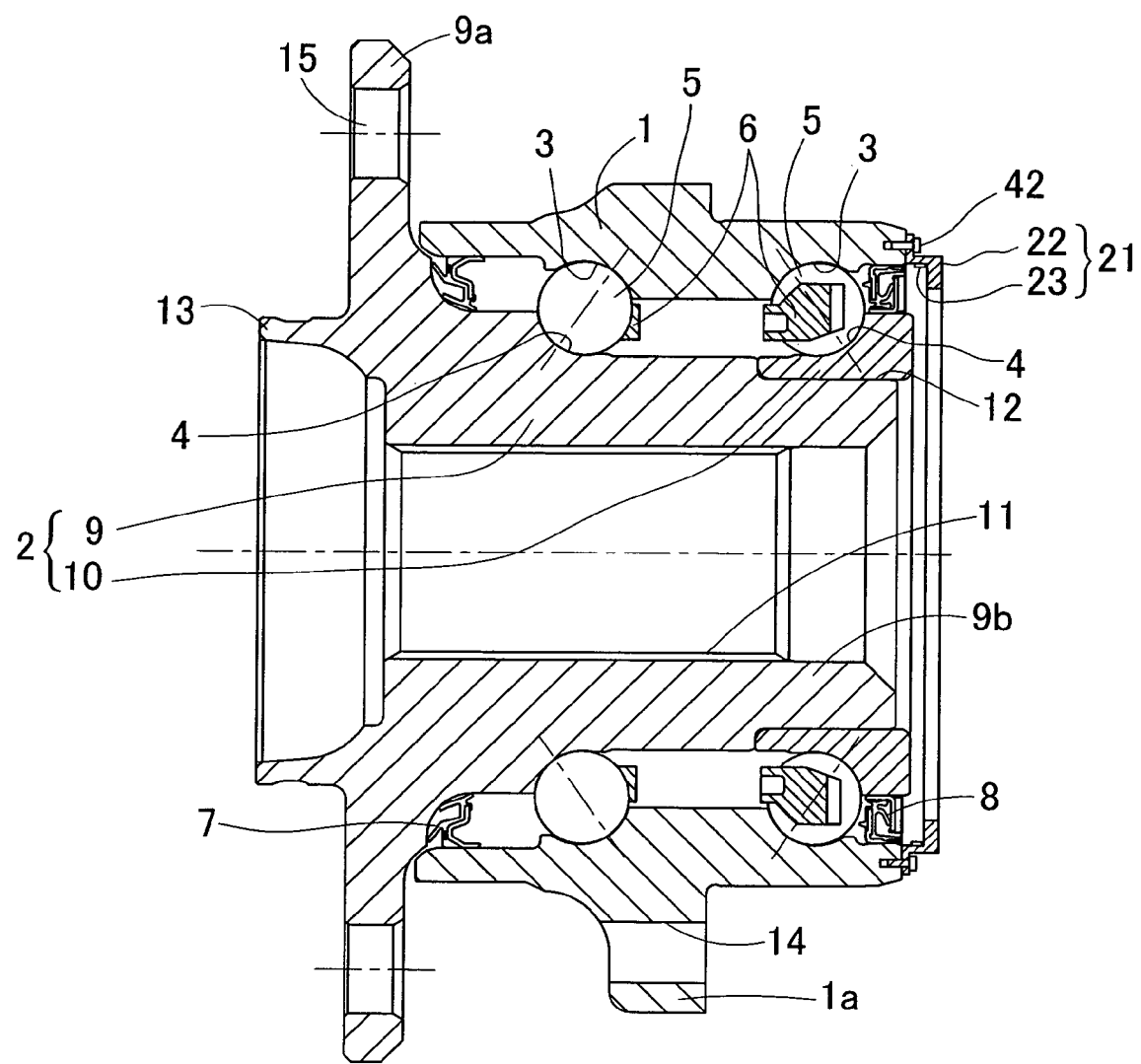
FIG. 24 is a longitudinal sectional view of the sensor-incorporated wheel support bearing assembly showing further different structure for fitting the sensor unit thereto.

In the wheel support bearing assembly shown in FIG. 23, a circumferential groove 40 recessed axially is formed in the end face of the outer member 1, and a circumferential convex portion 41 formed integrally with the contact ring portion 22a is then fitted into the circumferential groove 40 to fix the sensor unit 21 to the outer member 1. In the wheel support bearing assembly shown in FIG. 24, the contact ring portion 22a is fixed to the end face of the outer member 1 by means of a bolt 42 to fix the sensor unit 21 to the outer member 1. In these fixing methods, the bonding may be used together.

Figure 25:
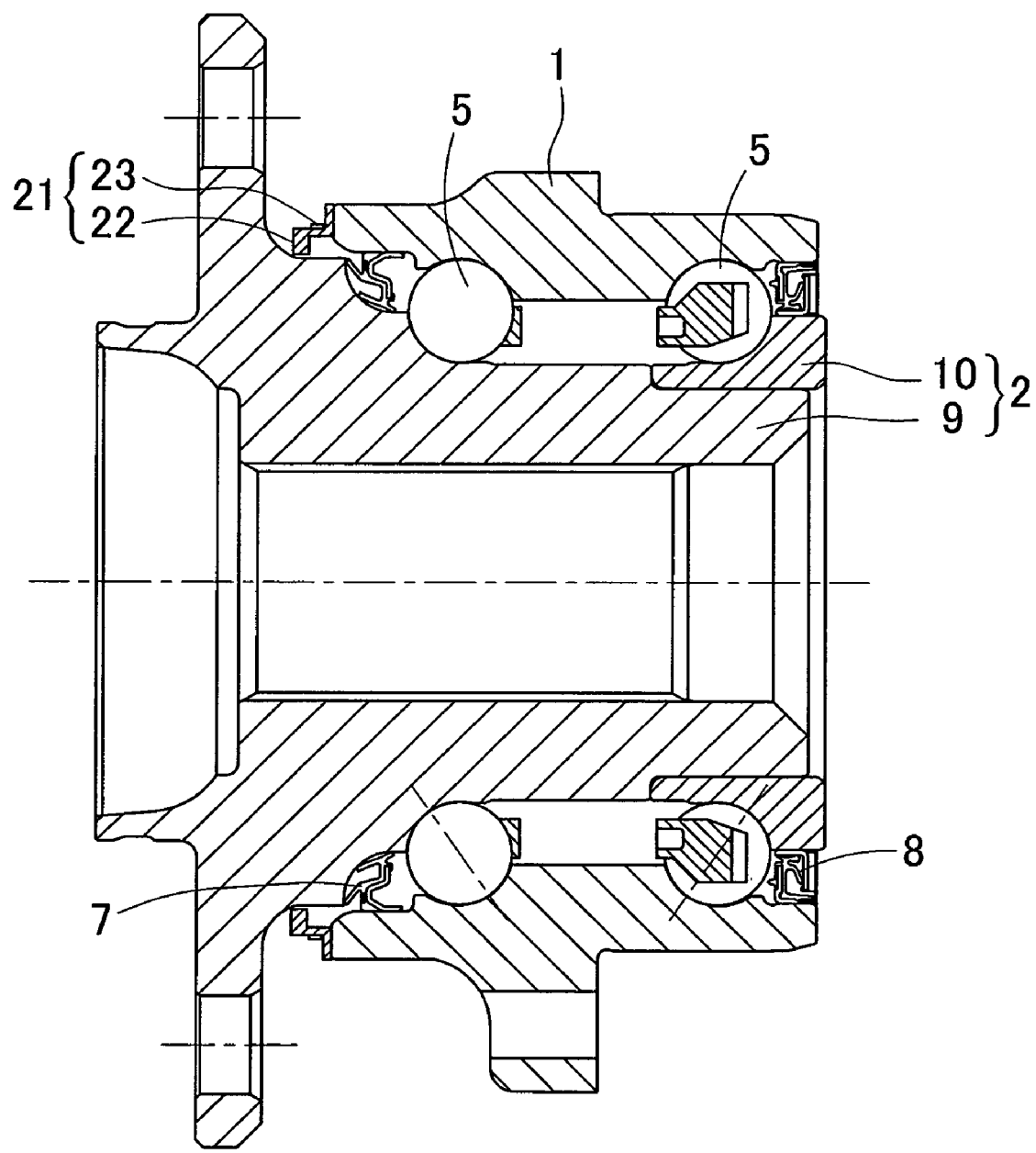
FIG. 25 is a longitudinal sectional view of the sensor-incorporated wheel support bearing assembly, in which the sensor unit is fitted at a different location from that of the ninth embodiment.
Figure 26:
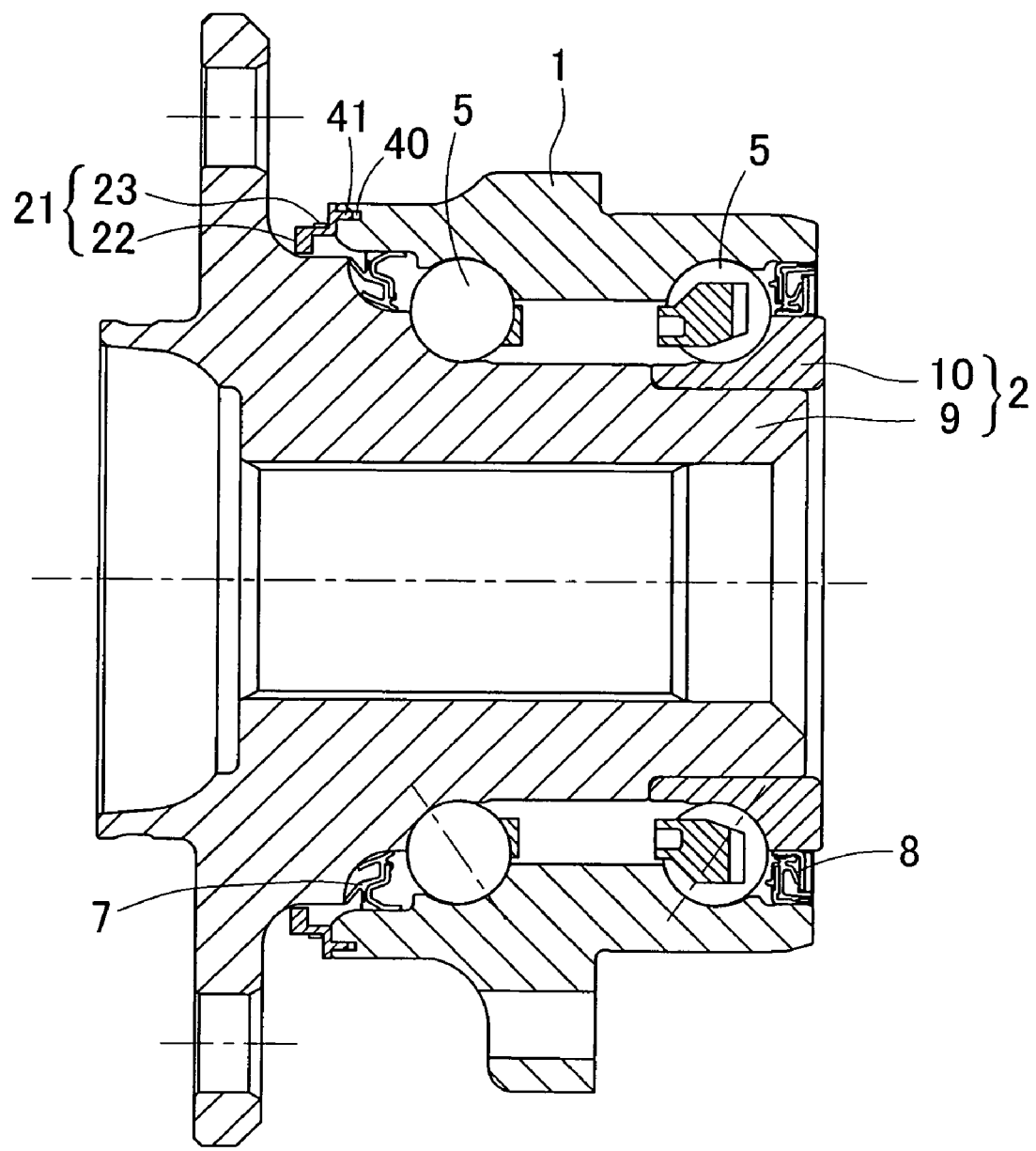
FIG. 26 is a longitudinal sectional view of the sensor-incorporated wheel support bearing assembly showing a different structure for fitting the sensor unit thereto.
Figure 27:
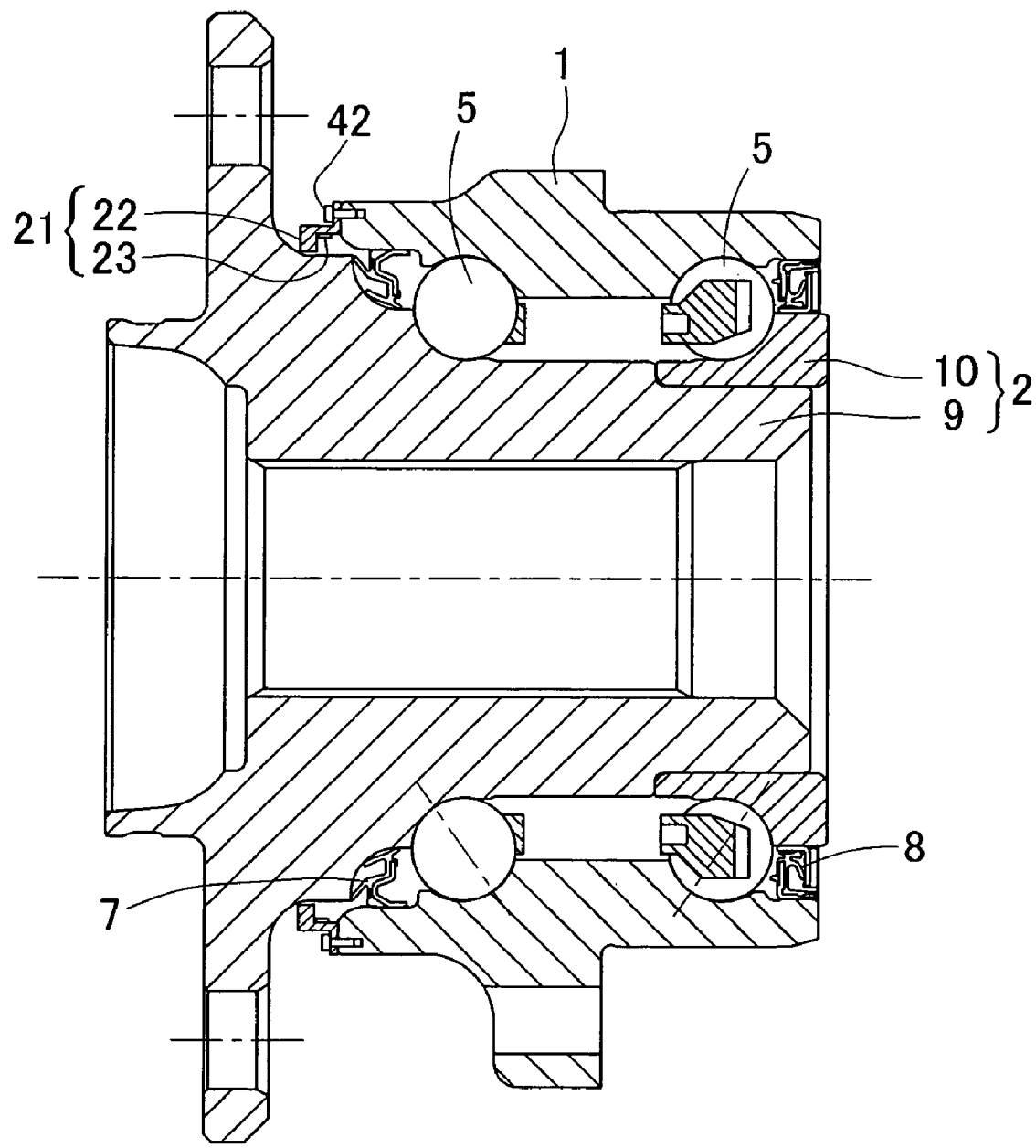
FIG. 27 is a longitudinal sectional view of the sensor-incorporated wheel support bearing assembly showing further different structure for fitting the sensor unit.
Figure 28:
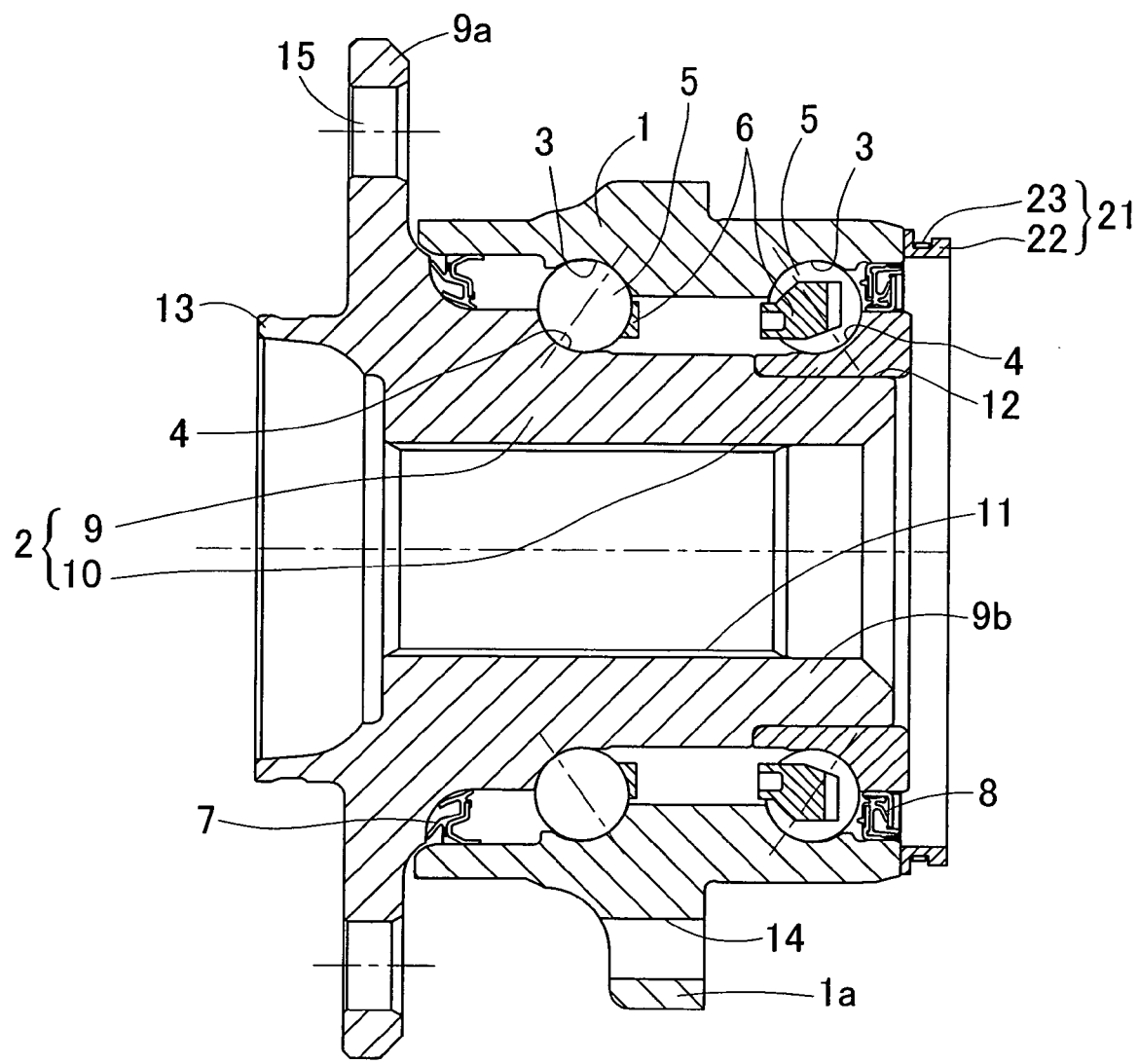
FIG. 28 is a longitudinal sectional view of the sensor-incorporated wheel support bearing assembly according to a tenth preferred embodiment of the present invention.
Figure 29:
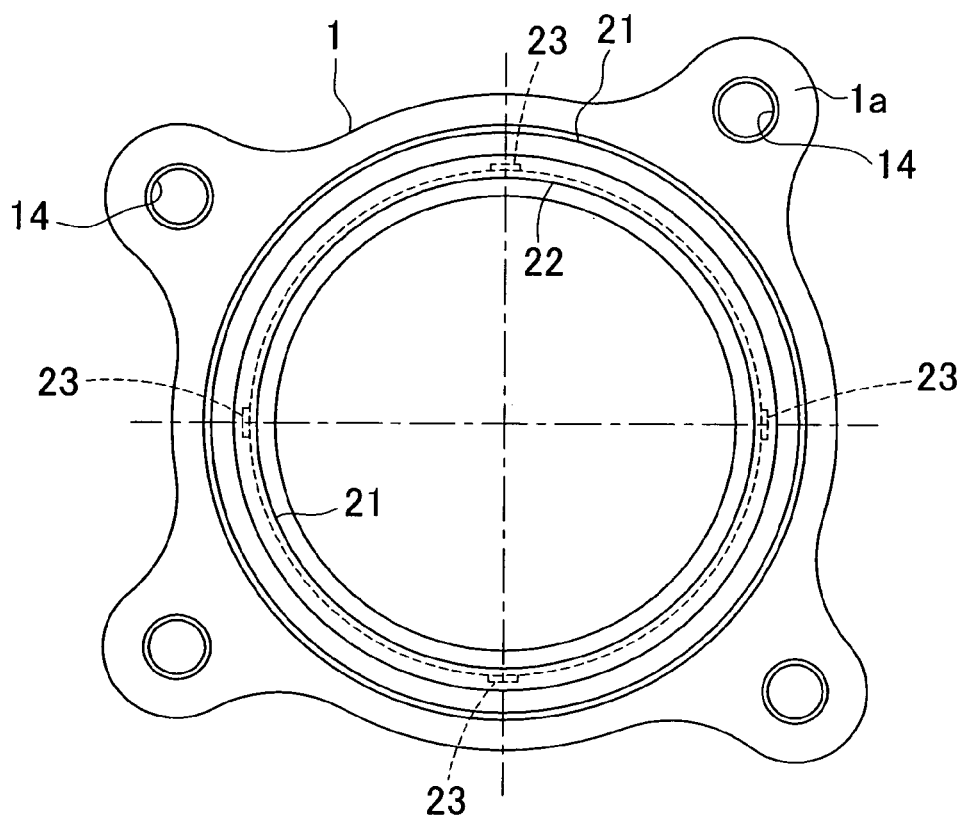
FIG. 29 is a diagram of the outer member and the sensor unit of the sensor-incorporated wheel support bearing assembly according to the tenth embodiment in a front view from the inboard side.

Also, as shown in FIGS. 25 to 27, the sensor unit 21 may be fitted to the end face on the outboard side of the outer member 1. Even in this case, as the fixing method of the sensor unit 21, any one of the method using the bonding (FIG. 25), the method in which the circumferential convex portion 41 is fitted into the circumferential groove 40 (FIG. 26), and the method using the bolt 42 (FIG. 27) may be employed.

The operation of the sensor-incorporated wheel support bearing assembly of the structure discussed above will be described. Under the effect of a load acting on the hub axle 9, the outer member 1 is deformed through the rolling elements 5 and the deformation is transmitted to the ring member 22 fitted to the end face of the outer member 1 to deform the ring member 22. The strain on the ring member 22 is measured by the strain sensors 23. In the sensor unit 21 employed in this embodiment, since the portion of the non-contact ring portion 22b remote from the contact ring portion 22a has the flange portion 22d protruding radially inwardly, the flange portion 22d has high rigidity and is hard to be deformed. Accordingly, the strain occurring between the flange portion 22d and the contact ring portion 22a represents a transferred and enlarged radial strain on the outer member 1. Accordingly, the strain sensors 23 can detect the deformation of the outer member 1 with good sensitivity, resulting in increase of the strain measurement accuracy.

FIGS. 28 to 30A, 30B show a tenth preferred embodiment of the present invention. The tenth embodiment is similar to the ninth embodiment except that the shape of the ring member 22 constituting the sensor unit 21 is different therefrom. Other structural features of the tenth embodiment are similar to those of the ninth embodiment. Common parts are indicated by like reference numerals and the description thereof is omitted.

Figure 30A:
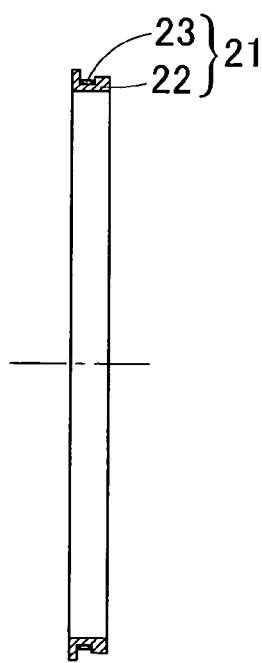
FIG. 30A is a transverse sectional view of the sensor unit employed in the tenth embodiment.
Figure 30B:
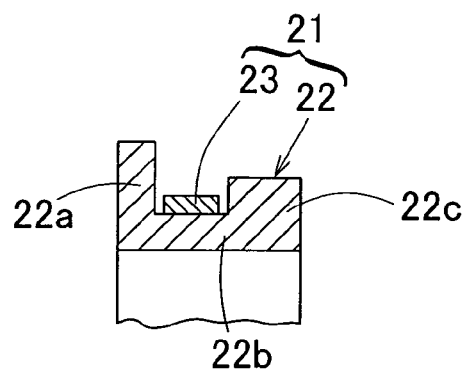
FIG. 30B is an enlarged view of an important portion of the sensor unit shown in FIG. 30A.

The tenth embodiment is similar to the ninth embodiment in that, as shown in FIG. 30B, the ring member 22 has the contact ring portion 22a in contact with the end face of the outer member 1 and the non-contact ring portion 22b not in contact with the end face of the outer member 1, and is different from therefrom in that the portion of the non-contact ring portion 22b remote from the contact ring portion 22a is formed as the thick-walled portion 22c having greater wall thickness than other portions. In this case, the strain sensors 23 for measuring an axial strain on the ring member 22 are affixed to the outer peripheral surface of the non-contact ring portion 22b between the contact ring portion 22a and the thick-walled portion 22c (the bottom portion of the groove shaped portion defined between the contact ring portion 22a and the thick-walled portion 22c).

In this embodiment, as described above, under the effect of a load acting on the hub axle 9, the outer member 1 is deformed through the rolling elements 5 and the deformation is transmitted to the ring member 22 fitted to the end face of the outer member 1 to deform the ring member 22. The strain on the ring member 22 is measured by the strain sensors 23. In the sensor unit 21 employed in this embodiment, since the non-contact ring portion 22b in the portion remote from the contact ring portion 22a of the ring member 22 is formed as the thick-walled portion 22c having greater wall thickness than other portions, this portion has high rigidity and is hard to be deformed. Thus, the strain occurring between the thick-walled portion 22c and the contact ring portion 22a represents a transferred and enlarged radial strain on the outer member 1. Because of this, the strain sensors 23 can detect the deformation of the outer member 1 with good sensitivity, resulting in increase of the strain measurement accuracy.

In this embodiment, as described above, the load detecting system shown in FIG. 1 may be employed for processing the outputs of the strain sensors 23.

Figure 31:
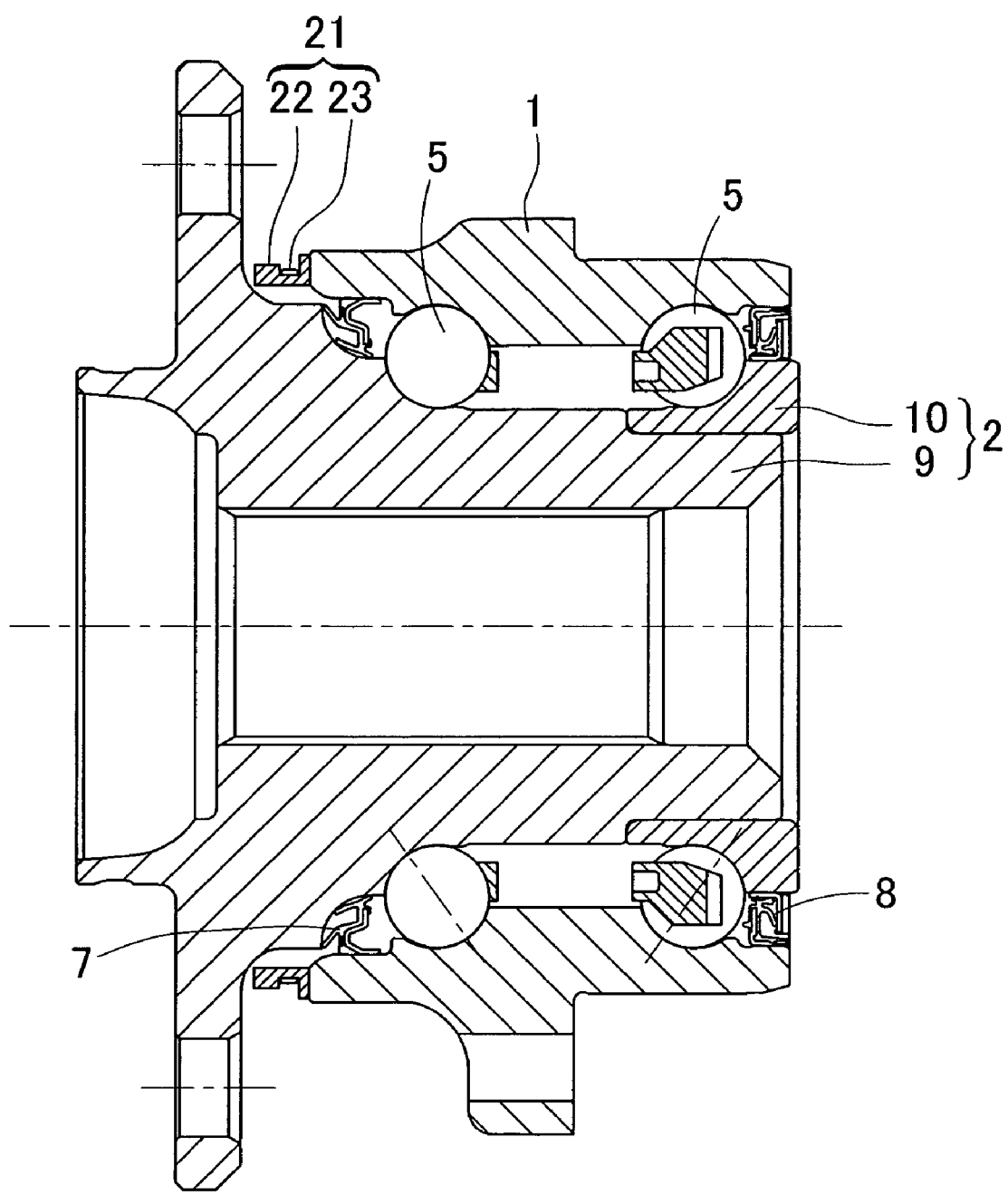
FIG. 31 is a longitudinal sectional view of the sensor-incorporated wheel support bearing assembly, in which the sensor unit is fitted at a different location from that of the tenth embodiment.
Figure 32:
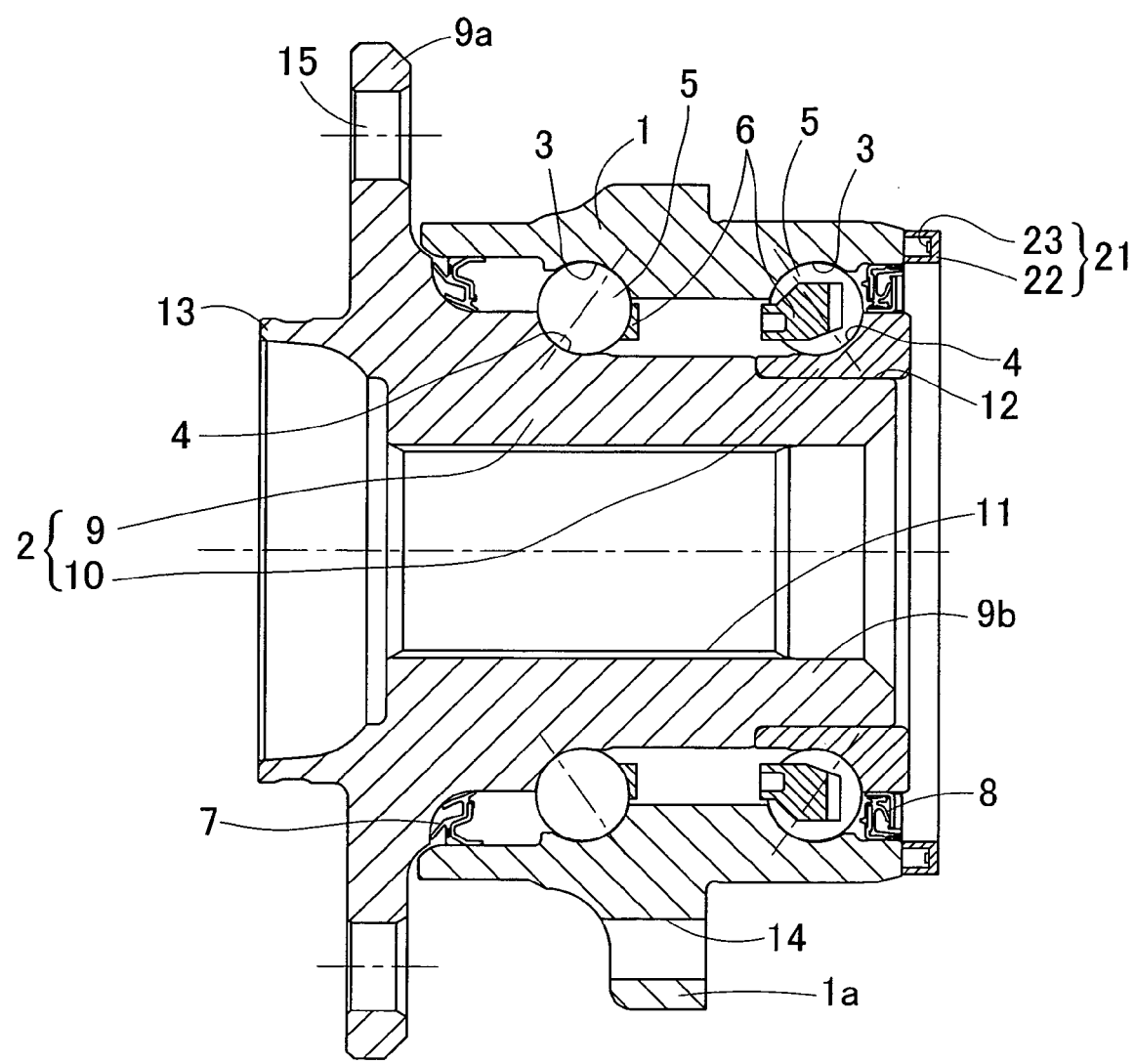
FIG. 32 is a longitudinal sectional view of the sensor-incorporated wheel support bearing assembly according to an eleventh preferred embodiment of the present invention.
Figure 33:
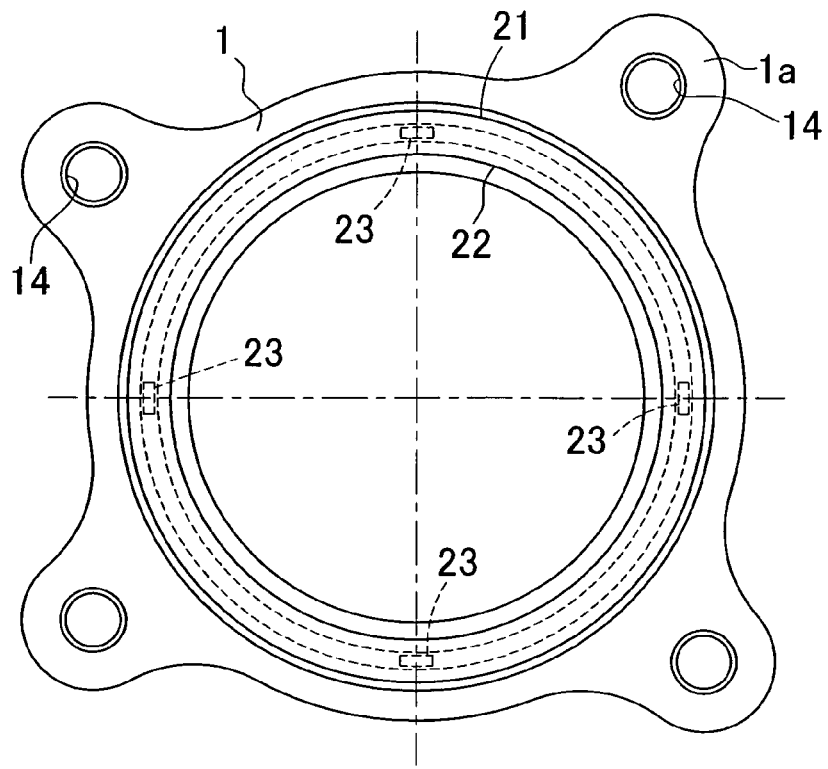
FIG. 33 is a diagram of the outer member and the sensor unit of the sensor-incorporated wheel support bearing assembly according to the eleventh embodiment in a front view from the inboard side.

Further, as shown in FIG. 31, the sensor unit 21 having the ring member 22 of the above described shape may be fitted to the end face on the outboard side of the outer member 1.

FIGS. 32 to 34A, 34B show an eleventh preferred embodiment of the present invention. The eleventh embodiment is similar to the ninth and tenth embodiments except that the shape of the ring member 22 constituting the sensor unit 21 is different therefrom. Other structural features of the eleventh embodiment are similar to those of the ninth and tenth embodiments. Common parts are indicated by like reference numerals and the description thereof is omitted.

Figure 34A:
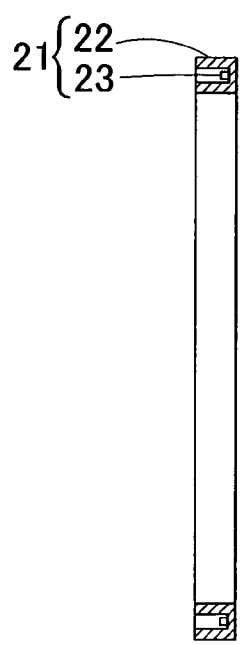
FIG. 34A is a transverse sectional view of the sensor unit employed in the eleventh embodiment.
Figure 34B:
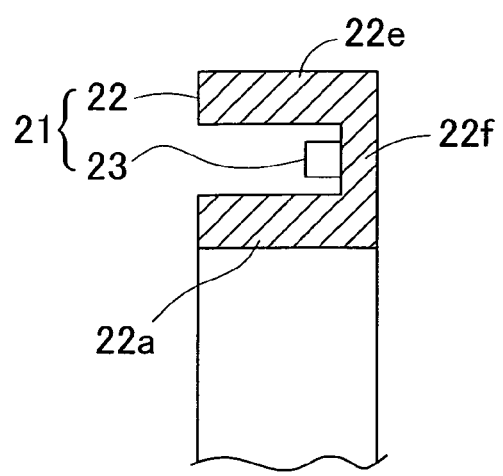
FIG. 34B is an enlarged view of an important portion of the sensor unit shown in FIG. 34A.

As shown in FIG. 34B, the transverse sectional shape of the ring member 22 of this embodiment is represented by a grooved-shape having the contact ring portions (the first contact ring portions) 22a and 22e in contact with the end face of the outer member 1 and the non-contact ring portion 22f not in contact with the end face of the outer member 1. The non-contact ring portion 22f forms a bottom wall portion of the grooved shape and the contact ring portions 22a and 22e form respective side wall portions on both sides of the groove shape. The contact ring portions 22a and 22e on both sides have greater wall thickness than the non-contact ring portion 22f. Here, the wall thickness of the non-contact ring portion 22f is referred to as the thickness in the axial direction and the wall thickness of the contact ring portions 22a and 22e is referred to as the thickness in the radial direction.

The strain sensors 23 for measuring a bending strain on the ring member 22 are affixed to the outer peripheral surface of the non-contact ring portion 22f, that is, to the inner bottom surface of the ring member 22.

In this embodiment, under the effect of a load acting on the hub axle 9, the outer member 1 is deformed through the rolling elements 5 and the deformation is transmitted to the ring member 22 fitted to the end face of the outer member 1 to deform the ring member 22. The strain on the ring member 22 is measured by the strain sensors 23. In this case, the non-contact ring portion 22f is deformed mainly according to the deformation of the outer member 1 in the axial direction. On the other hand, since the contact ring portions 22a and 22e have wall thicknesses greater than the non-contact ring portion 22f, this portion has high rigidity and is hard to be deformed. Therefore the bending strain occurring on the non-contact ring portion 22f represents a transferred and enlarged axial strain on the end face of the outer member 1. The strain measurement accuracy by the sensors 23 is high.

In this embodiment, as described above, the load detecting system shown in FIG. 1 may be employed for processing the outputs of the strain sensors 23.

Figure 35:
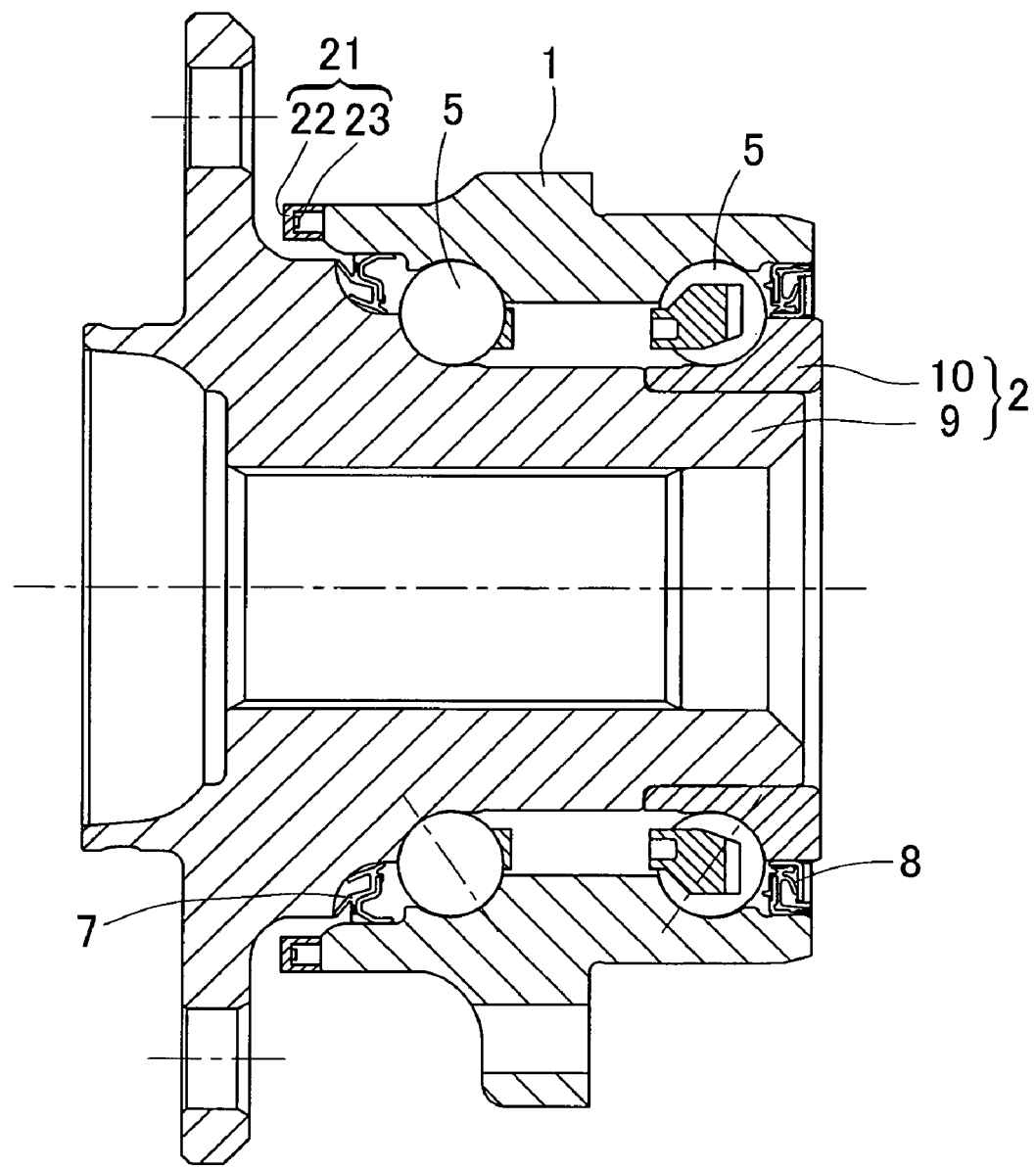
FIG. 35 is a longitudinal sectional view of the sensor-incorporated wheel support bearing assembly, in which the sensor unit is fitted at a different location from that of the eleventh embodiment.
Figure 36:
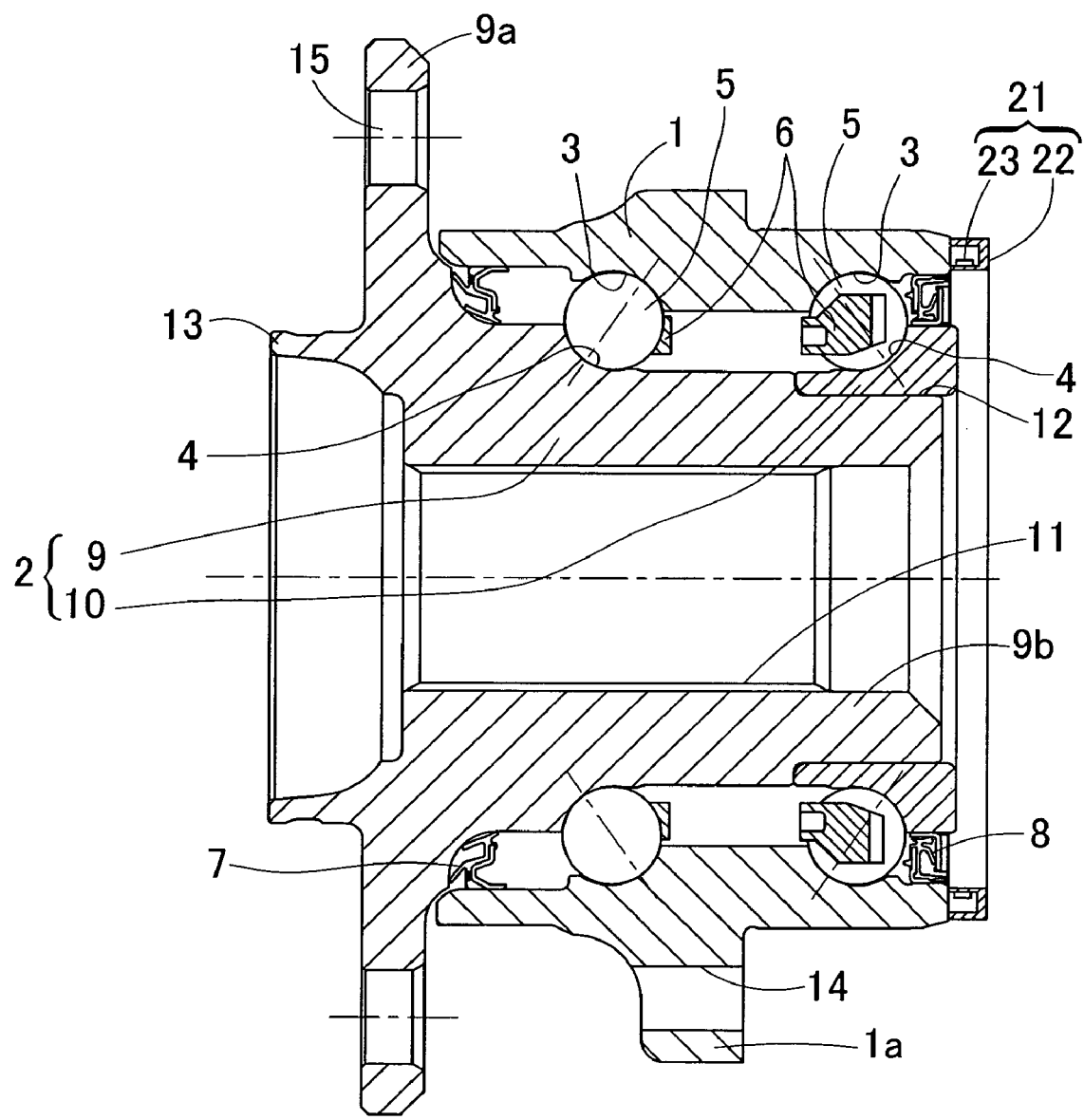
FIG. 36 is a longitudinal sectional view of the sensor-incorporated wheel support bearing assembly according to a twelfth preferred embodiment of the present invention.
Figure 37:
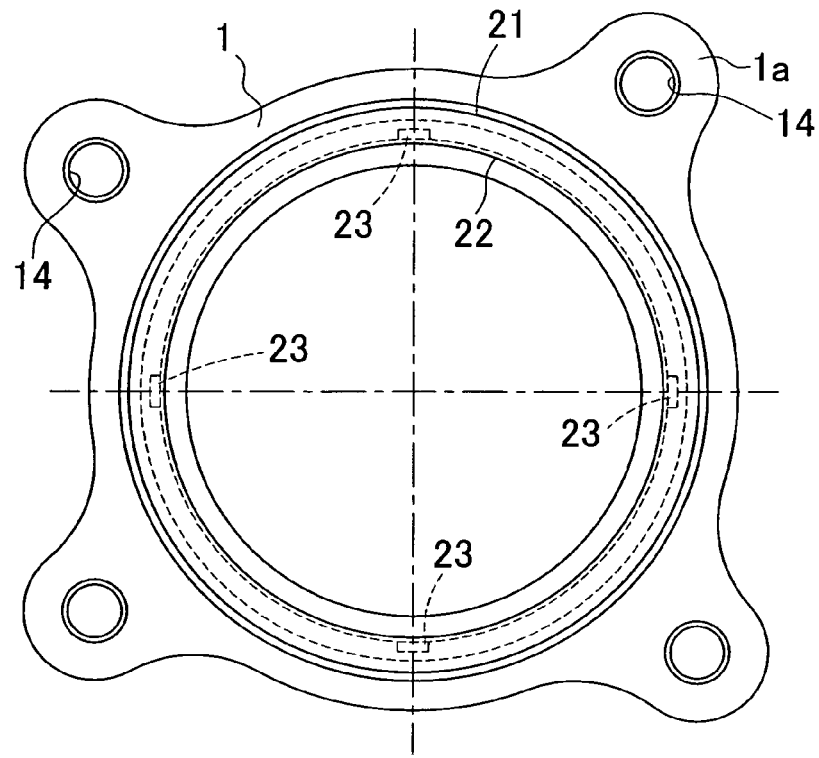
FIG. 37 is a diagram of the outer member and the sensor unit of the sensor-incorporated wheel support bearing assembly according to the twelfth embodiment in a front view from the inboard side.

As shown in FIG. 35, the sensor unit 21 having the ring member 22 of the above described shape may be fitted to the end face on the outboard side of the outer member 1.

FIGS. 36 to 38A, 38B show a twelfth preferred embodiment of the present invention. The twelfth embodiment is similar to the ninth to eleventh embodiments except that the ring member 22 constituting the sensor unit 21 is different therefrom. Common parts are indicated by like reference numerals and the description thereof is omitted.

Figure 38A:
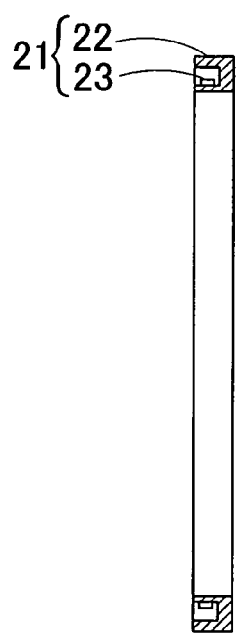
FIG. 38A is a transverse sectional view of the sensor unit employed in the twelfth embodiment.
Figure 38B:
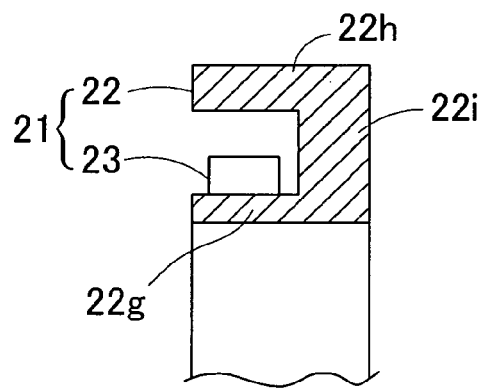
FIG. 38B is an enlarged view of an important portion of the sensor unit shown in FIG. 38A.

The twelfth embodiment is similar to the eleventh embodiment in that as shown in FIG. 38B, the transverse sectional shape of the ring member 22 is represented by a grooved shape having the contact ring portions 22g and 22h in contact with the end face of the outer member 1 and the non-contact ring portion 22i not contact with the end face of the outer member 1. In the ring member 22 of this embodiment, of the contact ring portions 22g and 22h on both sides, the contact ring portion 22h has a wall thickness greater than the contact ring portion 22g. Further, the non-contact ring portion 22i has a wall thickness greater than those of the contact ring portions 22g and 22h.

The strain sensors 23 for measuring an axial strain on the ring member 22 are affixed to the inner surface of the contact ring portion 22g having smaller wall thickness, that is, to the surface opposed to the contact ring portion 22h.

In this embodiment, under the effect of a load acting on the hub axle 9, the outer member 1 is deformed through the rolling elements 5 and the deformation is transmitted to the ring member 22 fitted to the end face of the outer member 1 to deform the ring member 22. In the sensor unit 21 employed in this embodiment, the contact ring portion 22g having the strain sensors 23 affixed thereto is deformed mainly according to the deformation of the outer member 1 in the axial direction. Since the contact ring portion 22h and the non-contact ring portion 22i have great wall thickness, they have high rigidity and are hard to be deformed, resulting in the axial strain in on the contact ring portion 22g having smaller wall thickness. The strain represents a transferred and enlarged radial strain on the end face of the outer member 1. Thus, similarly to the third embodiment, the strain measurement at high accuracy can be expected.

In this embodiment, as described above, the load detecting system shown in FIG. 1 may be employed for processing the outputs of the strain sensors 23.

Figure 39:
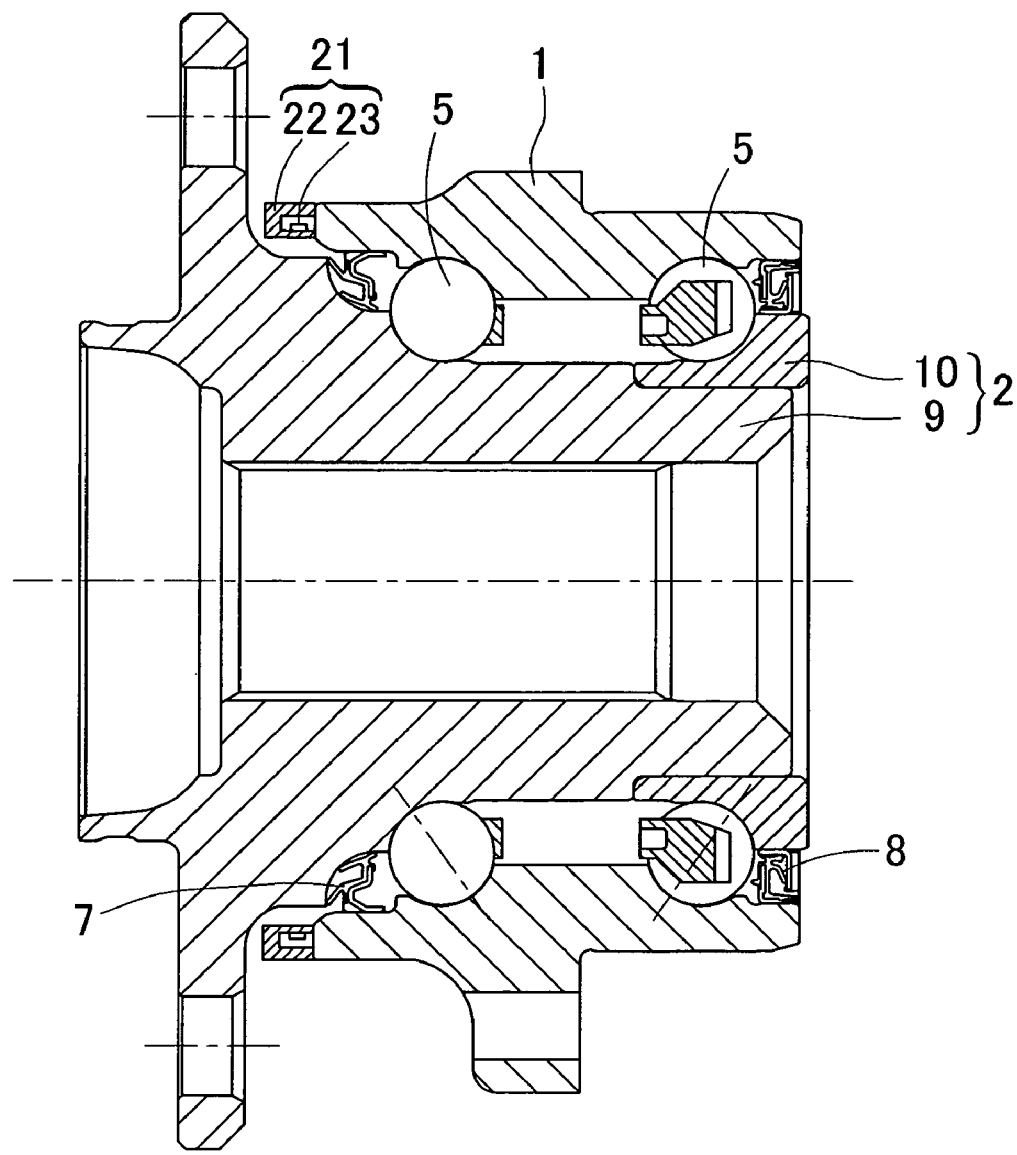
FIG. 39 is a longitudinal sectional view of the sensor-incorporated wheel support bearing assembly, in which the sensor unit is fitted at a different location from that of the twelfth embodiment.
Figure 40:
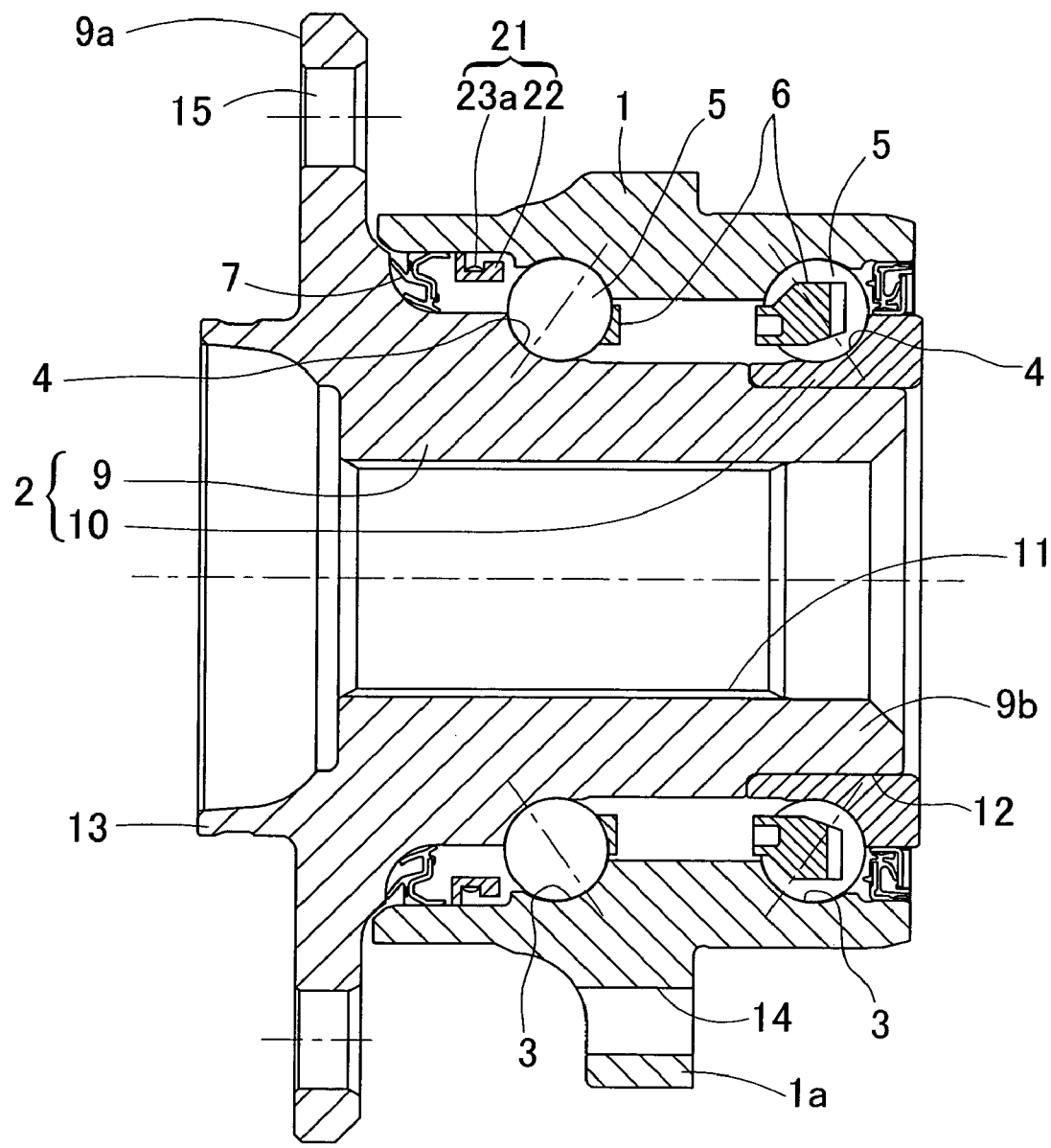
FIG. 40 is a longitudinal sectional view of the sensor-incorporated wheel support bearing assembly according to a thirteenth preferred embodiment of the present invention.
Figure 41:
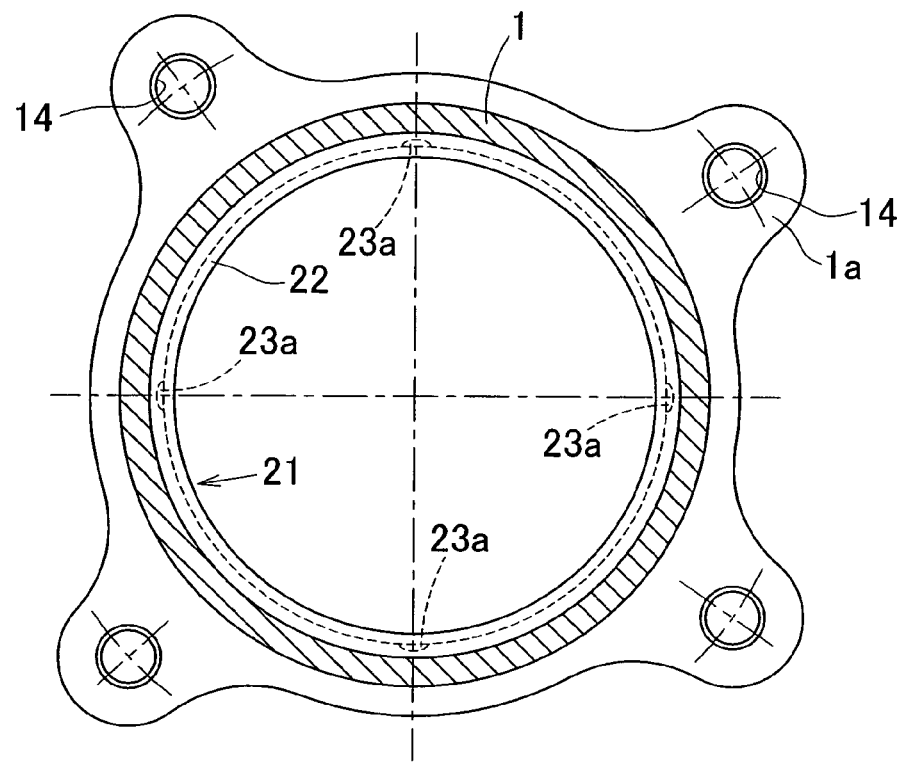
FIG. 41 is a partial sectional front view of the outer member and the sensor unit of the sensor-incorporated wheel support bearing assembly according to the thirteenth embodiment.

As shown in FIG. 39, the sensor unit 21 having the ring member 22 of the above described shape may be fitted to the end face on the outboard side of the outer member 1.

Figure 62:
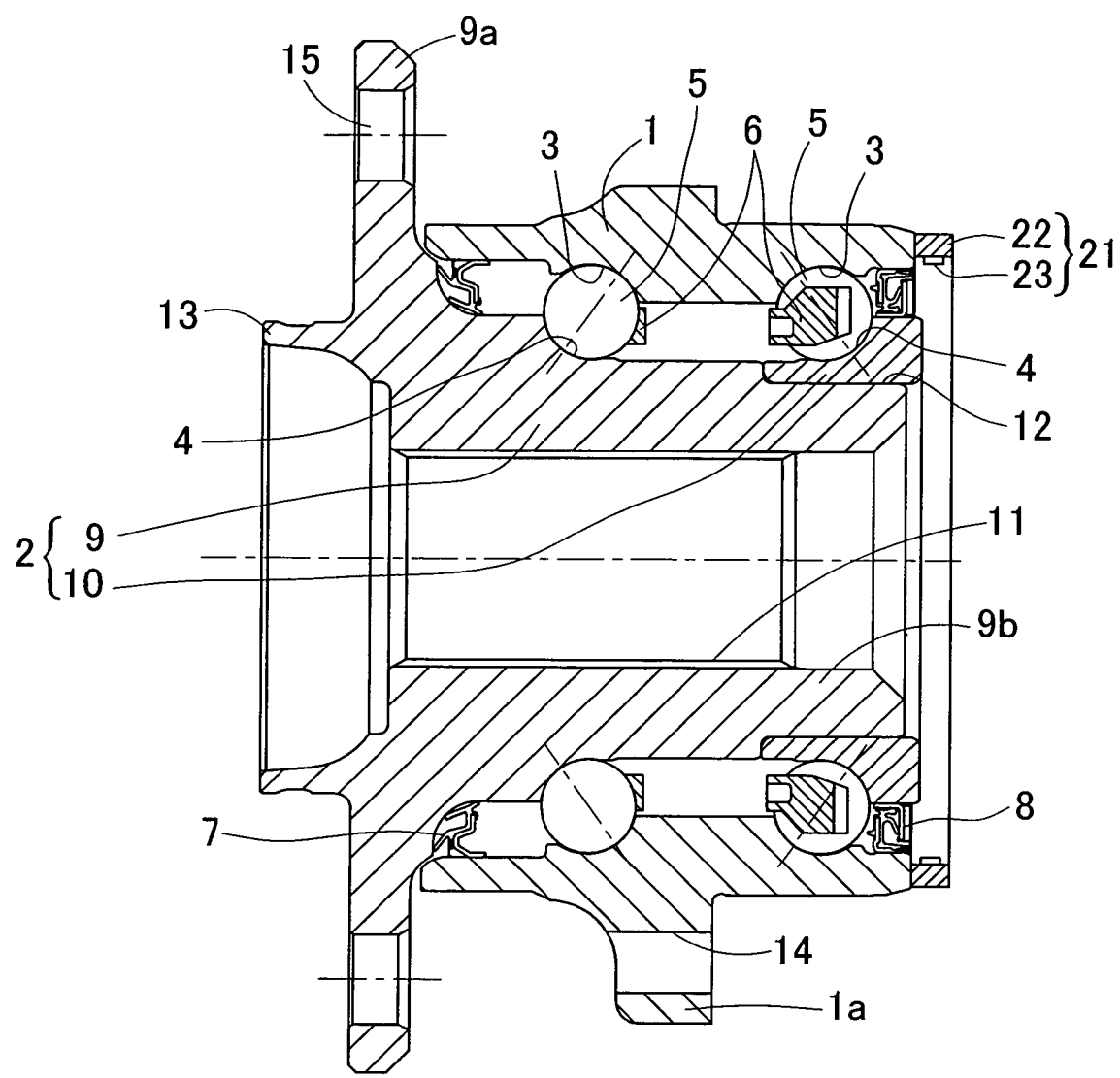
FIG. 62 is a longitudinal sectional view of the sensor-incorporated wheel support bearing assembly according to a second modified example of the present invention.
Figure 63:
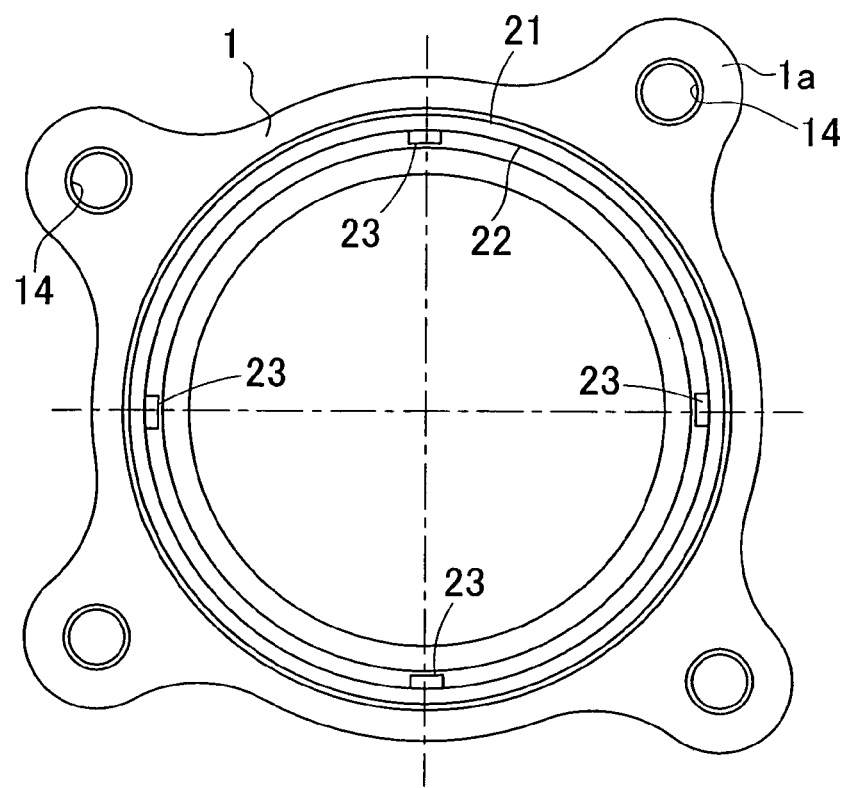
FIG. 63 is a diagram of the outer member and the sensor unit of the sensor-incorporated wheel support bearing assembly in a front view from the inboard side.
Figure 64:
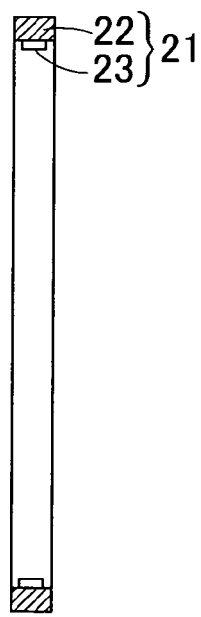
FIG. 64 is a transverse sectional view of the sensor unit shown in FIG. 63.

In the ninth to twelfth embodiments, in order to amplify and transmit the deformation of the outer member 1 to the positions at which the strain sensors 23 of the ring member 22 are fitted, the ring member 22 is formed to have a complicated transverse sectional shape. However, as shown in the second modified example in FIGS. 62 to 64 not assuming the fundamental structure of the present invention, the ring member 22 may be formed in a simple transverse sectional shape. Even in this case, the sensor unit 21 is provided on the end face of the outer member 1. In the second modified example, the transverse sectional shape of the ring member 22 is rectangular and a plurality of strain sensors 23 are affixed to its inner peripheral surface. In this example, four strain sensors 23 are positioned on upward side, downward side, leftward side and rightward side, respectively, of the wheel support bearing assembly.

Figure 65:
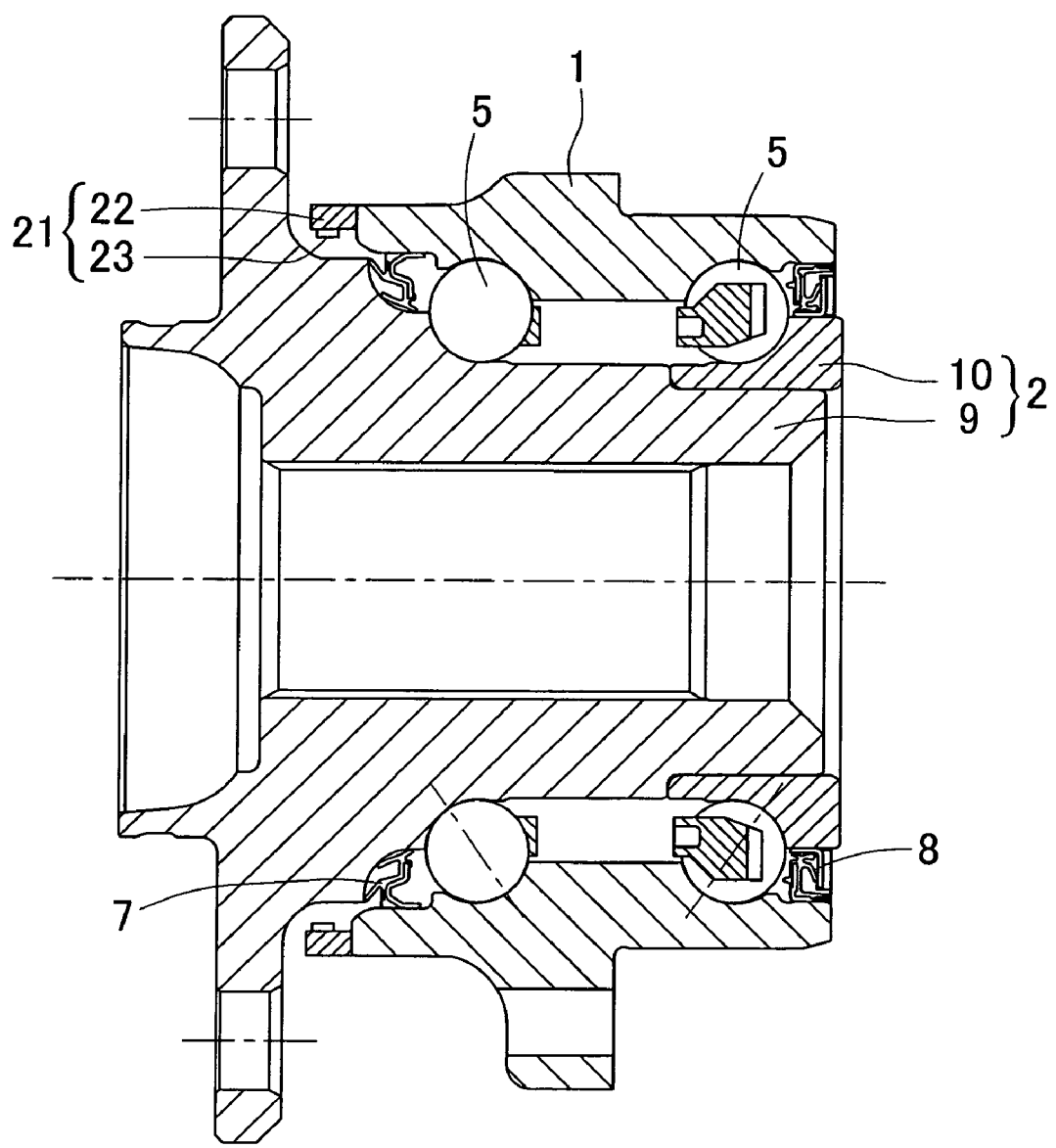
FIG. 65 is a longitudinal sectional view of the sensor-incorporated wheel support bearing assembly, in which the sensor unit is fitted at a different location from that of the second modified example.
Figure 66:
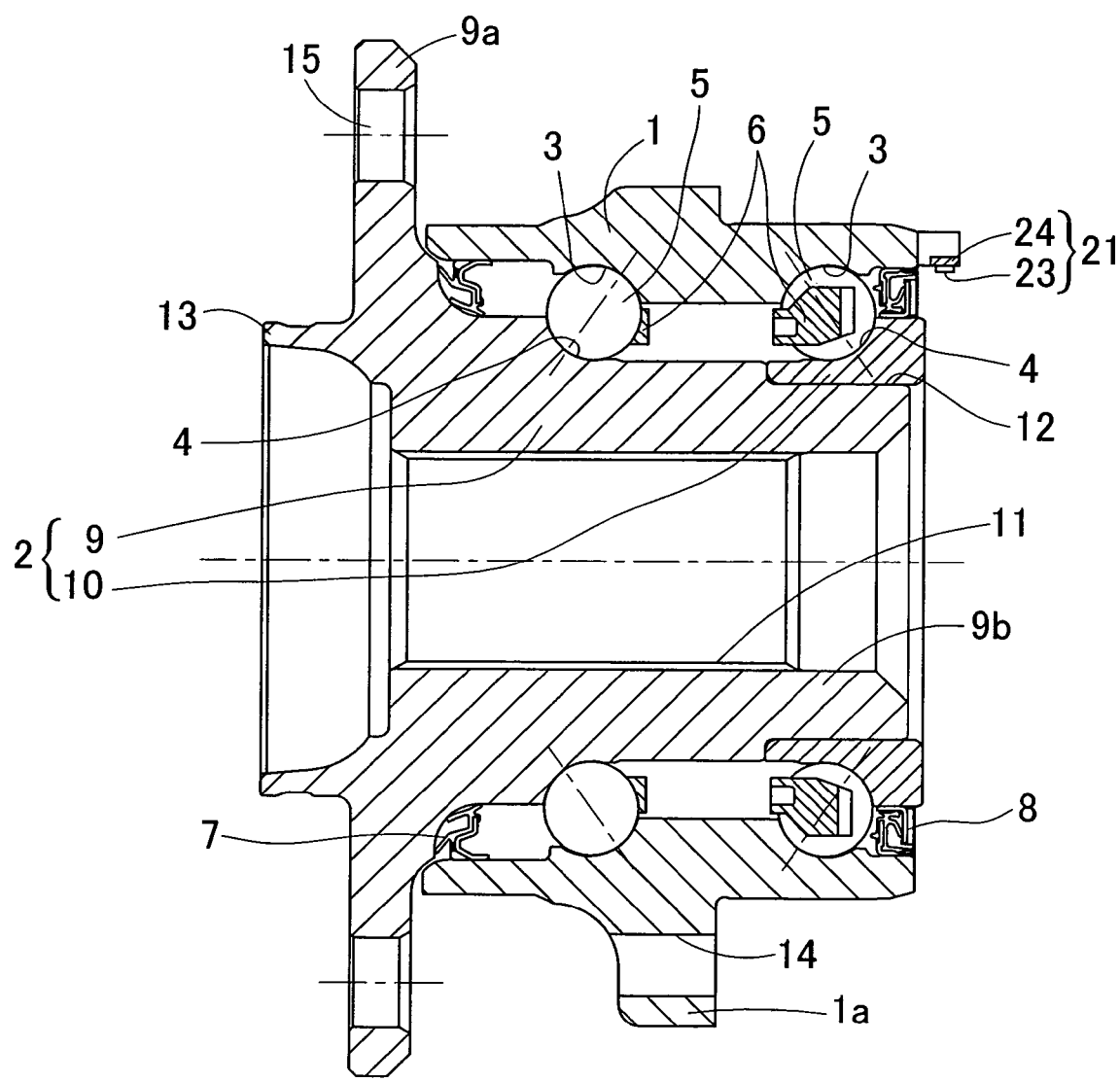
FIG. 66 is a longitudinal sectional view of the sensor-incorporated wheel support bearing assembly according to a third modified example of the present invention.
Figure 67:
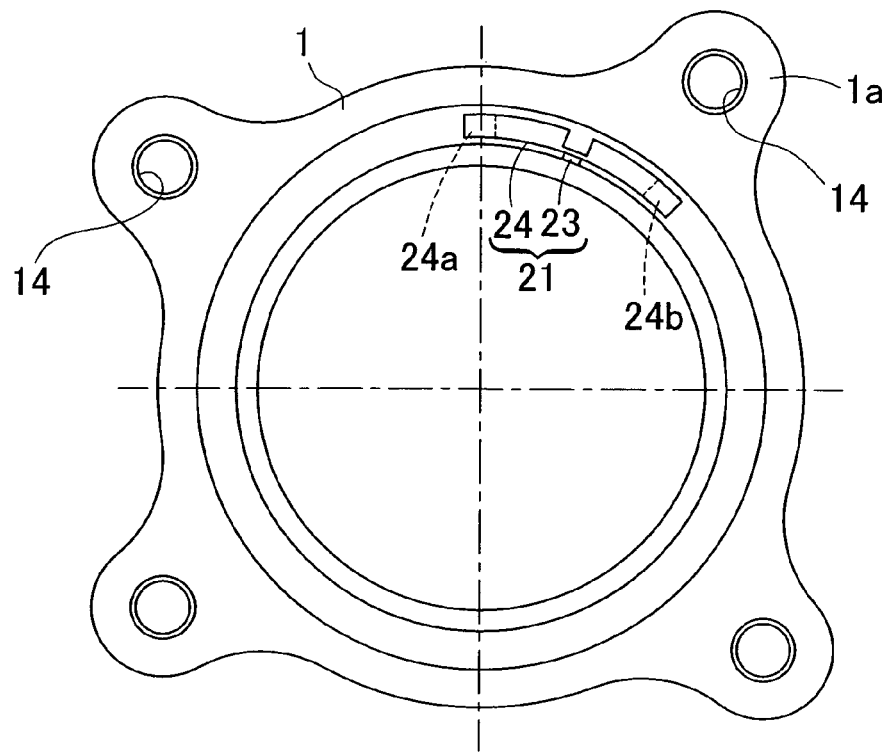
FIG. 67 is a diagram of the outer member and the sensor unit of the sensor-incorporated wheel support bearing assembly shown in FIG. 66 in a front view from the inboard side.

As shown in FIG. 65, the sensor unit 21 having the ring member 22 of the above described shape may be fitted to the end face on the outboard side of the outer member 1.

FIGS. 66 to 68A, 68B show a third modified example not assuming the fundamental structure of the present invention. The modified example is similar to the first to fifth embodiments except that the structure of the sensor unit 21 is different therefrom. The sensor unit 21 has a sensor mounting member 24 fitted to part of the end face of the outer member 1 at a portion in a circumferential direction thereof and the strain sensors 23 affixed to the sensor mounting member 24 and measuring a strain on the sensor mounting member 24. Other structural features are similar to those of the first and fifth embodiments. Common parts are indicated by like reference numerals and the description thereof is omitted.

Figure 68A:
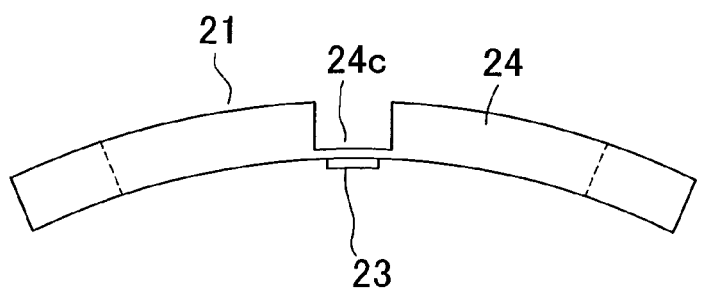
FIG. 68A is a front view of the sensor unit shown in FIG. 66.
Figure 68B:
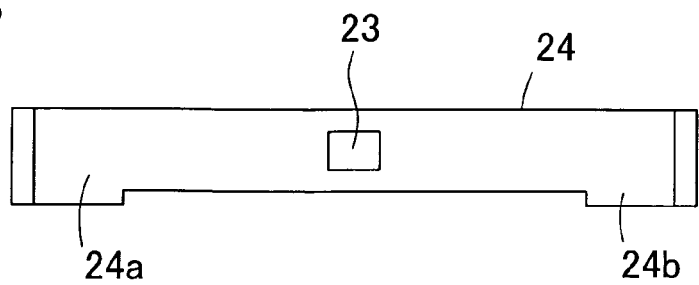
FIG. 68B is a bottom view of the sensor unit shown in FIG. 66.

As shown in FIG. 68A, the sensor mounting member 24 has a front shape formed in an arcuate band shape corresponding to an arcuate shape of the end face on the inboard side of the outer member 1 and has an intermediate portion formed as a notch portion 24c opened to the outer peripheral surface side of the arcuate shape. The sensor mounting member 24 is formed at both ends with contact mounting portions 24a and 24b projected rearwardly. The strain sensors 23 are affixed to the inner peripheral surface of the sensor mounting member 24 positioned on a back side of the notch portion 24c. The sectional shape of the sensor mounting member 24 is represented by rectangular and may also have various shapes.

The sensor unit 21 is fixed to the end face of the outer member 1 through the contact mounting portions 24a and 24b of the sensor mounting member 24. A clearance is defined between the end face of the outer member 1 and a portion of the sensor mounting member 24 other than the contact mounting portions 24a and 24b. The first contact mounting portion 24a, which is one of the contact mounting portions 24a and 24b, is fixed to a portion of the end face of the outer member 1 which is deformed most largely in a radial direction under the load acting on the outer member 1. The second contact mounting portion 24b is fixed to the position in which the deformation of the outer member 1 in the radial direction is less than the fixing position.

In this example, under the effect of a load acting on the hub axle 9, the outer member 1 is deformed through the rolling elements 5 and the deformation is transmitted to the sensor mounting member 24 fitted to the end face of the outer member 1 to deform the sensor mounting member 24. The strain on the sensor mounting member 24 is measured by the strain sensors 23. In this case, the sensor mounting member 24 is deformed according to the radial deformation in a portion of the outer member 1 to which the sensor mounting member 24 is fitted. Since the notch portion 24c is formed in the outer member 1, having low rigidity, a strain larger than that on the outer member 1 appears in the portion to which the sensor mounting member 24 is fitted. Therefore, any slight strain on the outer member 1 can be accurately detected by the strain sensors 23.

In this example, as described above, the load detecting system shown in FIG. 1 may be employed for processing the outputs of the strain sensors 23.

Figure 69:
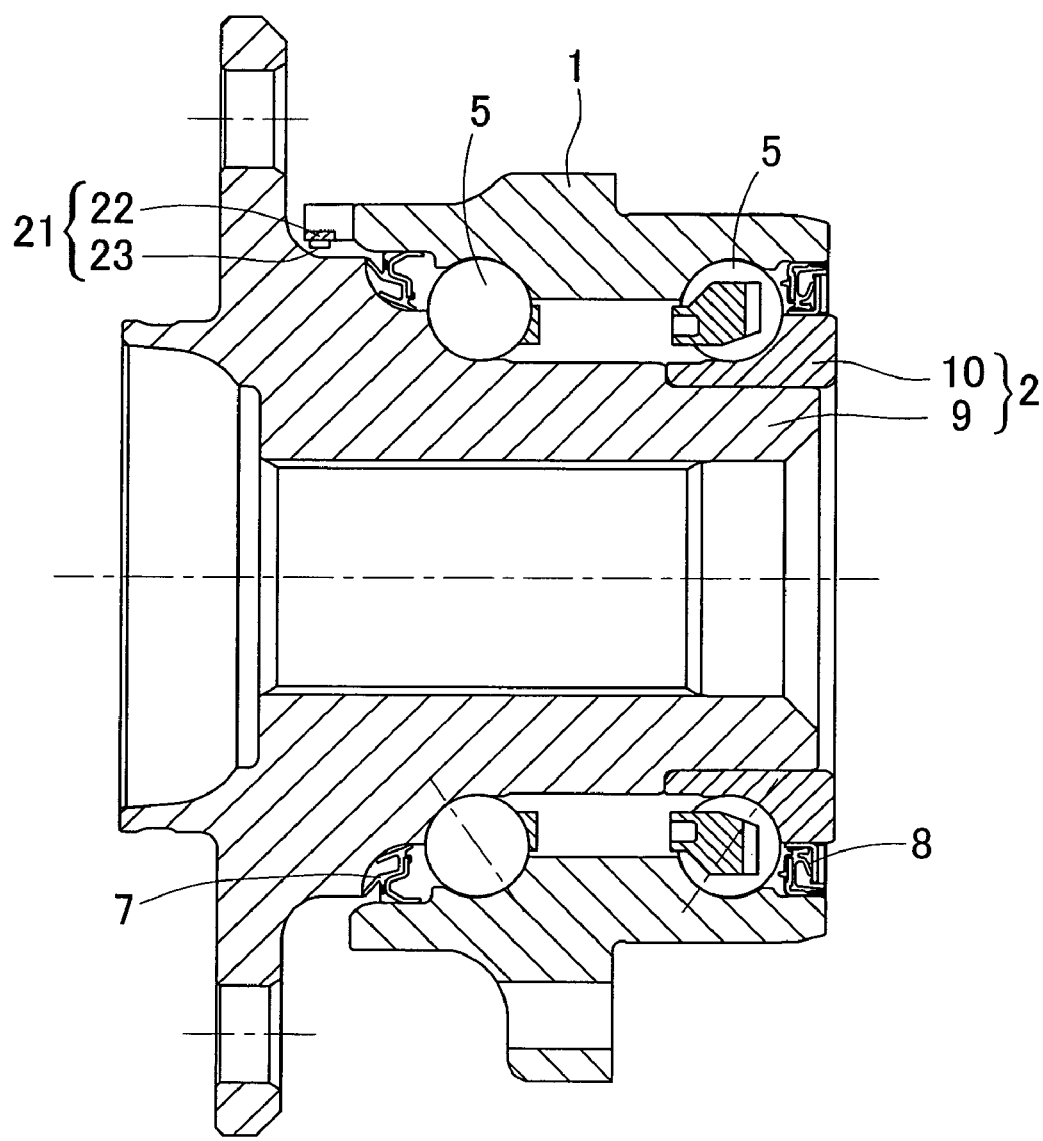
FIG. 69 is a longitudinal sectional view of the sensor-incorporated wheel support bearing assembly, in which the sensor unit is fitted at a different location from that of the third modified example.

Further, as shown in FIG. 69, the sensor unit 21 having the ring member 22 of the above described shape may be fitted to the end face on the outboard side of the outer member 1.

FIGS. 40 to 42A, 42B show a thirteenth preferred embodiment of the present invention. The thirteenth embodiment is similar to the first embodiment except that the structure of strain detectors 23a which functions as the strain sensors constituting the sensor unit 21 is different therefrom. Other structural features of the thirteenth embodiment are similar to those of the first embodiment. Common parts are indicated by like reference numerals and the description thereof is omitted.

Figure 42A:
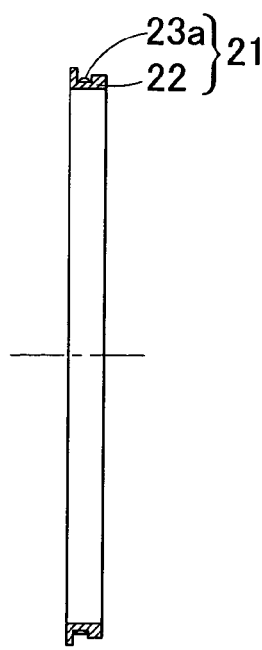
FIG. 42A is a transverse sectional view of an important portion of the sensor unit employed in the thirteenth embodiment.
Figure 42B:
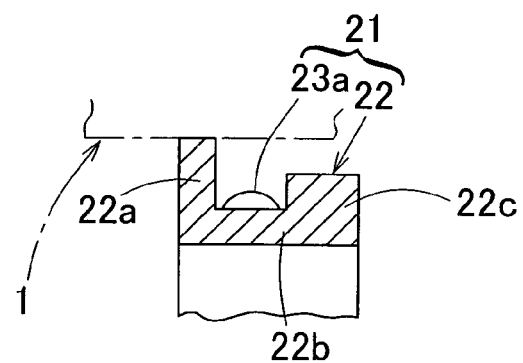
FIG. 42B is an enlarged view of the important portion of the sensor unit shown in FIG. 42A.

As shown in FIGS. 42A and 42B, the transverse sectional shape of the ring member 22 of this embodiment has a sectional shape having the contact ring portion 22a in contact with the inner peripheral surface of the outer member 1 and the non-contact ring portion 22b not contact with the inner peripheral surface of the outer member 1, in which the portion of the non-contact ring portion 22b remote from the contact ring portion 22a is formed as the thick-walled portion 22c having greater wall thickness than other portions.

Four strain detectors 23a for measuring an axial strain on the ring member 22 are provided on the outer peripheral surface of the non-contact ring portion 22b positioned between the contact ring portion 22a and the thick-walled portion 22c (the bottom portion of the groove shaped portion between the contact ring portion 22a and the thick-walled portion 22c).

Figure 43A:
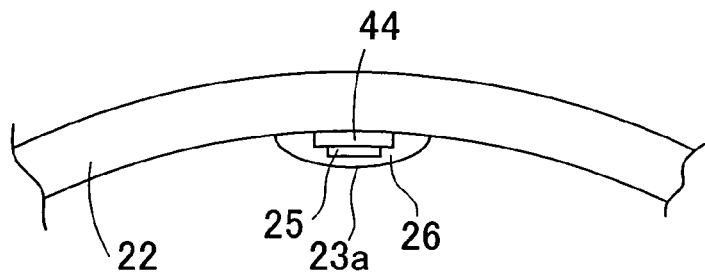
FIG. 43A is a front view of an important portion of the sensor unit employed in the thirteenth embodiment.
Figure 43B:
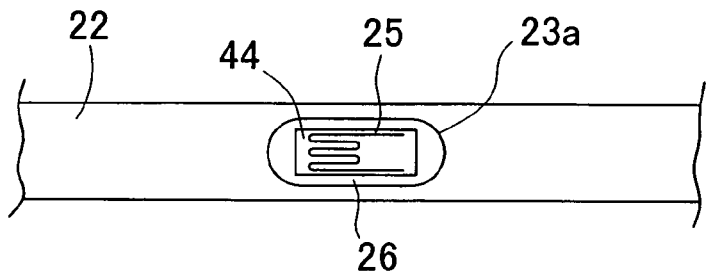
FIG. 43B is a bottom view of an important portion of the sensor unit employed in the thirteenth embodiment.

As shown in FIGS. 43A, 43B, the strain detector 23a includes an insulating film 44 provided on a surface of the ring member 22 and a resistive element 25, for detecting a strain, formed on the insulating film 44 by means of a surface treatment. The surface and periphery of the insulating film 44 and the resistive element 25 are covered with a protective film 26 formed thereon, whereby the resistive element 25 is firmly fixed to the ring member 22 and is isolated from the bearing space in which the sensor unit 21 is provided.

Figure 44A:
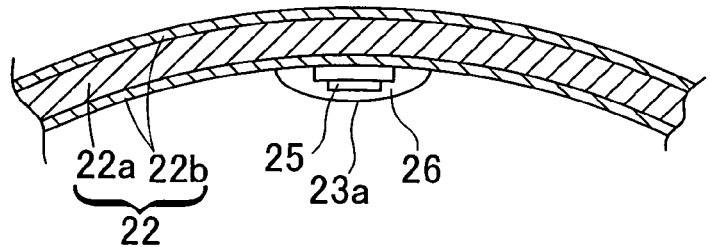
FIG. 44A is a front view of an important portion of a different sensor unit.
Figure 44B:
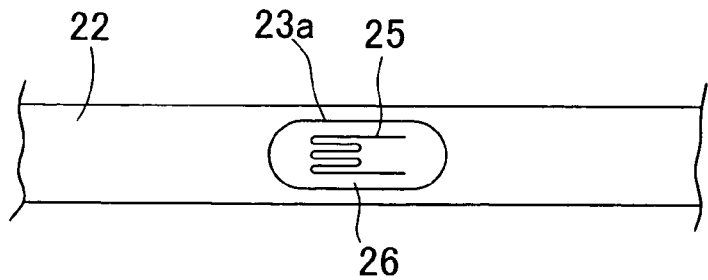
FIG. 44B is a bottom view of an important portion of a different sensor unit.

Instead of forming the insulating film 44 onto the surface of the ring member 22, the ring member 22 itself may be formed of an insulating material. One example thereof is shown in FIG. 44, in which the ring member 22 includes a steel material 22a as a core member and a insulating layer 22b in the form of a silicon film formed on the surface of the steel material 22a. When the ring member 22 itself is an insulating material, the insulating film 44 may be dispensed with.

Also in this embodiment, as described above, under the effect of a load acting on the hub axle 9, the outer member 1 is deformed through the rolling elements 5 and the deformation is transmitted to the ring member 22 fitted to the inner peripheral surface of the outer member 1 to deform the ring member 22. The strain on the ring member 22 is measured by the resistive elements 25 of the strain detectors 23. In the sensor unit 21 employed in this embodiment, since the non-contact ring portion 22b remote from the contact ring portion 22a of the ring member 22 is formed as the thick-walled portion 22c having greater wall thickness than other portions, this portion has high rigidity and is hard to be deformed. Accordingly, the strain occurring between the thick-walled portion 22c and the contact ring portion 22a represents a transferred and enlarged radial strain on the outer member 1, whereby the deformation of the outer member 1 can be detected with good sensitivity with the resistive elements 25 to increase the strain measurement accuracy.

In this embodiment, as described above, the sensor signal processing circuit shown in FIG. 1 may be employed for processing the outputs of the resistive elements 25.

Since in the sensor-incorporated wheel support bearing assembly the resistive elements for detecting a strain is mounted on the sensor mounting member fitted to the stationary member, the load sensor can be mounted compactly on the automotive vehicle. Also, since the sensor mounting member is a simple component part designed to be fitted to the stationary member, the provision of the resistive elements in the sensor mounting member results in excellent mass productivity and reduction of the cost.

Moreover, since the sensor-incorporated wheel support bearing assembly employs, as the strain detector, the resistive elements for detecting a strain which is formed on the insulating film provided on the surface of the sensor mounting member, instead of utilizing the strain sensor as a complete product, the sensor unit can be manufactured at low cost. When the surface and the peripheries of the resistive elements are coated by a coating film, the resistive elements are firmly fixed to the sensor mounting member for preventing the resistive elements from falling off or being displaced. Accordingly, the reliability for maintaining the detection function can be increased.

Figure 45:
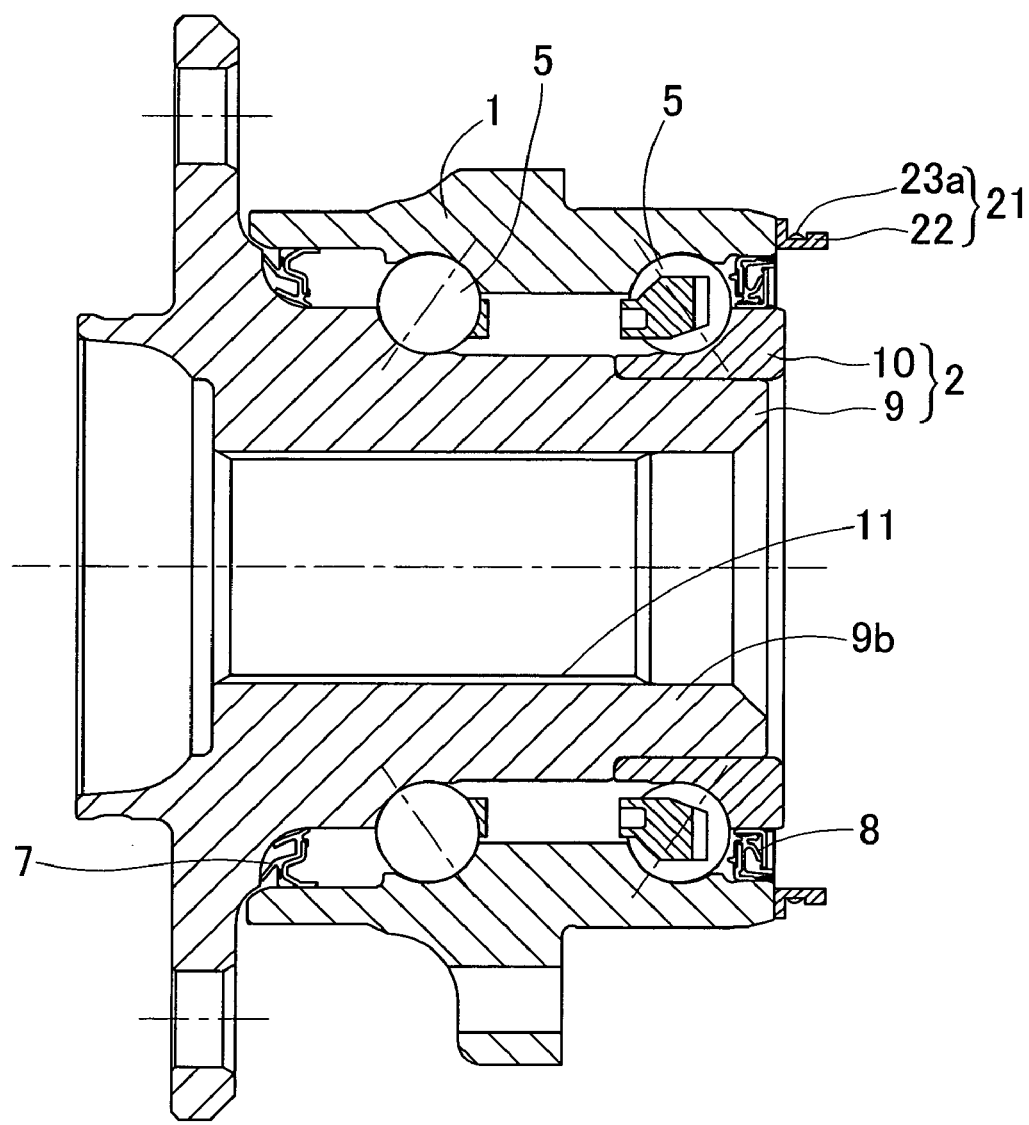
FIG. 45 is a longitudinal sectional view of the sensor-incorporated wheel support bearing assembly, in which the sensor unit is fitted at a different location from that of the sensor-incorporated wheel support bearing assembly shown in FIG. 40.
Figure 46:
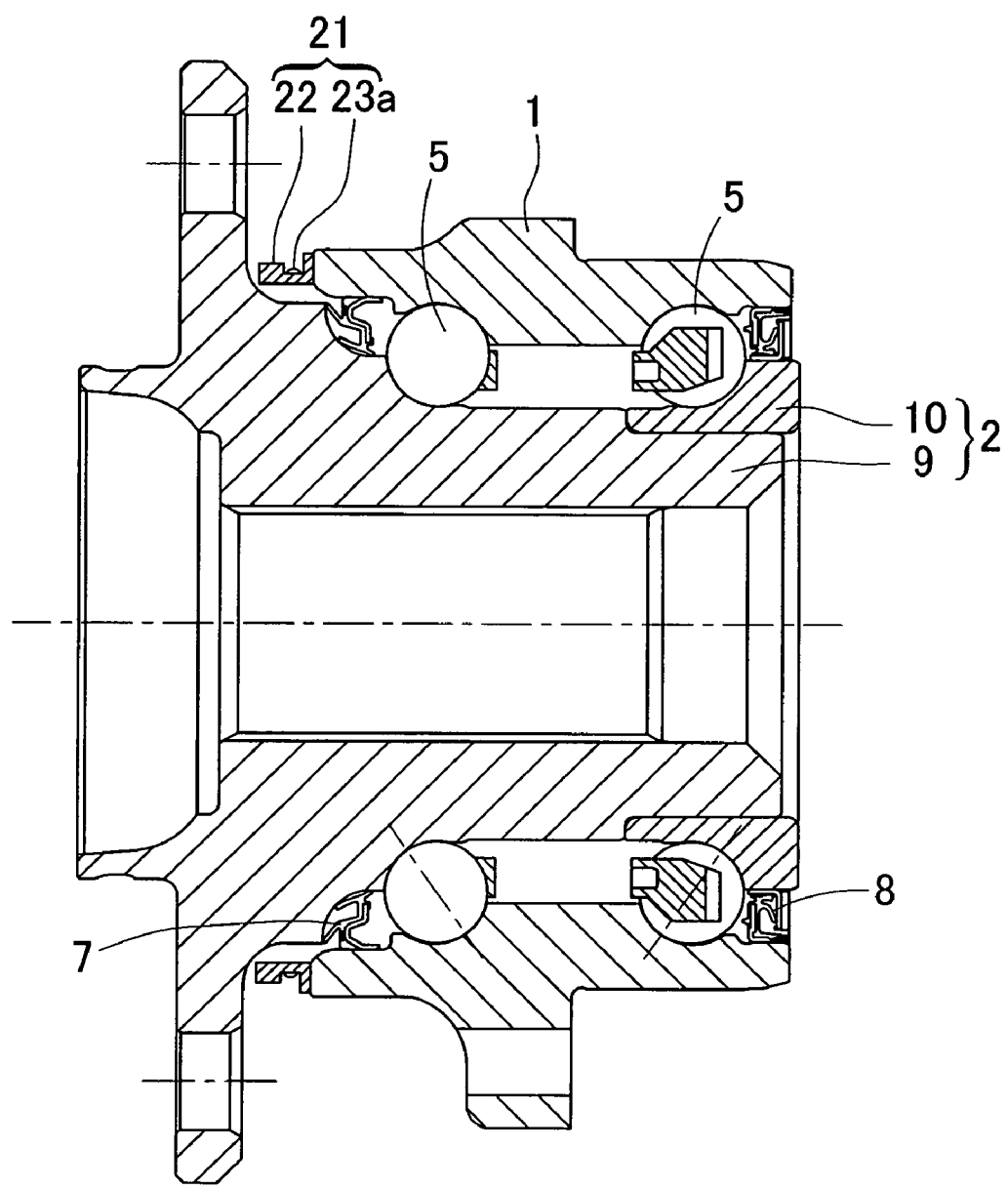
FIG. 46 is a longitudinal sectional view of the sensor-incorporated wheel support bearing assembly, in which the sensor unit is fitted at a further different location from that of the sensor-incorporated wheel support bearing assembly shown in FIG. 40.
Figure 47:
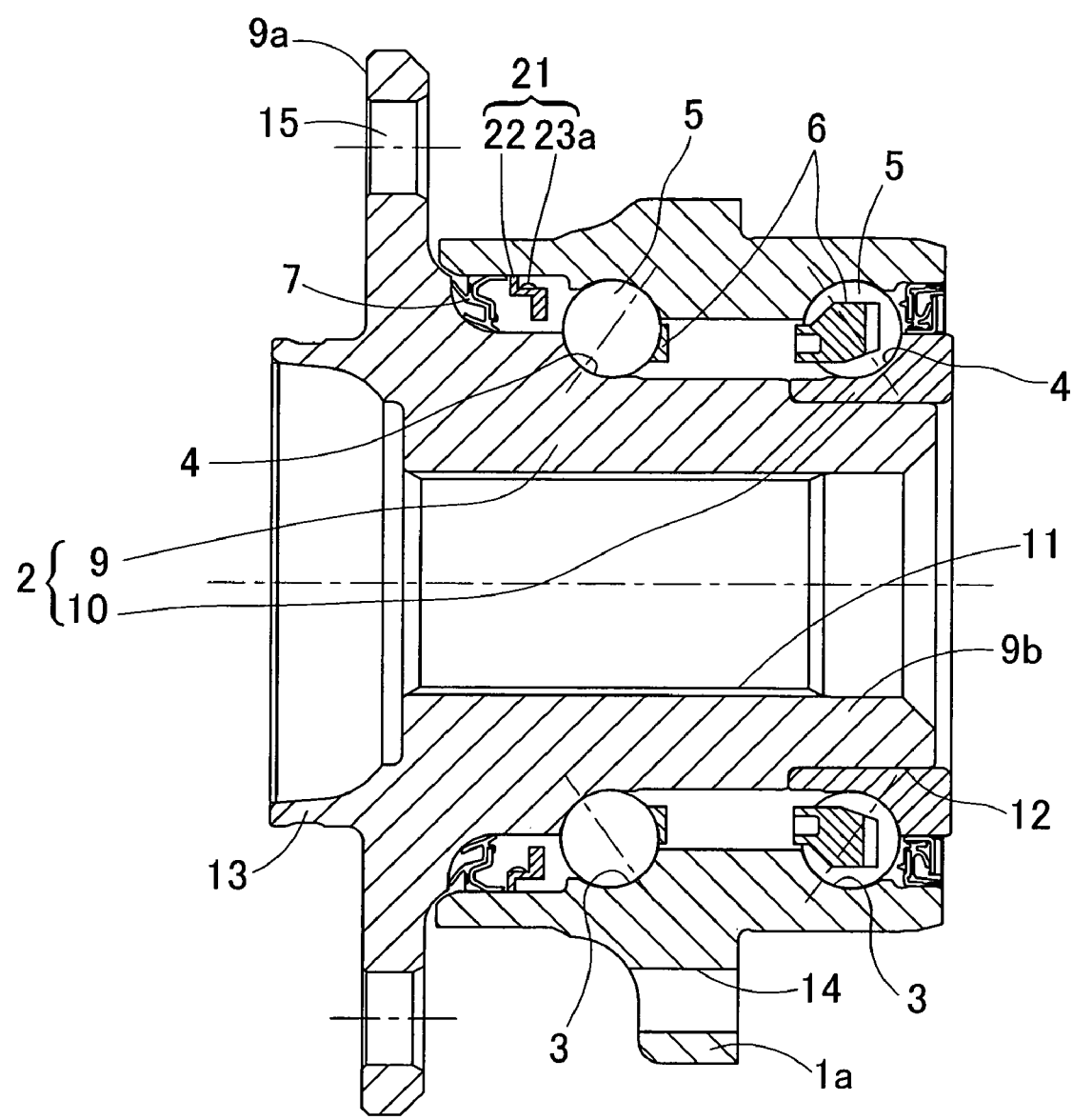
FIG. 47 is a longitudinal sectional view of the sensor-incorporated wheel support bearing assembly according to a fourteenth preferred embodiment of the present invention.
Figure 48:
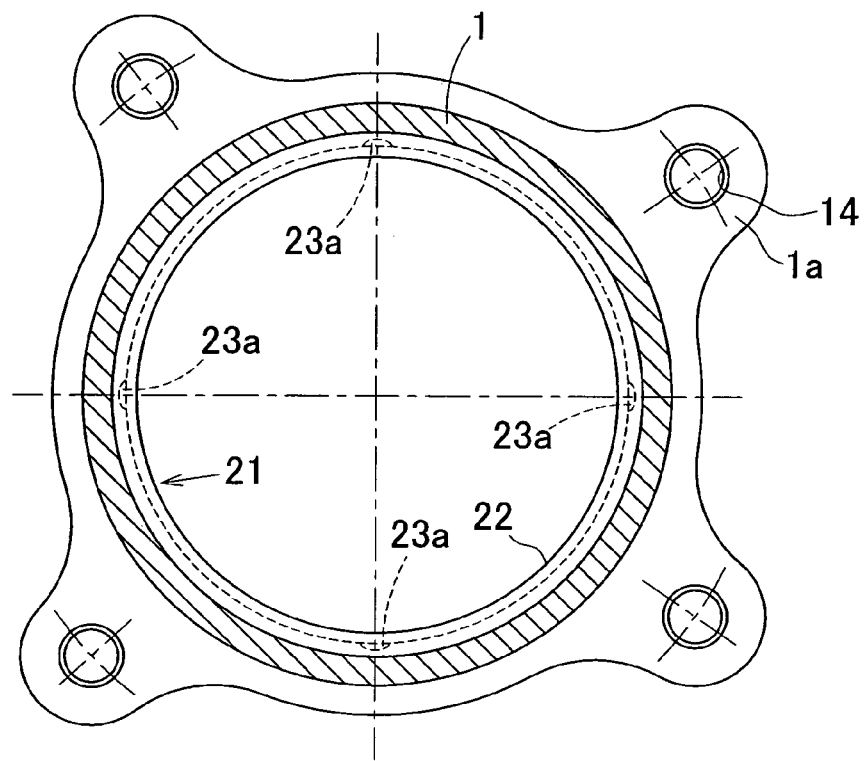
FIG. 48 is a partial sectional front view showing the outer member and the sensor unit of the sensor-incorporated wheel support bearing assembly according to the fourteenth embodiment.

Although in the above described embodiment, the sensor unit 21 is provided on the inner peripheral surface of the outer member 1 as the stationary member, the sensor unit 21 may be provided on the end face of the outer member 1. FIG. 45 shows an example in which the sensor unit 21 is provided on the end face on the inboard side of the outer member 1, while FIG. 46 shows an example in which the sensor unit 21 is provided on the end face on the outboard side of the outer member 1.

FIGS. 47 to 49A, 49B show a fourteenth preferred embodiment of the present invention. The fourteenth embodiment is similar to the thirteenth embodiment except that the shape of the ring member 22 constituting the sensor unit 21 is different therefrom. Other structural features are similar to those of the thirteenth embodiment. Common parts are indicated by like reference numerals and the description thereof is omitted.

Figure 49A:
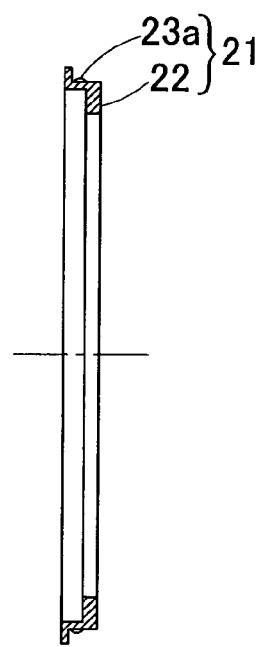
FIG. 49A is a transverse sectional view of an important portion of the sensor unit employed in the fourteenth embodiment.
Figure 49B:
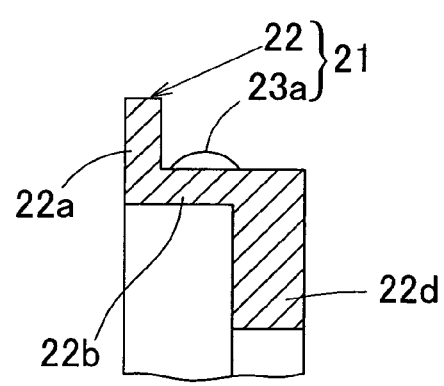
FIG. 49B is an enlarged view of the important portion of the sensor unit shown in FIG. 49A.

The fourteenth embodiment is similar to the thirteenth embodiment in that as shown in FIG. 49B, the ring member 22 has the contact ring portion 22a in contact with the inner peripheral surface of the outer member 1 and the non-contact ring portion 22b not in contact with the inner peripheral surface of the outer member 1, and is different from the thirteenth embodiment in that the flange portion 22d protruding radially inwardly is provided in the portion of the non-contact ring portion 22b remote from the contact ring portion 22a. In this case, the strain detectors 23a for measuring an axial strain on the ring member 22 are provided on the outer peripheral surface of the non-contact ring portion 22b positioned between the contact ring portion 22a and the flange portion 22d (the outer peripheral surface of the cylindrical portion between the contact ring portion 22a and the thick-walled portion 22c).

Even in this embodiment, under the effect of a load acting on the hub axle 9, the outer member 1 is deformed through the rolling elements 5 and the deformation is transmitted to the ring member 22 fitted to the inner peripheral surface of the outer member 1 to deform the ring member 22. In the sensor unit 21 employed in this embodiment, since the flange portion 22d protruding radially inwardly is provided in the portion of the non-contact ring portion 22b remote from the contact ring portion 22a, the flange portion 22d has high rigidity and is hard to be deformed. Accordingly, the strain occurring between the flange portion 22d and the contact ring portion 22a represents a transferred and enlarged radial strain on the outer member 1, whereby, as described above, the strain measurement at high accuracy can be expected.

In this embodiment, as described above, the sensor signal processing circuit shown in FIG. 1 may be employed for processing the outputs of the resistive elements 25.

Figure 50:
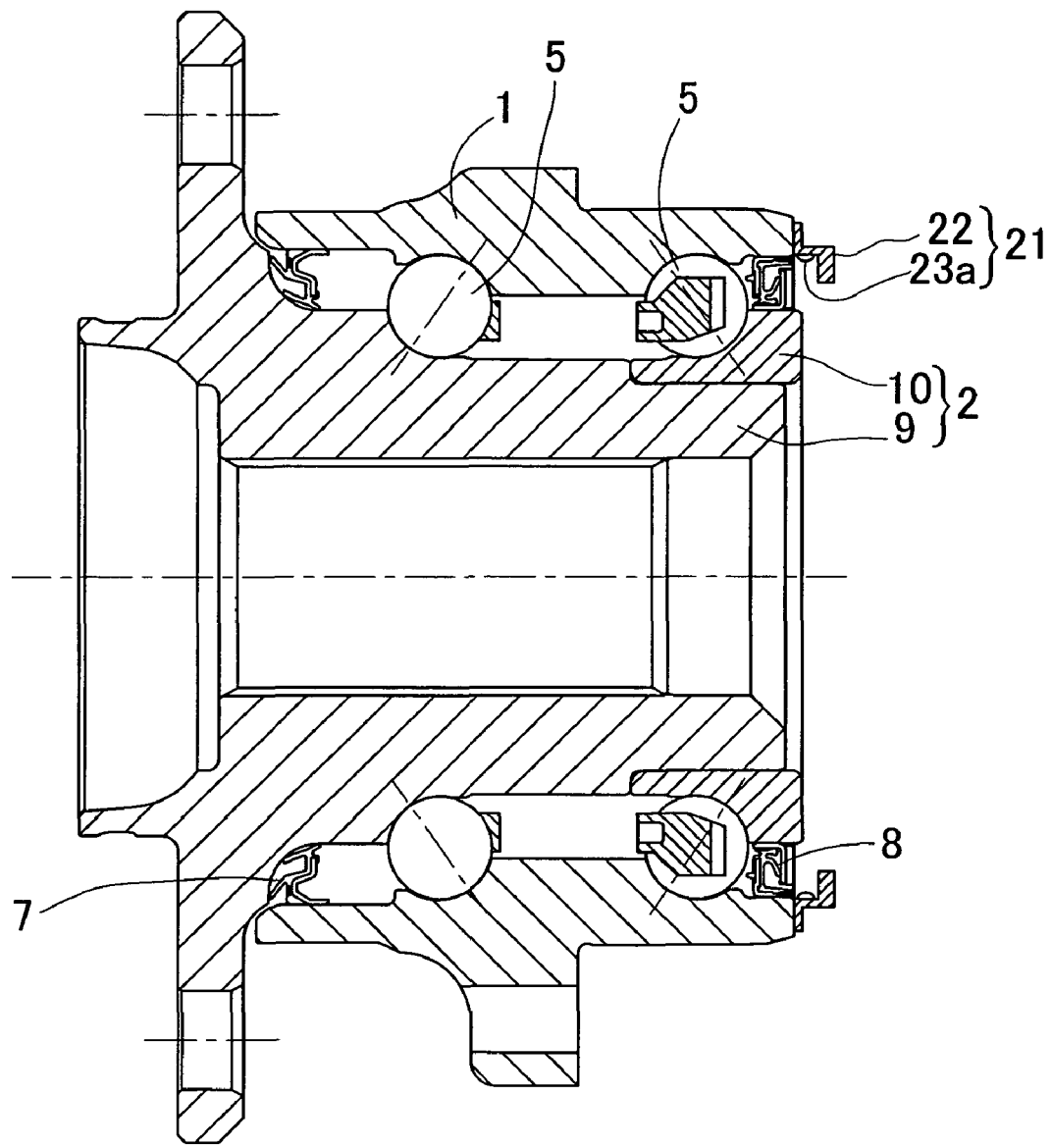
FIG. 50 is a longitudinal sectional view of the sensor-incorporated wheel support bearing assembly, in which the sensor unit is fitted at a different location from that of the sensor-incorporated wheel support bearing assembly shown in FIG. 47.
Figure 51:
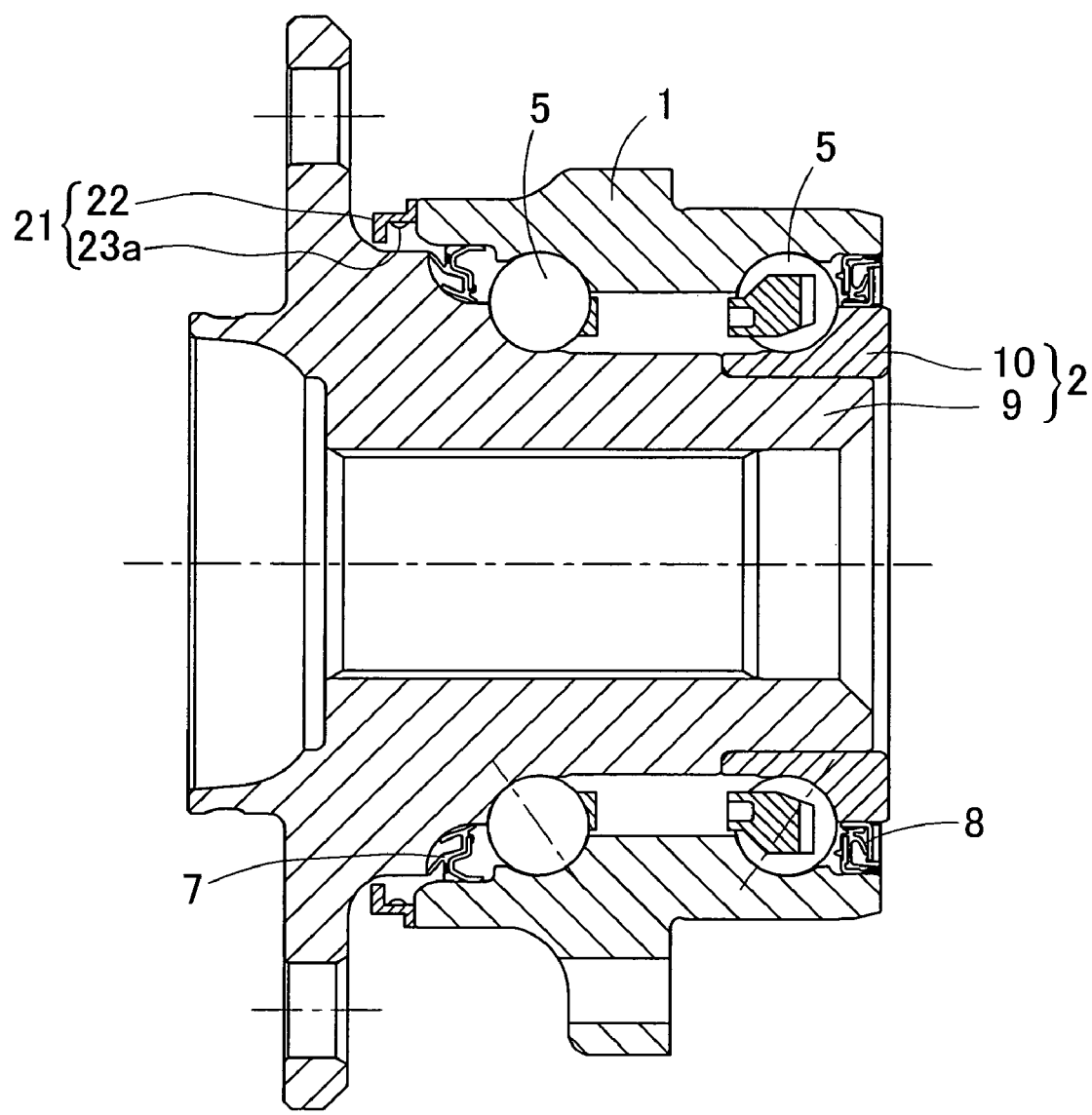
FIG. 51 is a sectional view of the sensor-incorporated wheel support bearing assembly, in which the sensor unit is fitted at a further different location from that of the sensor-incorporated wheel support bearing assembly shown in FIG. 47.
Figure 52:
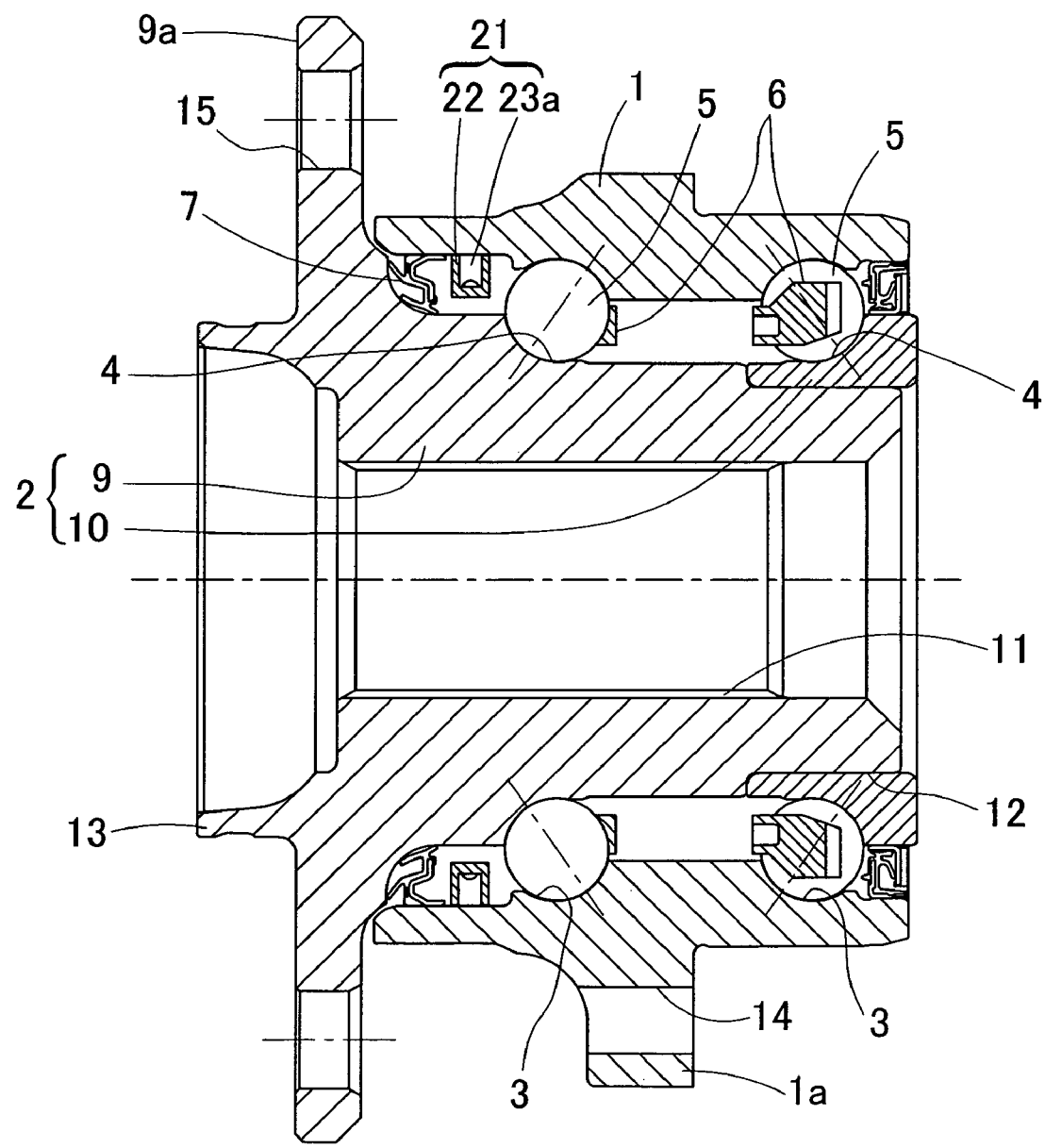
FIG. 52 is a longitudinal sectional view of the sensor-incorporated wheel support bearing assembly according to a fifteenth preferred embodiment of the present invention.
Figure 53:
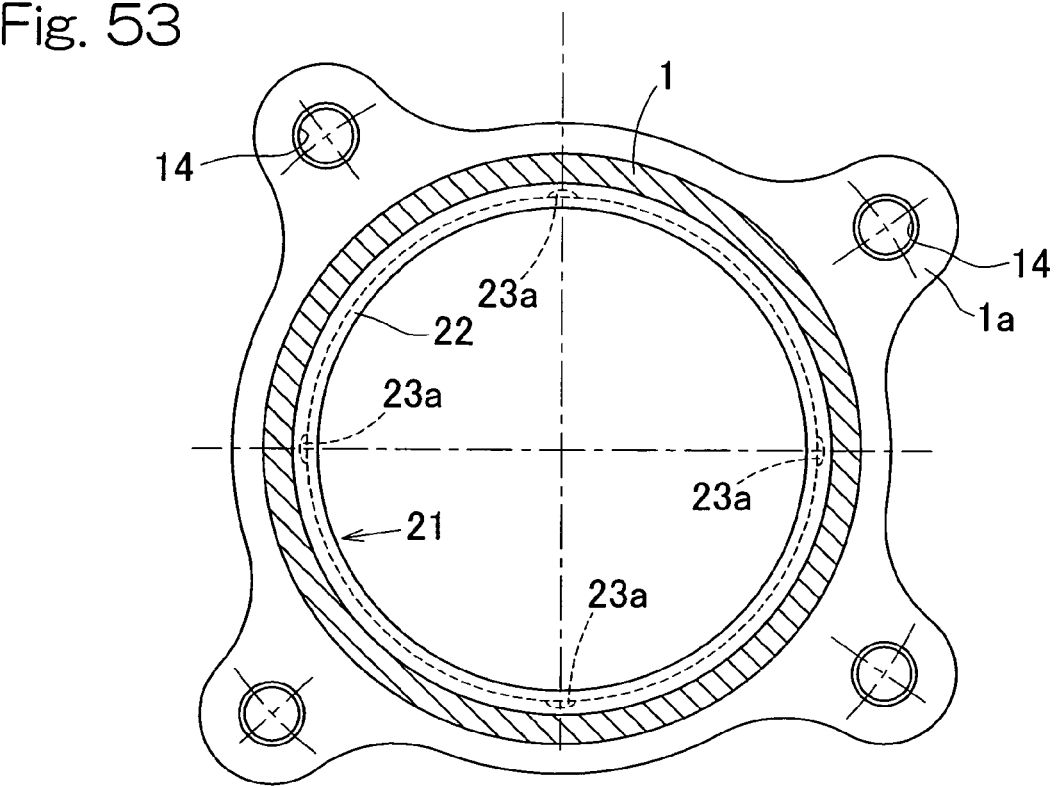
FIG. 53 is a partial sectional front view of the outer member and the sensor unit of the sensor-incorporated wheel support bearing assembly according to the fifteenth embodiment.

Although In the above described embodiment, the sensor unit 21 is provided on the inner peripheral surface of the outer member 1 as the stationary member, the sensor unit may be provided on the end face of the outer member 1. FIG. 50 shows an example in which the sensor unit 21 is provided on the end face on the inboard side of the outer member 1 while FIG. 51 shows an example in which the sensor unit 21 is provided on the end face on the outboard side of the outer member 1.

FIGS. 52 to 54A, 54B show a fifteenth preferred embodiment of the present invention. The fifteenth embodiment is similar to the thirteenth or fourteenth embodiment except that the ring member 22 constituting the sensor unit 21 is different therefrom. Common parts are indicated by like reference numerals and the description thereof is omitted.

Figure 54A:
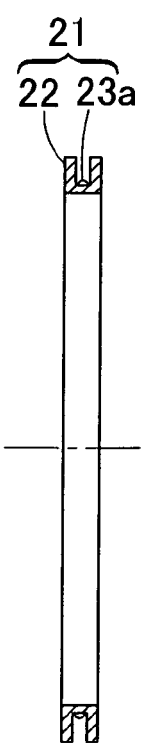
FIG. 54A is a transverse sectional view of an important portion of the sensor unit employed in the fifteenth embodiment.
Figure 54B:
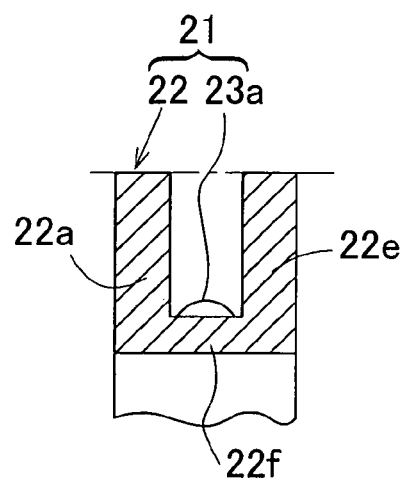
FIG. 54B is an enlarged view of the important portion of the sensor unit shown in FIG. 54A.

As shown in FIG. 54B, the transverse sectional shape of the ring member 22 of this embodiment is represented by a grooved shape having the contact ring portions 22a and 22e in contact with the inner peripheral surface of the outer member 1 and the non-contact ring portion 22f not in contact with the inner peripheral surface of the outer member 1. The non-contact ring portion 22b forms a bottom wall portion of the groove shape and the contact ring portions 22a and 22e form respective side wall portions on both sides of the groove shape. The contact ring portions 22a and 22e on both sides have greater wall thickness than the non-contact ring portion 22f. Here, the wall thickness of the non-contact ring portion 22f is referred to as the thickness in the radial direction and the wall thickness of the contact ring portions 22a and 22e is referred to as the thickness in the axial direction.

The strain detectors 23a for measuring an axial strain on the ring member 22 are provided on the outer peripheral surface of the non-contact ring portion 22f, that is, on the inner bottom surface of the ring member 22.

In this embodiment, under the effect of a load acting on the hub axle 9, the outer member 1 is deformed through the rolling elements 5 and the deformation is transmitted to the ring member 22 fitted to the inner peripheral surface of the outer member 1 to deform the ring member 22. The strain on the ring member 22 is measured by the resistive elements 25. In this case, the non-contact ring portion 22f is deformed mainly according to the deformation of the outer member 1 in the axial direction. Since the contact ring portions 22a and 22e have greater wall thickness than the non-contact ring portion 22f, those portions have high rigidity and are hard to be deformed. Thus, the axial strain caused on the non-contact ring portion 22f represents a transferred and enlarged axial strain on the inner peripheral surface of the outer member 1, whereby the strain measurement accuracy by the resistive elements 25 can be increased.

In this embodiment, as described above, the sensor signal processing circuit shown in FIG. 1 may be employed for processing the outputs of the resistive elements 25.

Figure 55:
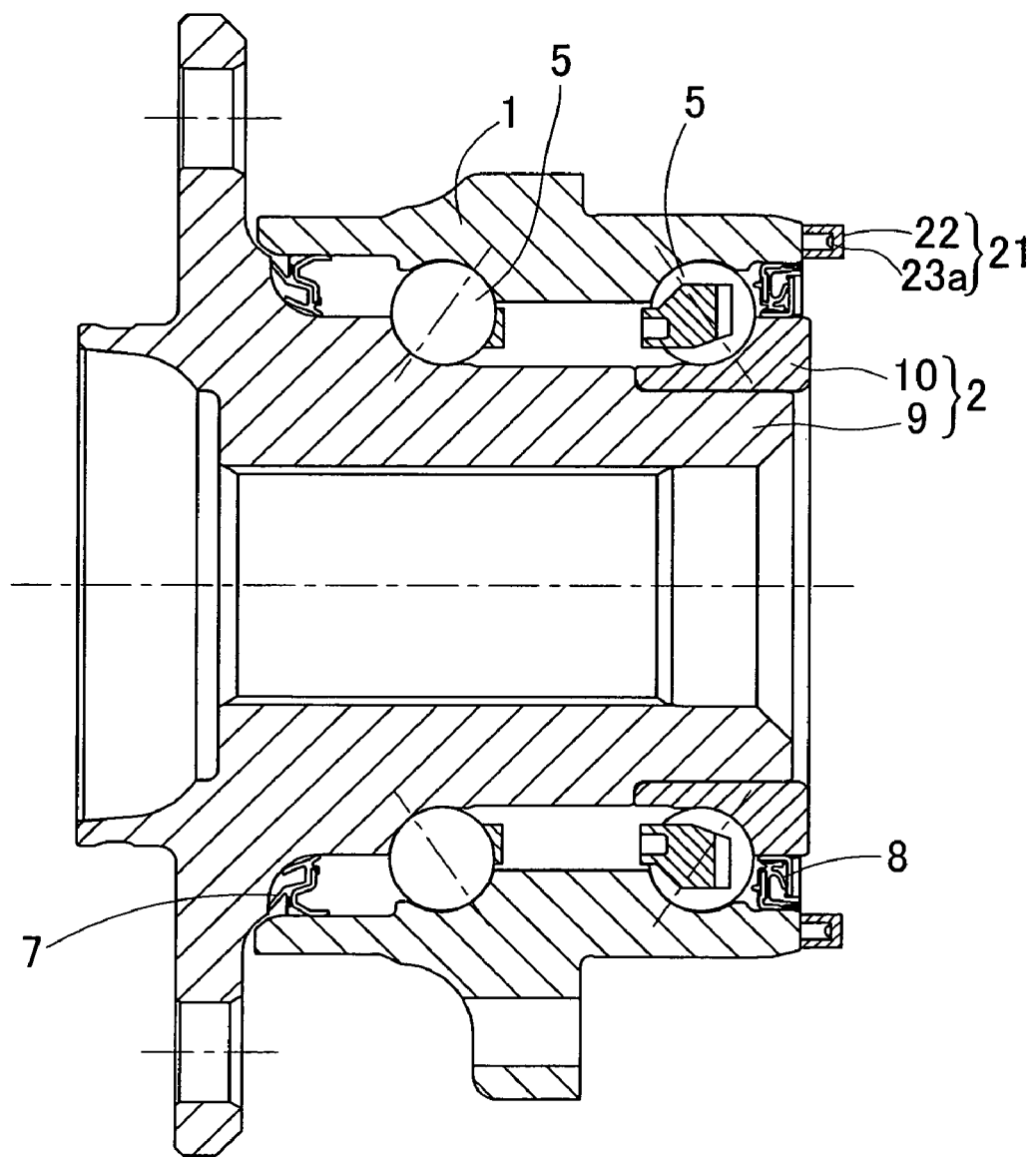
FIG. 55 is a longitudinal sectional view of the sensor-incorporated wheel support bearing assembly, in which the sensor unit is fitted at a different location from that of the sensor-incorporated wheel support bearing assembly shown in FIG. 52.
Figure 56:
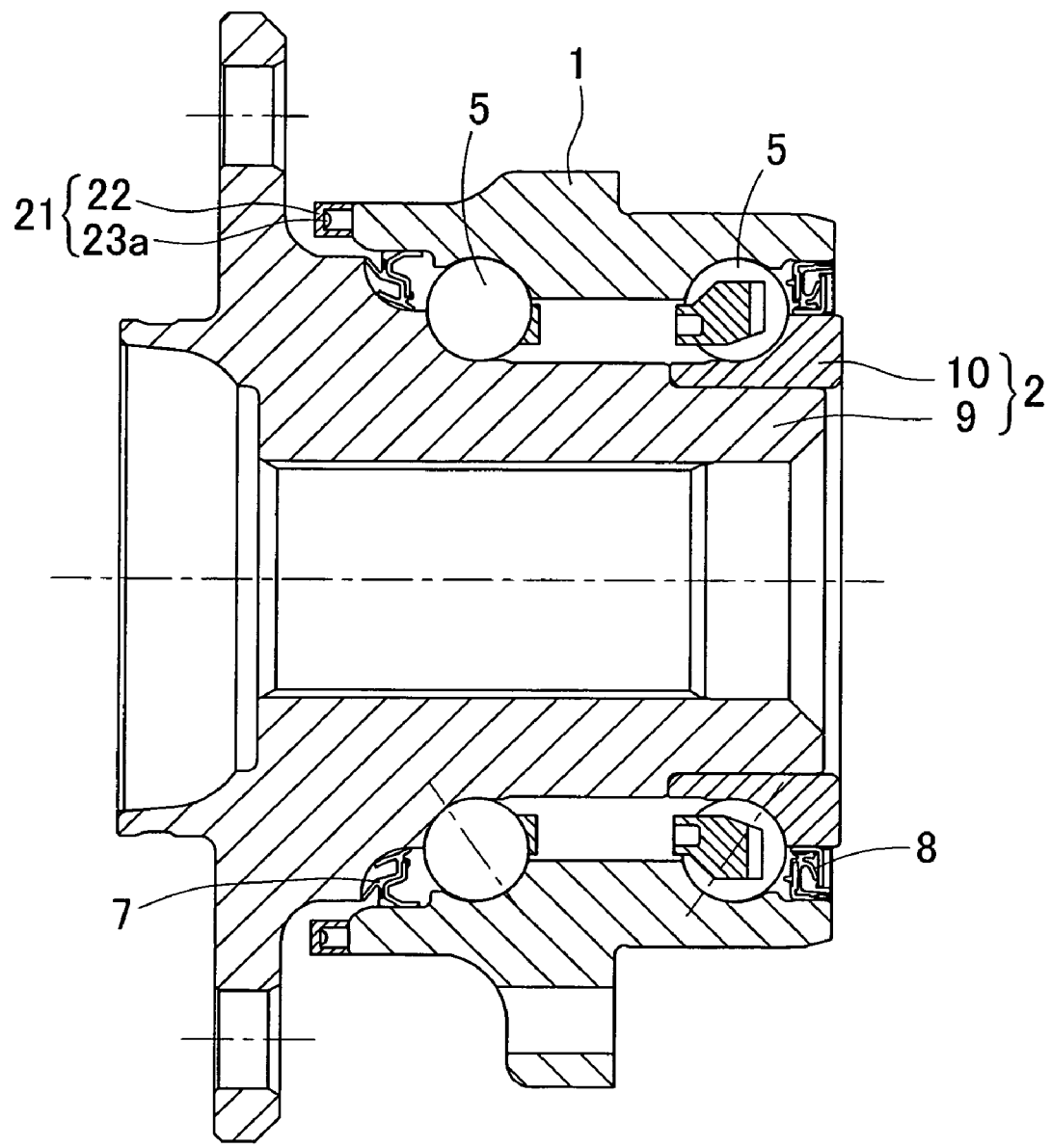
FIG. 56 is a longitudinal sectional view of the sensor-incorporated wheel support bearing assembly, in which the sensor unit is fitted at a further different location from that of the sensor-incorporated wheel support bearing assembly shown in FIG. 52.
Figure 57:
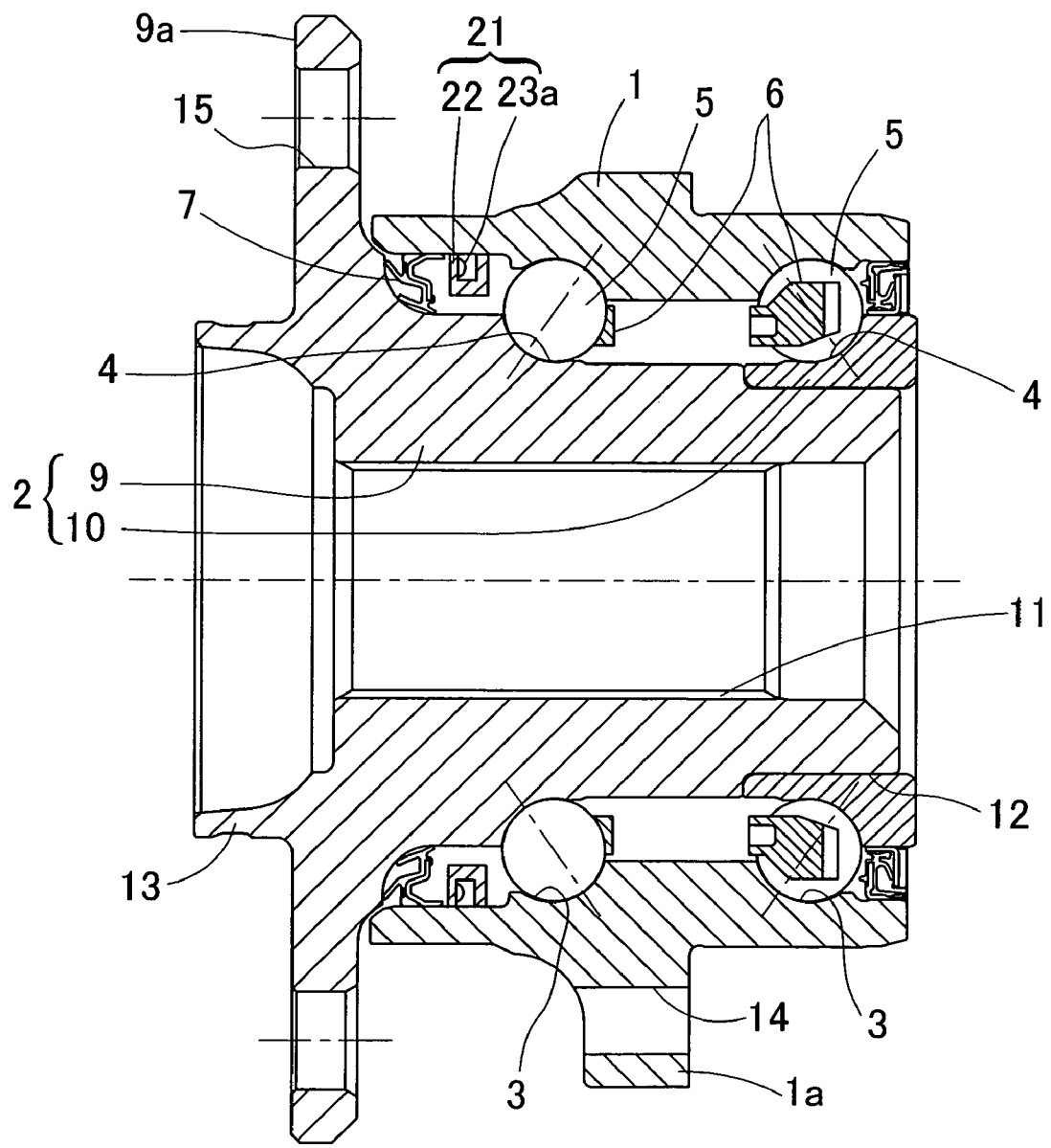
FIG. 57 is a longitudinal sectional view of the sensor-incorporated wheel support bearing assembly according to a sixteenth preferred embodiment of the present invention.
Figure 58:
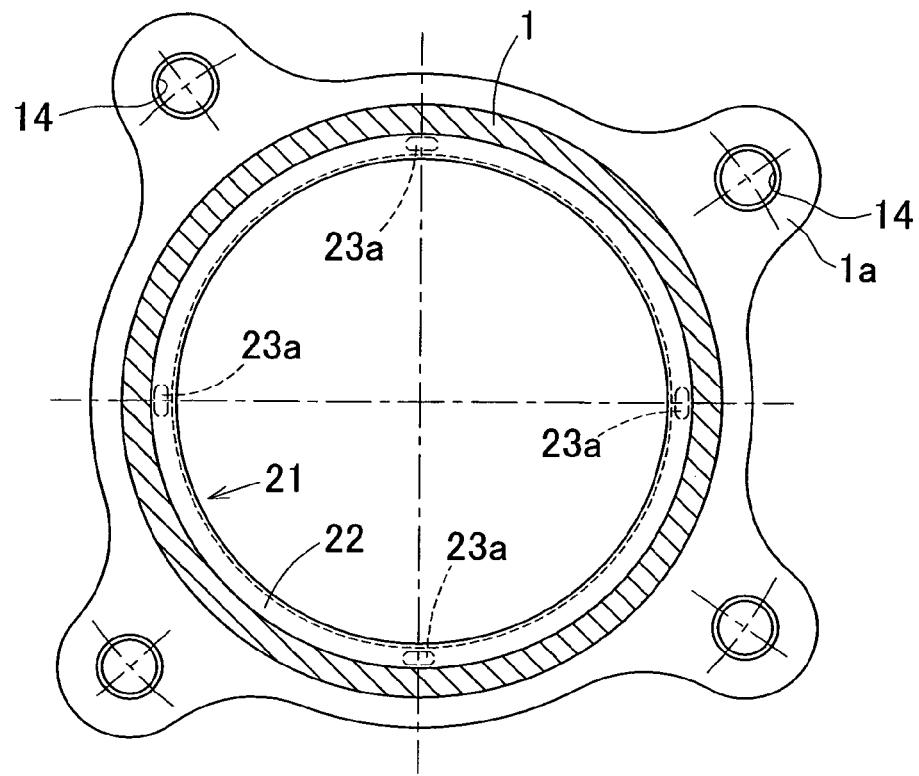
FIG. 58 is a partial sectional front view showing the outer member and the sensor unit of the sensor-incorporated wheel support bearing assembly according to the sixteenth embodiment.

Although in the above described embodiment, the sensor unit 21 is provided on the inner peripheral surface of the outer member 1 as the stationary member, the sensor unit may be provided on the end face of the outer member 1. FIG. 55 shows an example in which the sensor unit 21 is provided on the end face on the inboard side of the outer member 1, while FIG. 56 shows an example in which the sensor unit 21 is provided on the end face on the outboard side of the outer member 1.

FIGS. 57 to 59A, 59B show a sixteenth preferred embodiment of the present invention. The sixteenth embodiment is similar to the thirteenth to fifteenth embodiments except that the ring member 22 constituting the sensor unit 21 is different therefrom. Common parts are indicated by like reference numerals and the description thereof is omitted.

Figure 59A:
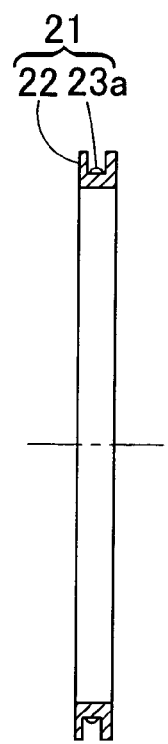
FIG. 59A is a transverse sectional view of an important portion of the sensor unit employed in the sixteenth embodiment.
Figure 59B:
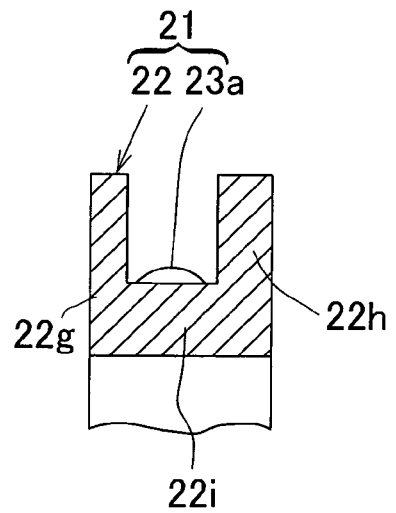
FIG. 59B is an enlarged view of the important portion of the sensor unit shown in FIG. 59A.

As shown in FIG. 59B, the sixteenth embodiment is similar to the fifteenth embodiment in that the transverse sectional shape of the ring member 22 is represented by a grooved shape having the contact ring portions 22g and 22h in contact with the inner peripheral surface of the outer member 1 and the non-contact ring portion 22i not in contact with the inner peripheral surface of the outer member 1. However, in the ring member 22 of this embodiment, of the contact ring portions 22g and 22h on both sides, the contact ring portion 22h has greater wall thickness than the contact ring portion 22g. Further, the non-contact ring portion 22i has a wall thickness greater than those of the contact ring portions 22g and 22h.

The strain detectors 23 for measuring a strain on the ring member 22 in the bending direction are provided on the inner surface of the contact ring portion 22g having smaller wall thickness, that is, on the surface opposed to the contact ring portion 22h.

In this embodiment, under the effect of a load acting on the hub axle 9, the outer member 1 is deformed through the rolling elements 5 and the deformation is transmitted to the ring member 22 fitted to the inner peripheral surface of the outer member 1 to deform the ring member 22. In the sensor unit 21 employed in this embodiment, the contact ring portion 22g having the strain detectors 23a is deformed mainly according to the deformation of the outer member 1 in the axial direction. Since the contact ring portion 22h and the non-contact ring portion 22i have great wall thickness, those portions have high rigidity and are hard to be deformed. Therefore, the bending strain is caused on the contact ring portion 22g having smaller wall thickness. The strain represents a transferred and enlarged axial strain on the inner peripheral surface of the outer member 1, whereby, similarly to the fourth embodiment, the strain measurement at high accuracy can be expected.

In this embodiment, as described above, the sensor signal processing circuit shown in FIG. 1 may be employed for processing the outputs of the resistive elements 25.

Figure 60:
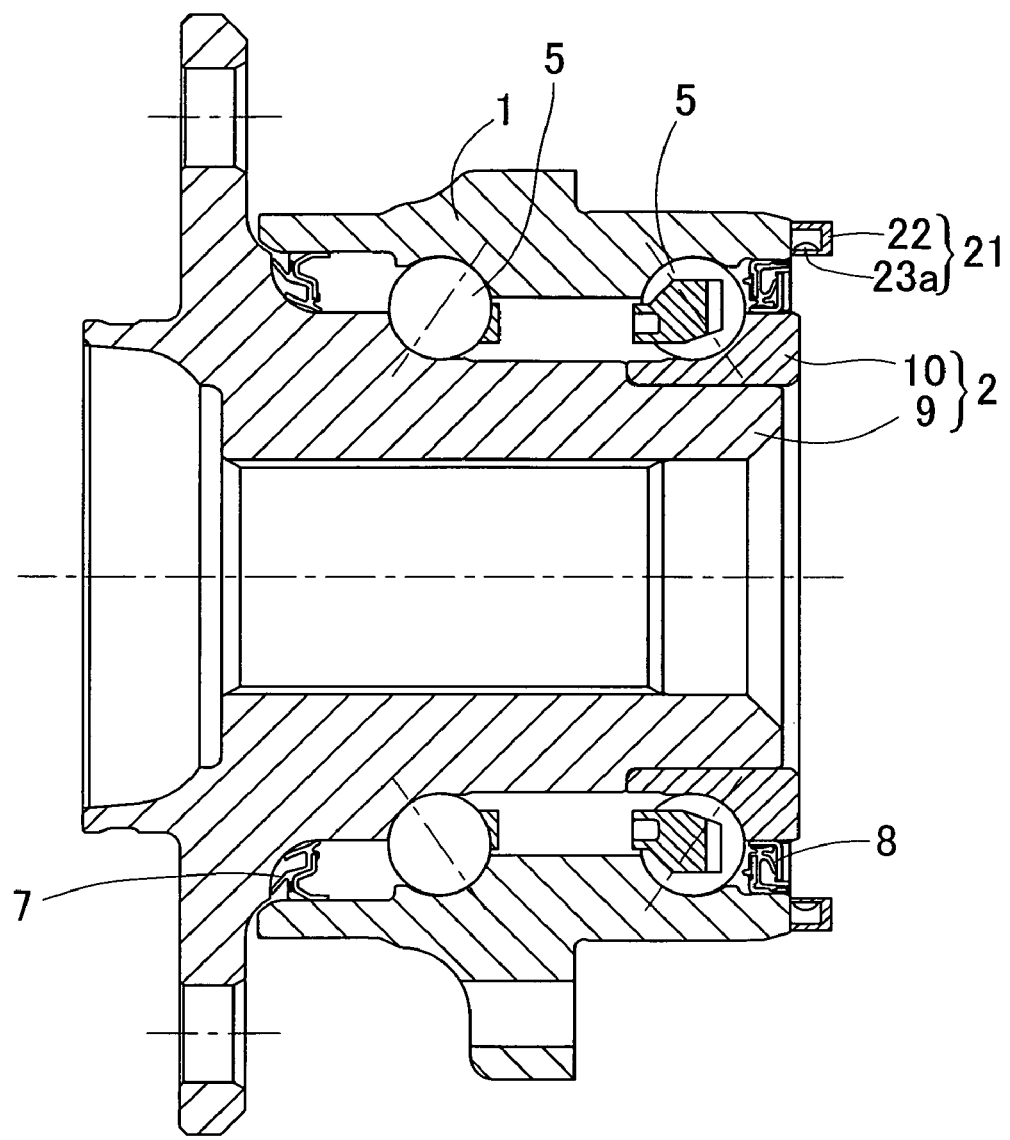
FIG. 60 is a sectional view of the sensor-incorporated wheel support bearing assembly, in which the sensor unit is fitted at a different location from that of the sensor-incorporated wheel support bearing assembly shown in FIG. 57.
Figure 61:
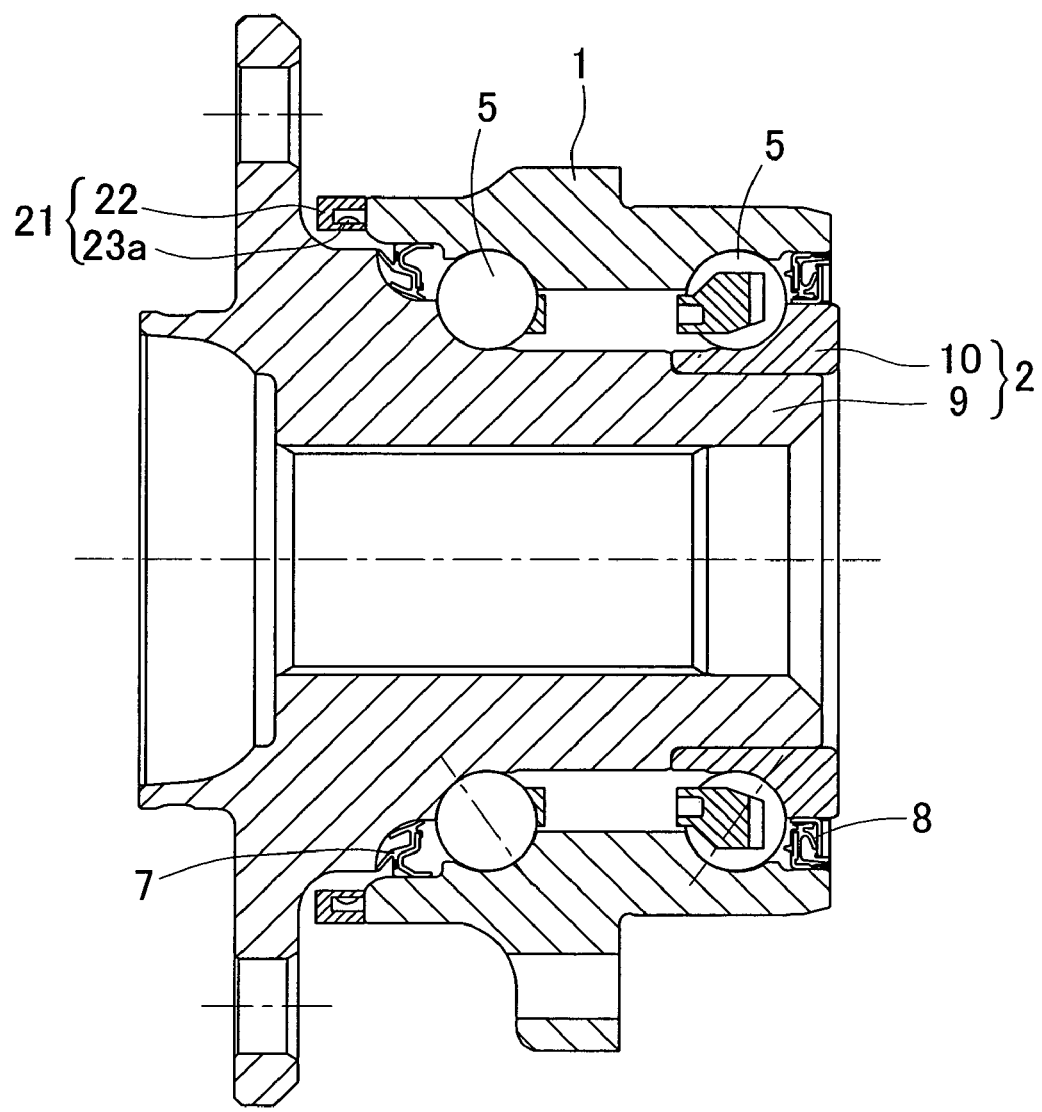
FIG. 61 is a longitudinal sectional view of the sensor-incorporated wheel support bearing assembly, in which the sensor unit is fitted at a further different location from that of the sensor-incorporated wheel support bearing assembly shown in FIG. 57.

Although, in the above described embodiment, the sensor unit 21 is provided on the inner peripheral surface of the outer member 1 as the stationary member, the sensor unit may be provided on the end face of the outer member 1. FIG. 60 shows an example in which the sensor unit 21 is provided on the end face on the inboard side of the outer member 1, while FIG. 61 shows an example in which the sensor unit 21 is provided on the end face on the outboard side of the outer member 1.

Figure 70:
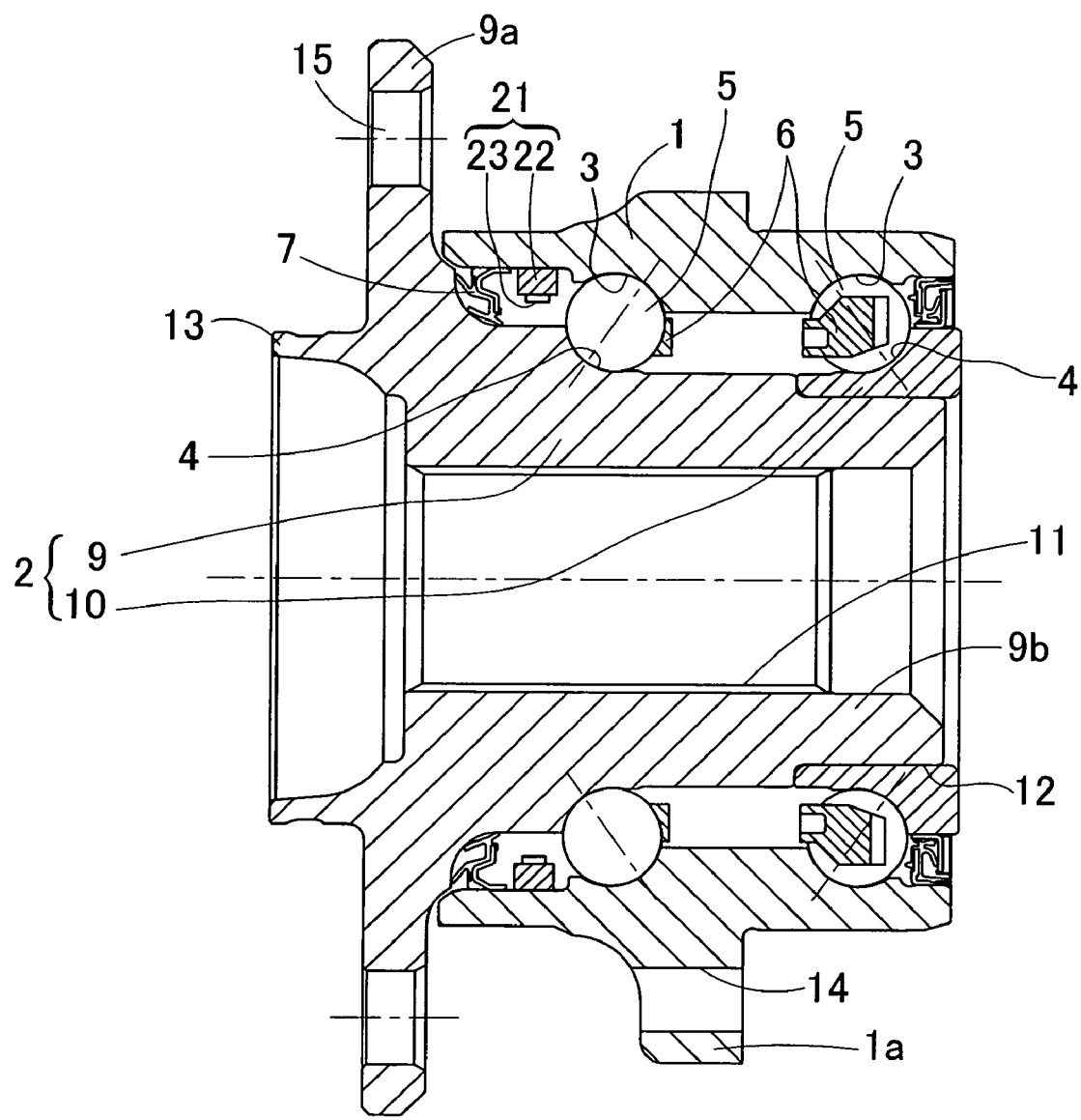
FIG. 70 is a longitudinal sectional view of the sensor-incorporated wheel support bearing assembly according to a fourth modified example of the present invention.
Figure 71:
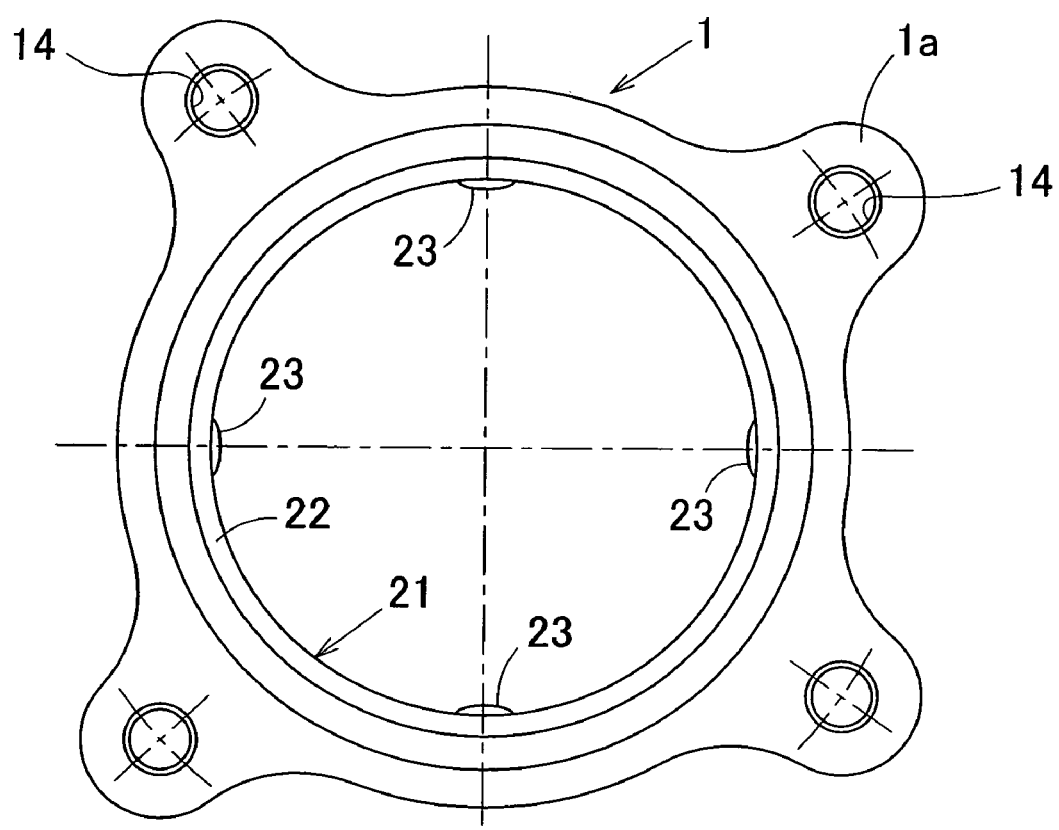
FIG. 71 is a front view showing the outer member and the sensor unit of the sensor-incorporated wheel support bearing assembly shown in FIG. 70.

In the thirteenth to sixteenth embodiments, in order to amplify and transmit the deformation of the outer member 1 to the positions at which the strain sensors 23 of the ring member 22 are fitted, the ring member 22 is formed to have a complicated transverse sectional shape. However, as shown in the second modified example in FIGS. 70 and 71 not assuming the fundamental structure of the present invention, the ring member 22 may be formed in a simple transverse sectional shape. In this case, the sensor unit 21 is provided on the inner peripheral surface of the outer member 1. In the modified example, the transverse sectional shape of the ring member 22 is rectangular and a plurality of strain sensors 23 are affixed to the inner peripheral surface of the ring member 22. In this example, four strain sensors 23 are positioned on upward side, downward side, leftward side and rightward side, respectively, of the wheel support bearing assembly.

Figure 72:
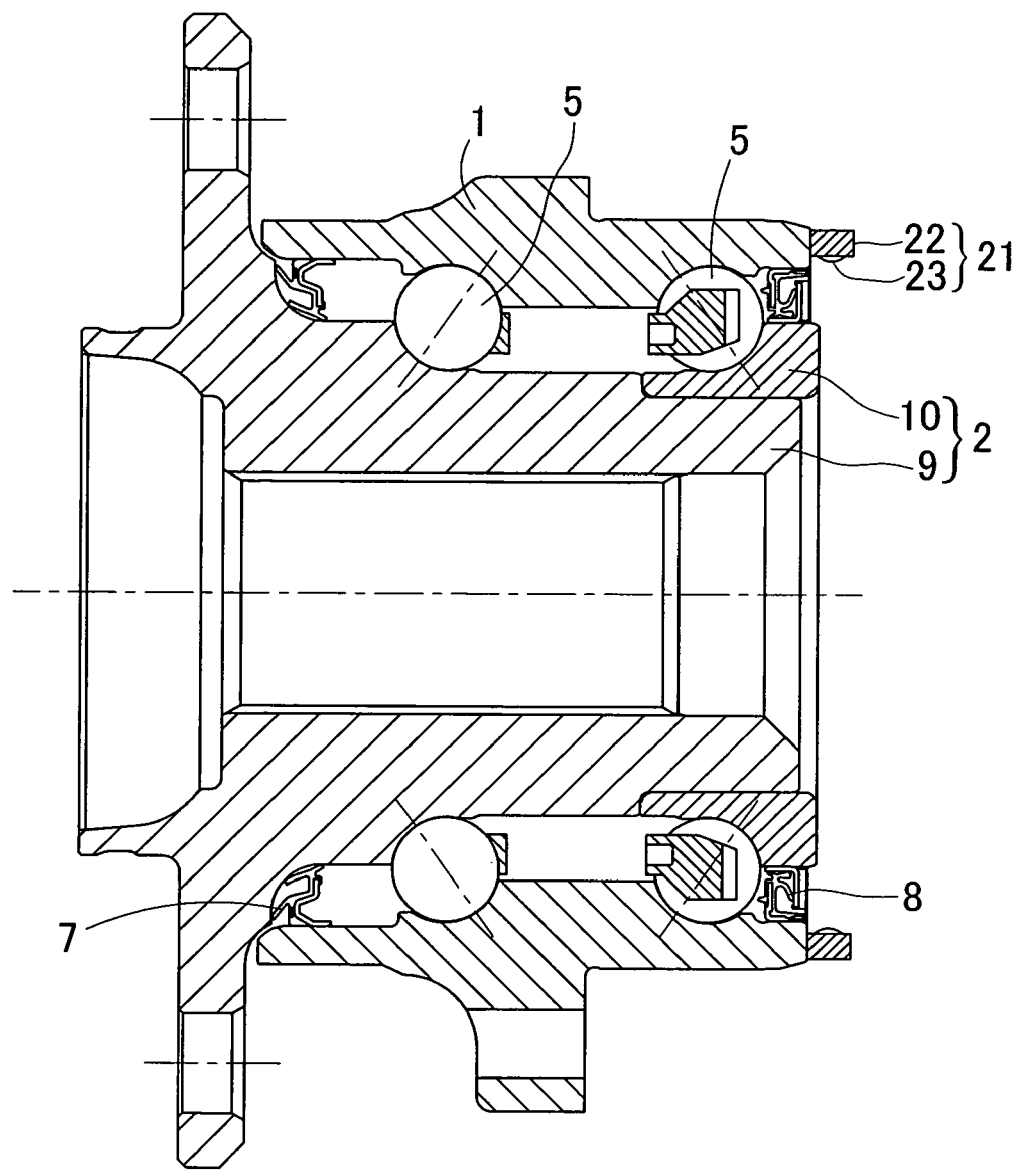
FIG. 72 is a longitudinal sectional view of the sensor-incorporated wheel support bearing assembly, in which the sensor unit is fitted at a different location from that of the sensor-incorporated wheel support bearing assembly shown in FIG. 70.
Figure 73:
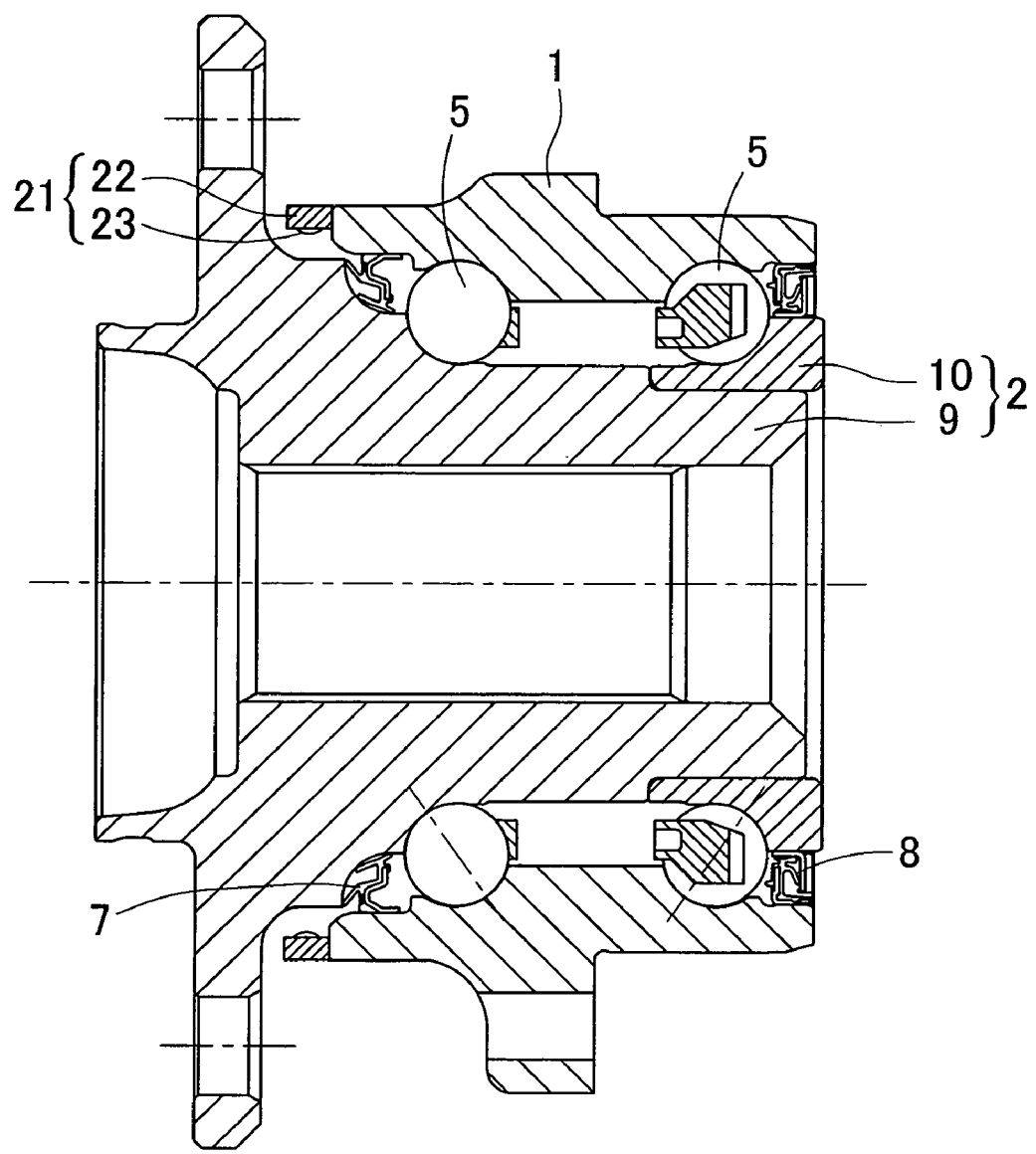
FIG. 73 is a longitudinal sectional view of the sensor-incorporated wheel support bearing assembly, in which the sensor unit is fitted at a further different location from that of the sensor-incorporated wheel support bearing assembly shown in FIG. 70.
Figure 74:
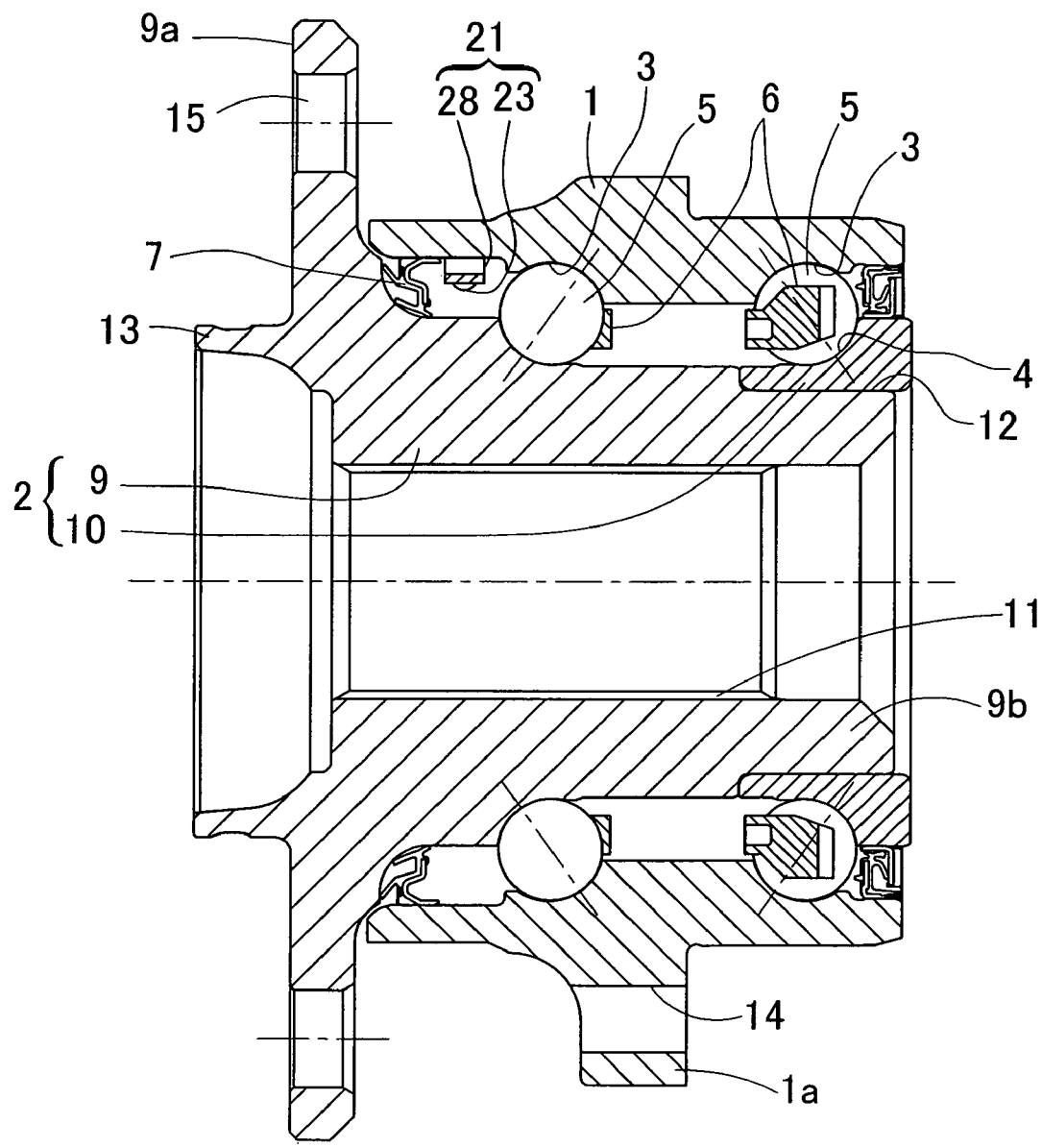
FIG. 74 is a sectional view of the sensor-incorporated wheel support bearing assembly according to a fifth modified example of the present invention.
Figure 75:
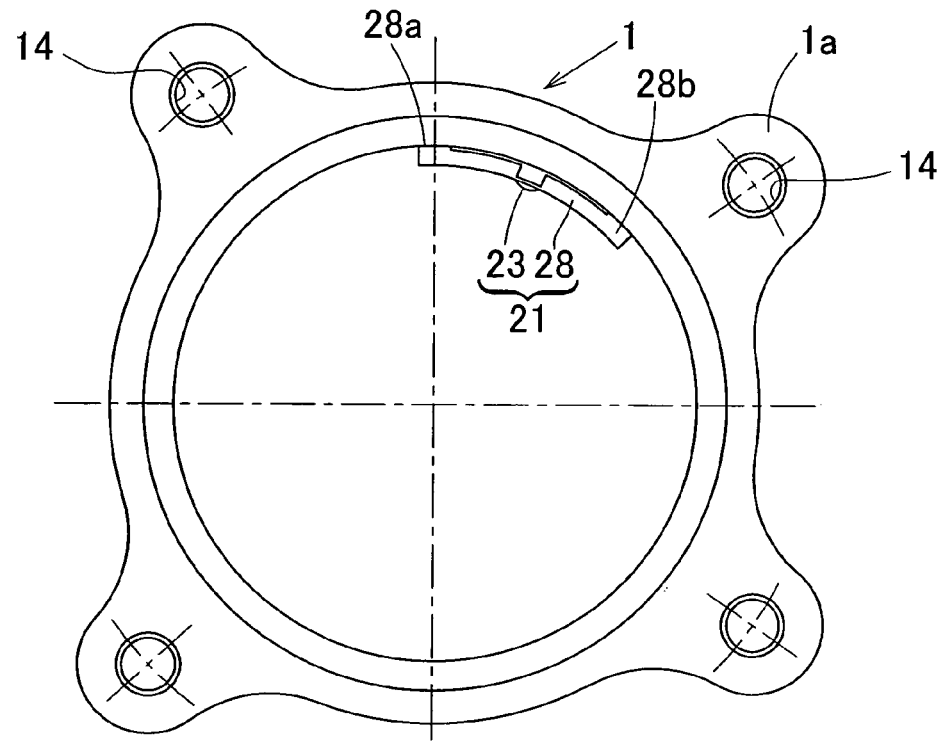
FIG. 75 is a front view showing the outer member and the sensor unit of the sensor-incorporated wheel support bearing assembly shown in FIG. 74.

Although in the above modified example, the sensor unit 21 is provided on the inner peripheral surface of the outer member 1 as the stationary member, the sensor unit 21 according to the modified example may be provided on the end face of the outer member 1. FIG. 72 shows an example in which the sensor unit 21 is provided on the end face on the inboard side of the outer member 1, while FIG. 73 shows an example in which the sensor unit 21 is provided on the end face on the outboard side of the outer member 1.

FIGS. 74 to 76A, 76B show a fifth modified example not assuming the fundamental structure of the present invention. This example is different from the thirteenth to sixteenth embodiments in that the sensor mounting member 28 of the sensor unit 21 is fitted to the outer member 1 at a portion in a circumferential direction thereof. Other structural features are similar to those of the thirteenth to sixteenth embodiments. Common parts are indicated by like reference numerals and the description thereof is omitted.

Figure 76A:
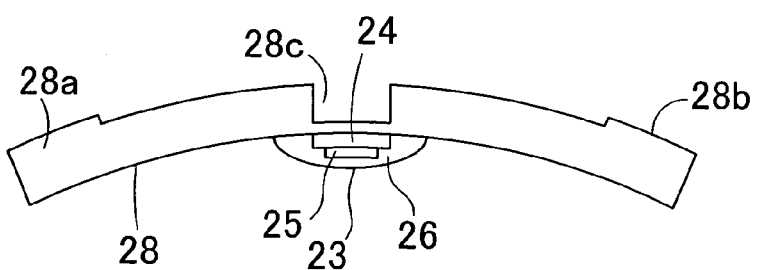
FIG. 76A is a front view of the sensor unit shown in FIG. 75.
Figure 76B:
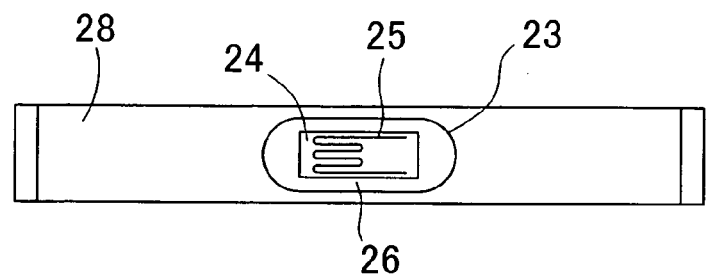
FIG. 76B is a bottom view of the sensor unit shown in FIG. 75.

As shown in FIGS. 76A and 76B, a sensor mounting member 28 is formed in a substantially arcuate shape elongated in a circumferential direction along the inner peripheral surface of the outer member 1, has contact mounting portions 28a and 28b projected to the outer peripheral surface side of the arcuate shape formed at both ends, and has an intermediate portion formed as a notch portion 28c opened to the outer peripheral surface side of the arcuate shape formed. The strain sensors 23 are provided on the inner peripheral surface side of the arcuate shape positioned on a back side of the notch portion 28c. The strain detector 23 includes the insulating film 44 provided on a surface of the sensor mounting member 28 and the resistive element 25 for detecting a strain formed on the insulating film 44 by means of a surface treatment. The protective film 26 is formed so as to cover the surfaces and peripheries of the insulating film 44 and the resistive element 25. The sectional shape of the sensor mounting member 28 is rectangular but may also have various shapes.

This sensor unit 21 is fixed to the inner peripheral surface of the outer member 1 through the contact mounting portions 28a and 28b of the sensor mounting member 28 in a direction in which the longitudinal direction of the sensor mounting member 28 directed to the circumferential direction of the outer member 1. The contact mounting portions 28a and 28b are fixed to the outer member 1 by means of a bolt or bonding. A clearance is defined between the inner peripheral surface of the outer member 1 and a portion of the sensor mounting member 28 other than the contact mounting portions 28a and 28b. The first contact mounting portion 28a which is any one of the contact mounting portions 28a and 28b is fixed to a portion of the outer member 1 which is deformed most largely in a radial direction under the load acting on the outer member 1. The second contact mounting portion 28b is fixed to a portion of the outer member 1 which is deformed radially less than the portion to which the contact mounting portions 28a is fixed.

In this example, under the effect of a load acting on the hub axle 9, the outer member 1 is deformed through the rolling elements 5 and the deformation is transmitted to the sensor mounting member 24 fitted to the end face of the outer member 1 to deform the sensor mounting member 24. The strain on the sensor mounting member 24 is measured by the resistive elements 25. In this case, the sensor mounting member 24 is deformed according to the radial deformation in a portion of the outer member 1 to which the sensor mounting member 24 is fitted. Since the notch portion 24c is formed in the outer member 1, having low rigidity, a strain larger than that on the outer member 1 appears in the portion to which the sensor mounting member 24 is fitted. Therefore, any slight strain on the outer member 1 can be accurately detected by the resistive elements 25.

In the modified example, as described above, the sensor signal processing circuit shown in FIG. 1 may be employed for processing the outputs of the resistive elements 25.

Figure 77:
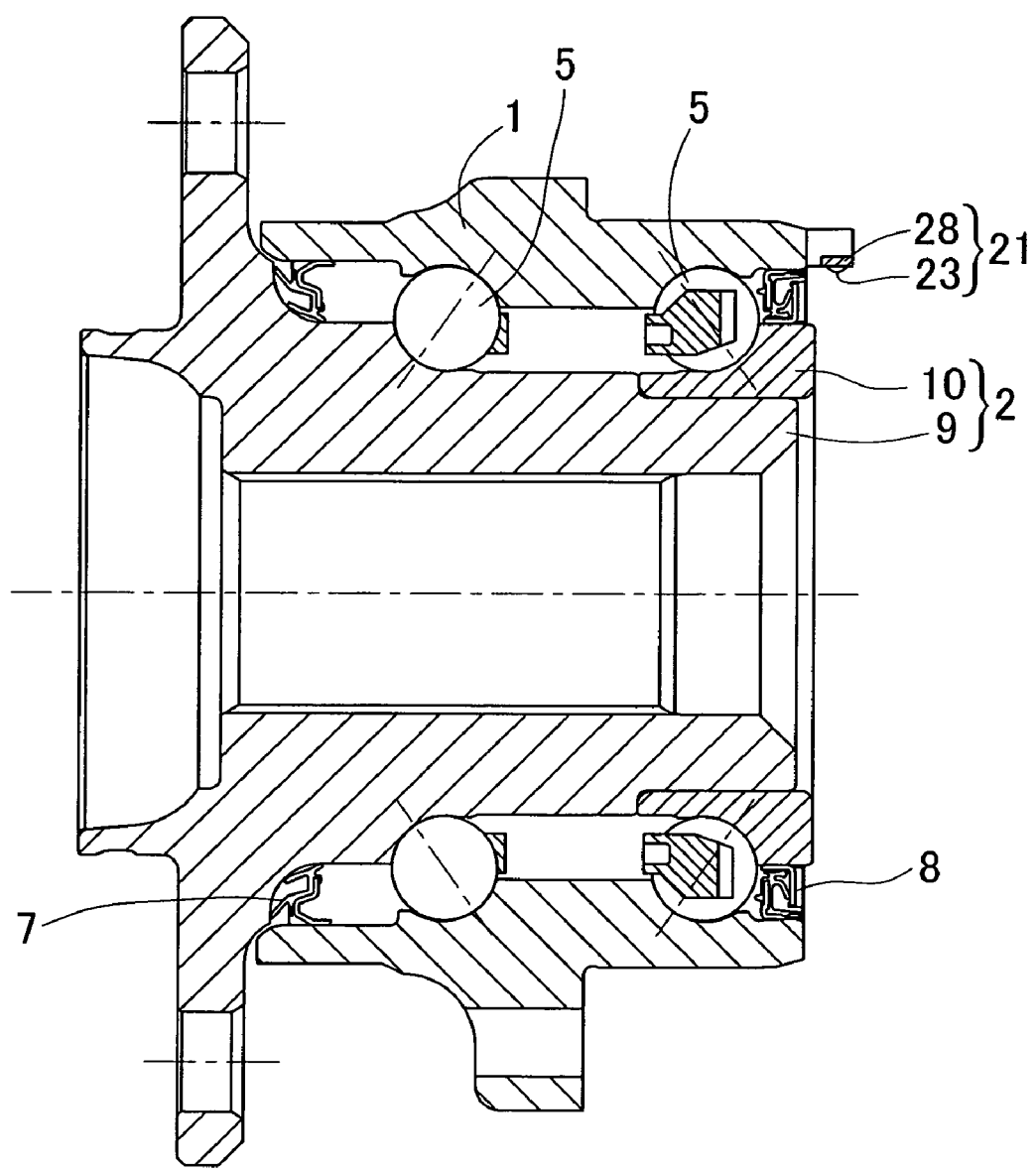
FIG. 77 is a sectional view of the sensor-incorporated wheel support bearing assembly, in which the sensor unit is fitted at a different location from that of the sensor-incorporated wheel support bearing assembly shown in FIG. 74.
Figure 78:
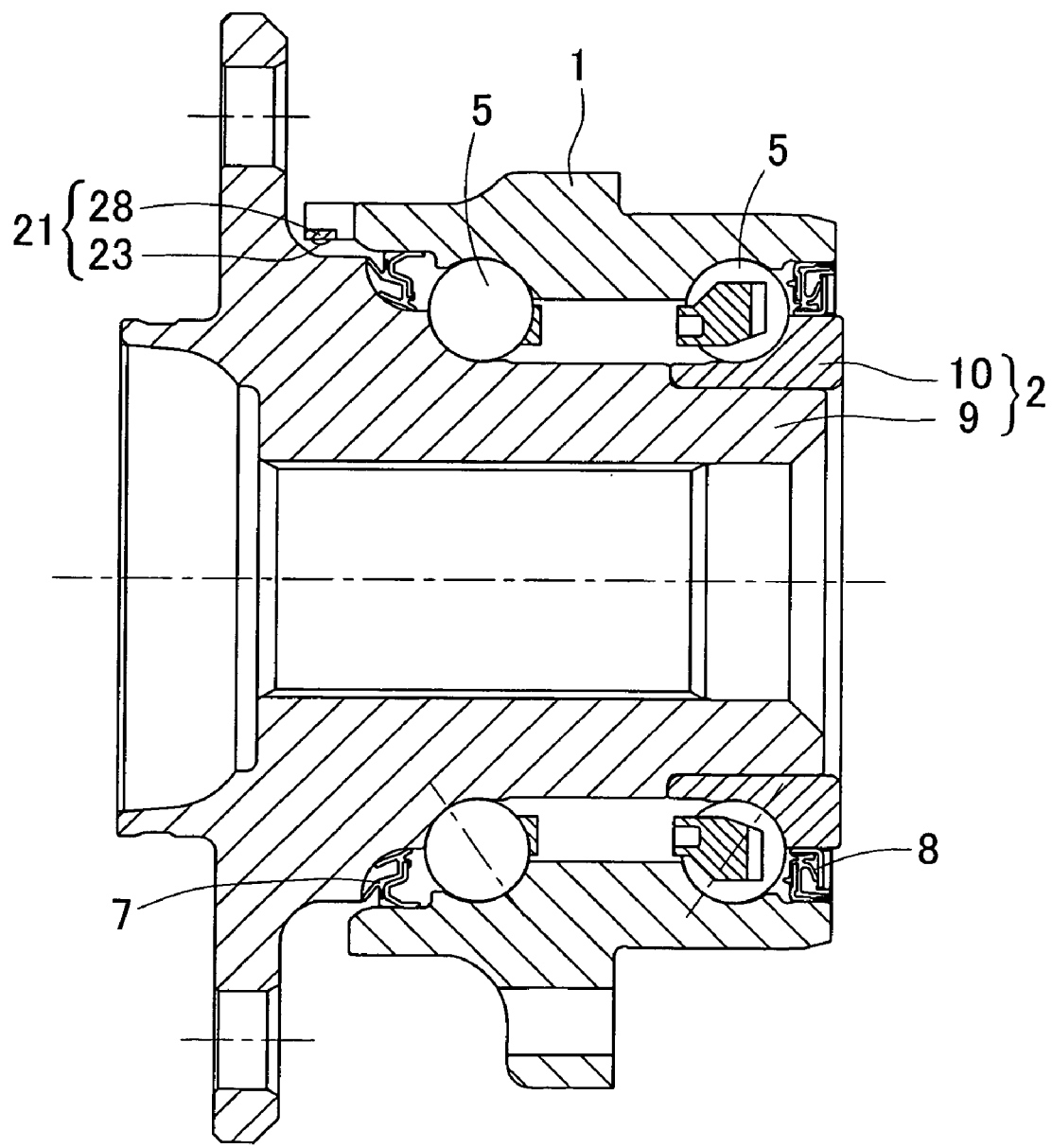
FIG. 78 is a sectional view of the sensor-incorporated wheel support bearing assembly, in which the sensor unit is fitted at a further different location from that of the sensor-incorporated wheel support bearing assembly shown in FIG. 74.

Although in this modified example, the sensor unit 21 is provided on the inner peripheral surface of the outer member 1 as the stationary member, the sensor unit may be provided on the end face of the outer member 1. FIG. 77 shows an example in which the sensor unit 21 is provided on the end face on the inboard side of the outer member 1, while FIG. 78 shows an example in which the sensor unit 21 is provided on the end face on the outboard side of the outer member 1.

In the above described embodiments, the wheel support bearing assembly in which the outer member is the stationary member is described. The present invention is also applicable to a wheel support bearing assembly in which the inner member serves as the stationary member. In this case, the sensor unit 21 is provided on the peripheral surface or the end face of the inner member.

Also, although each of the foregoing embodiments has been shown and described as applied to the wheel support bearing assembly of the third generation type, the present invention may also be applied to a wheel support bearing assembly of a first or second generation type, in which a bearing portion and a hub axle are formed as respective separate components, and to a wheel support bearing assembly of a fourth generation type, in which a portion of the inner member is constituted by an outer race of the constant velocity joint. Yet, the wheel support bearing assembly may be used for the support of a driven wheel and may be employed in a tapered roller type wheel support bearing assembly of any of generation types.

The above wheel support bearing assembly forming a fundamental structure applicable to any one of the above described preferred embodiments of the present invention includes an outer member having an inner peripheral surface formed with a plurality of raceways; an inner member having an outer peripheral surface formed with a plurality of raceways in face-to-face relation with the raceways in the outer member; a plurality of rows of rolling elements interposed between the raceways in the outer member and the raceways in the inner member, respectively; and a sealing device for sealing an end of a bearing space delimited between the outer member and the inner member, in which one of the outer member and inner member, which serves as a stationary member, is fitted with a ring member, the ring member having at an intermediate portion thereof a first non-contact ring portion not in contact with the stationary member, at one end a first contact ring portion in contact with the stationary member, and at the other end either of the following portions (A) or (B): (A) a second non-contact ring portion not in contact with the stationary member and having a wall thickness greater than that of the first non-contact ring portion; (B) a second contact ring portion in contact with the stationary member; and in which in the case of (A), the first contact ring portion is fitted with a sensor for measuring a strain on the ring member, and in the case of (B), the sensor for detecting a strain on the ring member is fitted to one of the first non-contact ring portion and the first contact ring portion, which has the smallest wall thickness.

The foregoing modified examples which do not assume the fundamental structure of the present invention will be summarized as follows.

[First Aspect]

A sensor-incorporated wheel support bearing assembly according to the first aspect of a modified example of the present invention includes an outer member having an inner peripheral surface formed with a plurality of raceways; an inner member having an outer peripheral surface formed with a plurality of raceways in face-to-face relation with the raceways in the outer member; a plurality of rows of rolling elements interposed between the raceways in the outer member and the raceways in the inner member, respectively; and a sealing device for sealing an end of a bearing space delimited between the outer member and the inner member, in which one of the outer member and inner member, which serves as a stationary member, is fitted with a ring member, and the ring member is mounted with a plurality of strain sensors for measuring a strain on the ring member, and provided with the sealing device. For example, when the outer member is the stationary member and the inner member is the rotating member, the ring member is fitted to the outer member.

When during the travel of the automotive vehicle a load acts on the rotating member, the stationary member is deformed through the rolling elements, and the deformation brings about a strain on the ring member. The strain sensor provided in the ring member detects the strain on the ring member. By determining the relation between the strain and the load in advance from experiments and simulations, the load acting on the wheel can be detected from an output of the strain sensor. In other words, using the output of the strain sensor, the external force acting on the wheel support bearing assembly, the road force acting between the tire and the road surface, or the amount of preload on the wheel support bearing assembly can be estimated. Also, the load so detected can be used for the vehicle control in the automotive vehicle.

Since the sensor-incorporated wheel support bearing assembly has the strain sensor provided in the ring member fitted to the peripheral surface of the stationary member, the load sensor can be mounted compactly on the automotive vehicle. Also, since the ring member is a simple component part adapted to be fitted to the stationary member, the provision of the strain sensor in the ring member results in excellent mass productivity and reduction of the cost.

Further, since the ring member has the sealing device and serves as the core metal of the sealing device, the sensor-incorporated wheel support bearing assembly can be compact in the axial direction and can have a seal function at low cost, whereby the cost can be reduced.

[Second Aspect]

The sensor-incorporated wheel support bearing assembly for rotatably supporting a wheel relative to an automotive body structure according to the second aspect of the modified example of the present invention shown in FIGS. 62 to 65 includes an outer member having an inner peripheral surface formed with a plurality of raceways, an inner member having an outer peripheral surface formed with a plurality of raceways in face-to-face relation with the raceways in the outer member, and a plurality of rows of rolling elements interposed between the raceways in the outer member and the raceways in the inner member, respectively, in which an end face of one of the outer member and the inner member, which serves as a stationary member, is fitted with a ring member, and the ring member is mounted with a plurality of strain sensors for measuring a strain on the ring member.

According to the second aspect of the modified example, when during the travel of the automotive vehicle a load acts on the rotating member, the stationary member is deformed through the rolling elements and the deformation brings about a strain on the ring member or the sensor mounting member. The strain sensor provided in the ring member or the sensor mounting member detects the strain on the ring member or the sensor mounting member. By determining the relation between the strain and the load in advance from experiments and simulations, the load acting on the wheel can be detected from an output of the strain sensor. In other words, using the output of the strain sensor, the external force acting on the wheel support bearing assembly, the road force acting between the tire and the road surface, or the amount of preload on the wheel support bearing assembly can be estimated. Also, the load so detected can be used for the vehicle control in the automotive vehicle.

Since the sensor-incorporated wheel support bearing assembly has the strain sensor provided in the ring member or the sensor mounting member fitted to the stationary member, the load sensor can be mounted compactly on the automotive vehicle. Also, since the ring member and the sensor mounting member are simple component parts adapted to be fitted to the stationary member, the provision of the strain sensor in the ring member and the sensor mounting member results in excellent mass productivity and reduction of the cost.

Moreover, in the second aspect of the modified example, the ring member or the sensor mounting member is fitted to the end face of the stationary member. Since the end face of the stationary member has a smaller wall thickness than that of the other portions of the stationary member and has low rigidity, the end face tends to be greatly deformed. As a result, the deformation of the stationary member is transmitted to the ring member or the sensor mounting member, allowing the strain on the stationary member to be detected with the strain sensor with good sensitivity.

Also, the periphery of the end face of the stationary member, has small quantity of other component parts and a relatively large space. Accordingly, the degree of freedom of the design of the ring member or the sensor mounting member is high whereby these members can have a shape suitable for detecting the strain on the stationary member with good sensitivity. Additionally, those members can be easily fitted to the stationary member.

[Third Aspect]

The sensor-incorporated wheel support bearing assembly according to the third aspect of the modified example of the present invention shown in FIGS. 66 to 69 includes an outer member having an inner peripheral surface formed with a plurality of raceways, an inner member having an outer peripheral surface formed with a plurality of raceways in face-to-face relation with the raceways in the outer member, and a plurality of rows of rolling elements interposed between the raceways in the outer member and the raceways in the inner member, respectively, in which one of the outer member and the inner member, which serves as a stationary member, is fitted with a sensor unit having a sensor mounting member and strain sensors fitted to the sensor mounting member, the sensor mounting member having at least two contact mounting portions in contact with the stationary member and at least one notch portion positioned between the adjacent contact mounting portions, and the strain sensor is arranged in the notch portion.

According to the third aspect of the modified example, the sensor mounting member has at least two contact mounting portions in contact with the stationary member and at least one notch portion positioned between the adjacent contact mounting portions, and the strain sensor is arranged in the notch portion. Accordingly, a strain larger than that on the stationary member is caused in the portion of the sensor mounting member on which the strain sensor is mounted due to reduced rigidity, whereby the strain on the stationary member can be detected with good sensitivity.

[Fourth Aspect]

The sensor-incorporated wheel support bearing assembly according to the fourth aspect of the modified example of the present invention shown in FIGS. 70 to 73 includes an outer member having an inner peripheral surface formed with a plurality of raceways, an inner member having an outer peripheral surface formed with a plurality of raceways in face-to-face relation with the raceways in the outer member, and a plurality of rows of rolling elements interposed between the raceways in the outer member and the raceways in the inner member, respectively, in which a peripheral surface or an end face of one of the outer member and the inner member, which serves as a stationary member, is fitted with a ring-shaped sensor mounting member, the sensor mounting member being provided with an insulating film on a surface thereof to form a resistive element for measuring a strain on the sensor mounting member on the insulating film by means of a surface treatment.

Since in the sensor-incorporated wheel support bearing assembly the resistive elements for detecting a strain is mounted on the sensor mounting member fitted to the stationary member, the load sensor can be mounted compactly on the automotive vehicle. Also, since the sensor mounting member is a simple component part designed to be fitted to the stationary member, the provision of the resistive elements in the sensor mounting member results in excellent mass productivity and reduction of the cost.

Moreover, since the sensor-incorporated wheel support bearing assembly employs, as the strain detector, the resistive elements for detecting a strain which is formed on the insulating film provided on the surface of the sensor mounting member, instead of utilizing the strain sensor as a complete product, the sensor unit can be manufactured at low cost. When the surface and the peripheries of the resistive elements are coated by a coating film, the resistive elements are firmly fixed to the sensor mounting member for preventing the resistive elements from falling off or being displaced. Accordingly, the reliability for maintaining the detection function can be increased.

[Fifth Aspect]

The sensor-incorporated wheel support bearing assembly according to the fifth aspect of the modified example of the present invention shown in FIGS. 74 to 78 includes an outer member having an inner peripheral surface formed with a plurality of raceways, an inner member having an outer peripheral surface formed with a plurality of raceways in face-to-face relation with the raceways in the outer member, and a plurality of rows of rolling elements interposed between the raceways in the outer member and the raceways in the inner member, respectively, in which one of the outer member and the inner member, which serves as a stationary member, is fitted with a sensor unit having a sensor mounting member and strain sensors fitted to the sensor mounting member, the sensor mounting member having at least two contact mounting portions in contact with the stationary member and at least one notch portion positioned between the adjacent contact mounting portions, and in which the sensor mounting member is provided with an insulating film on the surface of the notch portion to form a resistive element for measuring a strain on the sensor mounting member on the insulating film by means of a surface treatment.

According to the fifth aspect of the modified example, the sensor mounting member has at least two contact mounting portions in contact with the stationary member and at least one notch portion positioned between the adjacent contact mounting portions, and the strain sensor is arranged in the notch portion. Accordingly, a strain larger than that on the stationary member is caused in the portion of the sensor mounting member on which the strain sensor is mounted due to reduced rigidity, whereby the strain on the stationary member can be detected with good sensitivity.

In the aspect 4 or 5, the sensor mounting member may be formed of an insulating material. As the insulating material, for example, a silicon steel plate is preferably utilized.

When the sensor mounting member is formed of an insulating material, the insulating film may be dispensed with, whereby the structure of the sensor unit can be simplified and its manufacture can be facilitated.

What is claimed is:

1. A sensor-incorporated wheel support bearing assembly for rotatably supporting a wheel relative to an automotive body structure, which assembly comprises:
   an outer member having an inner peripheral surface formed with a plurality of raceways;
   an inner member having an outer peripheral surface formed with a plurality of raceways in face-to-face relation with the raceways in the outer member;
   a plurality of rows of rolling elements interposed between the raceways in the outer member and the raceways in the inner member, respectively; and
   a sealing device for sealing an end of a bearing space delimited between the outer member and the inner member,
   wherein one of the outer member and the inner member, which serves as a stationary member, is fitted with a ring member on a peripheral surface or an end face thereof, the ring member having at an intermediate portion thereof a first non-contact ring portion not in contact with the stationary member, at one end a first contact ring portion in contact with the stationary member, and at the other end either of the following portions (A) or (B):
   (A) a second non-contact ring portion not in contact with the stationary member and having a wall thickness greater than that of the first non-contact ring portion;
   (B) a second contact ring portion in contact with the stationary member; and
   wherein in the case of (A), the first contact ring portion is fitted with a sensor for measuring a strain on the ring member, and in the case of (B), the sensor for detecting a strain on the ring member is fitted to one of the first non-contact ring portion and the first contact ring portion, which has the smallest wall thickness.

2. The sensor-incorporated wheel support bearing assembly as claimed in claim 1, wherein the sensor for measuring a strain on the ring member fitted to the first non-contact ring portion is a sensor for measuring an axial strain on the ring member.

3. The sensor-incorporated wheel support bearing assembly as claimed in claim 1, wherein the second non-contact ring portion includes a flange portion protruding radially in a direction opposite to the first contact ring portion.

4. The sensor-incorporated wheel support bearing assembly as claimed in claim 3, wherein the ring member is fitted to the end face of the stationary member and the sensor is a strain sensor for measuring an axial strain on the ring member.

5. The sensor-incorporated wheel support bearing assembly as claimed in claim 3, wherein the sensor for measuring a strain includes an insulating film provided on a surface of the first non-contact ring portion and a resistive element for measuring a strain on the ring member formed on the insulating film by means of a surface treatment, and wherein the sensor is a strain sensor for measuring an axial strain on the ring member.

6. The sensor-incorporated wheel support bearing assembly as claimed in claim 1, wherein the sensor for measuring a strain on the ring member provided in the first contact ring portion and is a sensor for measuring a bending strain.

7. The sensor-incorporated wheel support bearing assembly as claimed in claim 1, wherein the stationary member is the outer member.

8. The sensor-incorporated wheel support bearing assembly as claimed in claim 1, wherein the ring member is not plastically deformable during press-fitting onto the stationary member.

9. The sensor-incorporated wheel support bearing assembly as claimed in claim 8, wherein at an expected maximum value of an external force acting on the wheel support bearing assembly or a road force acting between the tire and the road surface, the ring member is not plastically deformable or no clearance is formed between the ring member and the stationary member.

10. The sensor-incorporated wheel support bearing assembly as claimed in claim 1, wherein the ring member is a pressed product.

11. The sensor-incorporated wheel support bearing assembly as claimed in claim 1, wherein the sealing device is provided in the ring member.

12. The sensor-incorporated wheel support bearing assembly as claimed in claim 1, wherein the ring member is fitted to the end face of the stationary member, and the sensor for measuring a strain is fitted to the first non-contact ring portion in the case of (A) and is a strain sensor for measuring an axial strain on the ring member.

13. The sensor-incorporated wheel support bearing assembly as claimed in claim 1, wherein the ring member is fitted to the end face of the stationary member, and the sensor for measuring a strain is fitted to the first non-contact ring portion in the case of (B) and is a strain sensor for measuring a bending strain on the ring member.

14. The sensor-incorporated wheel support bearing assembly as claimed in claim 1, wherein the ring member is fitted to the end face of the stationary member, and the sensor for measuring a strain is fitted to the first contact ring portion in the case of (B) and is a strain sensor for measuring an axial strain on the ring member.

15. The sensor-incorporated wheel support bearing assembly as claimed in claim 1, wherein the sensor includes an insulating film provided on a surface of the ring member and a resistive element for measuring a strain on the ring member formed on the insulating film by means of a surface treatment.

16. The sensor-incorporated wheel support bearing assembly as claimed in claim 1, wherein the sensor for measuring a strain includes an insulating film on a surface of the first non-contact ring portion in the case of (A) and a resistive element for measuring a strain on the ring member formed on the insulating film by means of a surface treatment, and wherein the sensor is a strain sensor for measuring an axial strain on the ring member.

17. The sensor-incorporated wheel support bearing assembly as claimed in claim 1, wherein the sensor for measuring a strain includes an insulating film provided on a surface of the first non-contact ring portion in the case of (B) and a resistive element for measuring a strain on the ring member formed on the insulating film by means of a surface treatment, and wherein the sensor is a strain sensor for measuring an axial strain on the ring member.

18. The sensor-incorporated wheel support bearing assembly as claimed in claim 1, wherein the sensor for measuring a strain includes an insulating film provided on a surface of the first contact ring portion in the case of (B) and a resistive element for measuring a strain on the ring member formed on the insulating film by means of a surface treatment, and wherein the sensor is a strain sensor for measuring a bending strain on the ring member.

* * * * *